US011001862B2

(12) United States Patent
Rasmussen et al.

(10) Patent No.: US 11,001,862 B2
(45) Date of Patent: May 11, 2021

(54) DIRECT TRANSFER OF POLYNUCLEOTIDES BETWEEN GENOMES

(71) Applicant: Novozymes A/S, Bagsvaerd (DK)

(72) Inventors: Michael Dolberg Rasmussen, Bagsvaerd (DK); Gitte Bak Poulsen, Bagsvaerd (DK)

(73) Assignee: Novozymes A/S, Bagsvaerd (DK)

( * ) Notice: Subject to any disclaimer, the term of this patent is extended or adjusted under 35 U.S.C. 154(b) by 154 days.

(21) Appl. No.: 14/897,060

(22) PCT Filed: Jul. 4, 2014

(86) PCT No.: PCT/EP2014/064289
§ 371 (c)(1),
(2) Date: Dec. 9, 2015

(87) PCT Pub. No.: WO2015/004013
PCT Pub. Date: Jan. 15, 2015

(65) Prior Publication Data

US 2016/0115501 A1 Apr. 28, 2016

(30) Foreign Application Priority Data

Jul. 12, 2013 (EP) .................................... 13176373

(51) Int. Cl.
*C12N 15/90* (2006.01)
*C12N 15/10* (2006.01)
*C12N 15/75* (2006.01)

(52) U.S. Cl.
CPC ....... *C12N 15/902* (2013.01); *C12N 15/1082* (2013.01); *C12N 15/75* (2013.01)

(58) Field of Classification Search
None
See application file for complete search history.

(56) References Cited

U.S. PATENT DOCUMENTS

| | | | |
|---|---|---|---|
| 6,485,949 | B1 | 11/2002 | Piazza |
| 2009/0280569 | A1 | 11/2009 | Jorgensen |
| 2010/0028944 | A1 | 2/2010 | Berka et al. |

FOREIGN PATENT DOCUMENTS

| | | | |
|---|---|---|---|
| JP | 57-49862 | | 3/1982 |
| WO | 03/095658 | A1 | 11/2003 |
| WO | 2006/042548 | A1 | 4/2006 |
| WO | 2008079895 | A2 | 7/2008 |
| WO | 2011/120938 | A2 | 10/2011 |
| WO | 2014052630 | A1 | 4/2014 |
| WO | 2015004013 | A1 | 1/2015 |

OTHER PUBLICATIONS

Zhang et al (Microbial Biotechnology, 4(1):97-150, 2011).*
Hoffmann et al (Applied and Environmental Microbiology 76(15):5046-57, 2010).*
Blee et al., Journal of Biological Chemistry, vol. 268, No. 3, pp. 1708-1715 (1993).
Hahn et al., Molecular Microbiology, vol. 18, No. 4, pp. 755-767 (1995).
Hols et al., Gene, vol. 118, No. 1, pp. 31-38 (1992).
Miyazawa et al., Journal of Food Science, vol. 58, No. 1, pp. 66-70 (1993).
Tsuge et al., Antimicrobial Agents and Chemotherapy, vol. 49, No. 11, pp. 4641-4648 (2005).
Hahn et al, 1994, J Bacteriol 176(18), 5753-5761.
Hahn et al, 1996, Mol Microbiol 21(4), 763-775.
Persuh et al, 1999, Mol Microbiol 33(4), 886-894.
Turgay et al, 1998, The EMBO Journal 17(22), 6730-6738.
Priority document of WO 2014-052630.
Priority document of EP 13176373.
Anonymous, Experimental report, pp. 1-18.

* cited by examiner

*Primary Examiner* — Patricia Duffy
(74) *Attorney, Agent, or Firm* — Eric J. Fechter

(57) ABSTRACT

The present invention provides methods for directly transferring a recombinant polynucleotide of interest from the chromosome of a prokaryotic donor cell to the chromosome of a prokaryotic recipient cell of another species, wherein the polynucleotide of interest comprises at least one coding sequence of interest, preferably one gene of interest and a selectable marker, wherein said polynucleotide of interest in the chromosome of the donor cell is flanked on each side by a polynucleotide region derived from the chromosome of the recipient cell, and wherein the flanking polynucleotide regions are of sufficient size and sequence identity to allow double homologous recombination with the corresponding regions in the chromosome of the recipient cell.

9 Claims, 8 Drawing Sheets

Specification includes a Sequence Listing.

SOE-fragment from Example 1

SOE fragment from Example 3

SOE fragment from Example 5

MOL3034 ara locus 18218 bp – Example 6

Chromosomal ara locus of MOL3041 - 14889 bp – Example 8 ara-aprH cassette in MOL3053 – 17505 bp – Example 10

TaHy9 transformant from Example 15

PRIMER: 33128 – 33133 PCR PRODUKT: 4923bp 1. 1kb DNA Ladder
2. .
3. K1
4. K2
5. K3
6. K4
7. K5
8. K6
9. K7
10. K8
11. H2O
12. SJ1904

PRIMER: 33132 – 33129 PCR PRODUKT: 2358bp 1. 1kb DNA Ladder
2. K1
3. K2
4. K3
5. K4
6. K5
7. K6
8. K7
9. K8
10. H2O
11. SJ1904

TaHy9 transformant from Example 16

Primer: 33128 – 39171 PCR product: 4967bp 1 2 3 4 5 6 7 8 9 10 11

1. 1kb DNA ladder
2. L5
3. L6
4. L7
5. L8
6. L9
7. L10
8. L11
9. L1
10. $H_2O$
11. SJ1904

Primer: 33132 – 33129 PCR product: 4284bp 1 2 3 4 5 6 7 8 9 10 11

1. 1kb DNA ladder
2. L5
3. L6
4. L7
5. L8
6. L9
7. L10
8. L11
9. L1
10. $H_2O$
11. SJ1904

DIRECT TRANSFER OF POLYNUCLEOTIDES BETWEEN GENOMES

CROSS-REFERENCE TO RELATED APPLICATIONS

This application is a 35 U.S.C. 371 national application of PCT/EP2014/064289 filed Jul. 4, 2014, which claims priority or the benefit under 35 U.S.C. 119 of European application No. 13176373.2 filed Jul. 12, 2013. The contents of each application are fully incorporated herein by reference.

REFERENCE TO SEQUENCE LISTING

This application contains a Sequence Listing in computer readable form. The computer readable form is incorporated herein by reference.

FIELD OF THE INVENTION

The present invention provides methods for directly transferring a recombinant polynucleotide of interest from the chromosome of a prokaryotic donor cell to the chromosome of a prokaryotic recipient cell of another species, wherein the polynucleotide of interest comprises at least one coding sequence of interest, preferably one gene of interest and a selectable marker, wherein said polynucleotide of interest in the chromosome of the donor cell is flanked on each side by a polynucleotide region derived from the chromosome of the recipient cell, and wherein the flanking polynucleotide regions are of sufficient size and sequence identity to allow double homologous recombination with the corresponding regions in the chromosome of the recipient cell.

BACKGROUND OF THE INVENTION

In the area of industrial biotechnology, especially in relation to secreted polypeptides, such as, enzymes, *Bacillus subtilis* is by far the preferred host microorganism when new genes are to be cloned and screened. This is because of the high transformation and recombination frequencies in this species, which allow quick and easy transformation of a gene into the *B. subtilis* host and integration into its chromosome for subsequent screening.

It is well known that these high frequencies also allow easy transfer of genes from one *B. subtilis* to another by simple transformation with chromosomal DNA. However, *B. subtilis* is not necessarily the most preferred expression host once a gene of interest has been identified in a screening process and, unfortunately, it is very often difficult and cumbersome to transfer chromosomally-integrated heterologous DNA further on to other species desired for industrial expression, for example, to a *Bacillus licheniformis* host.

SUMMARY OF THE INVENTION

The present invention allows easy transfer of heterologous chromosomally integrated polynucleotides between different species.

In the examples below we succeeded in first cloning sufficiently large up- and downstream flanking DNA regions from a *B. licheniformis* recipient cell to a *B. subtilis* donor, then integrating a gene of interest and a selectable marker between the flanking DNA regions in the *B. subtilis* donor. Subsequently we transferred the gene of interest into the *B. licheniformis* recipient by transforming *B. licheniformis* with chromosomal DNA from the *B. subtilis* donor, whereby the gene of interest was site-specifically integrated into the chromosome of the *B. licheniformis* recipient through homologous recombination between the two flanking DNA regions in the incoming chromosomal DNA from the *B. subtilis* donor and the corresponding identical regions in the *B. licheniformis* chromosome.

This technique may be of particular relevance for transferring larger polynucleotides of interest, such as, operons or functional multi gene clusters between species.

Accordingly, in one aspect the present invention relates to a method for directly transferring a recombinant polynucleotide of interest from the chromosome of a prokaryotic donor cell to the chromosome of a prokaryotic recipient cell of another species, wherein the polynucleotide of interest comprises at least one coding sequence of interest, preferably one gene of interest and a selectable marker, wherein said polynucleotide of interest in the chromosome of the donor cell is flanked on each side by a polynucleotide region derived from the chromosome of the recipient cell, and wherein the flanking polynucleotide regions are of sufficient size and sequence identity to allow double homologous recombination with the corresponding regions in the chromosome of the recipient cell; the method comprising the steps of:

a) providing chromosomal DNA from the donor cell, said DNA comprising the polynucleotide of interest flanked on each side by a polynucleotide region derived from the chromosome of the recipient prokaryotic cell;
b) transforming the recipient cell with the DNA from step (a); and
c) selecting a successfully transformed recipient cell, wherein the polynucleotide of interest comprising the selectable marker has been integrated into its chromosome.

Preferably the selectable marker has been integrated into the chromosome in step (c) via homologous recombination between the flanking regions in the DNA and their corresponding chromosomal regions in the recipient cell.

Accordingly, in one aspect the present invention relates to a method for directly transferring a recombinant polynucleotide of interest from the chromosome of a prokaryotic donor cell to the chromosome of a prokaryotic recipient cell of another species, comprising:

a) providing chromosomal DNA from the donor cell, said DNA comprising the polynucleotide of interest flanked on each side by a polynucleotide region derived from the chromosome of the recipient prokaryotic cell and of sufficient size and sequence identity to allow double homologous recombination with the corresponding regions in the chromosome of the recipient cell;
b) transforming the recipient cell with the DNA from step (a); and
c) selecting a transformed recipient cell, wherein the polynucleotide of interest comprising the selectable marker has been integrated into the chromosome of the recipient cell.

In a second aspect, the invention relates to a method of screening a gene library for an encoded activity of interest, said method comprising the steps of:

a) providing a prokaryotic donor cell comprising in its chromosome a polynucleotide of interest which in turn comprises the gene library and a selectable marker, wherein said polynucleotide of interest is flanked on each side by a polynucleotide region derived from the chromosome of a recipient prokaryotic cell of another species, and wherein the flanking polynucleotide regions are of sufficient size and sequence identity to allow double homologous recombination with the corresponding regions in the chromosome of the recipient cell;

b) screening the gene library for an encoded activity while it resides in the chromosome of the prokaryotic donor cell and selecting a prokaryotic donor clone of interest, c) providing chromosomal DNA from the clone cell of step (b);

d) transforming the recipient cell with the DNA from step (c); and e) selecting a successfully transformed recipient cell, wherein the polynucleotide of interest comprising the selectable marker has been integrated into its chromosome.

Preferably the selectable marker has been integrated into the chromosome in step (e) via homologous recombination between the flanking regions in the DNA and their corresponding chromosomal regions in the recipient cell.

DEFINITIONS

Figure 1:
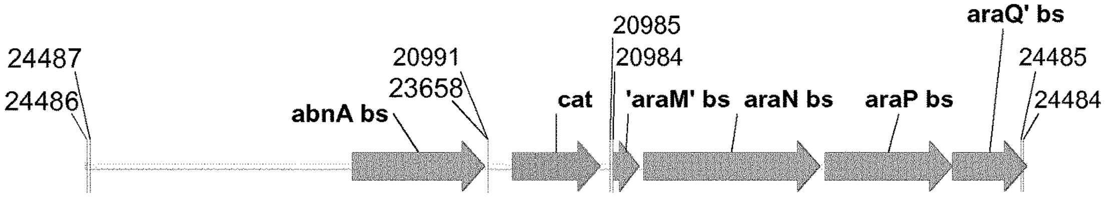
FIG. 1 shows the SOE-fragment from example 1 with positions of genes and primers.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Disruption: The term "disruption" means that a coding region and/or control sequence of a referenced gene is partially or entirely modified (such as by deletion, insertion, and/or substitution of one or more nucleotides) resulting in the absence (inactivation) or decrease in expression, and/or the absence or decrease of enzyme activity of the encoded polypeptide. The effects of disruption can be measured using techniques known in the art such as detecting the absence or decrease of enzyme activity using cell-free extract measurements referenced herein; or by the absence or decrease of corresponding mRNA (e.g., at least 25% decrease, at least 50% decrease, at least 60% decrease, at least 70% decrease, at least 80% decrease, or at least 90% decrease); the absence or decrease in the amount of corresponding polypeptide having enzyme activity (e.g., at least 25% decrease, at least 50% decrease, at least 60% decrease, at least 70% decrease, at least 80% decrease, or at least 90% decrease); or the absence or decrease of the specific activity of the corresponding polypeptide having enzyme activity (e.g., at least 25% decrease, at least 50% decrease, at least 60% decrease, at least 70% decrease, at least 80% decrease, or at least 90% decrease). Disruptions of a particular gene of interest can be generated by methods known in the art, e.g., by directed homologous recombination (see Methods in Yeast Genetics (1997 edition), Adams, Gottschling, Kaiser, and Stems, Cold Spring Harbor Press (1998)). Techniques to disrupt *Bacillus* genes are described herein and have been demonstrated in the art (see Stahl & Ferrari, 1984, J. Bacteriol. 158: 411-418).

Control sequences: The term "control sequences" means nucleic acid sequences necessary for expression of a polynucleotide encoding a mature polypeptide of the present invention. Each control sequence may be native (i.e., from the same gene) or foreign (i.e., from a different gene) to the polynucleotide encoding the polypeptide or native or foreign to each other. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the polynucleotide encoding a polypeptide.

Expression: The term "expression" includes any step involved in the production of a polypeptide including, but not limited to, transcription, post-transcriptional modification, translation, post-translational modification, and secretion.

Expression vector: The term "expression vector" means a linear or circular DNA molecule that comprises a polynucleotide encoding a polypeptide and is operably linked to control sequences that provide for its expression.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g., recombinant production in a host cell; multiple copies of a gene encoding the substance; and use of a stronger promoter than the promoter naturally associated with the gene encoding the substance).

Nucleic acid construct: The term "nucleic acid construct" means a nucleic acid molecule, either single- or double-stranded, which is isolated from a naturally occurring gene or is modified to contain segments of nucleic acids in a manner that would not otherwise exist in nature or which is synthetic, which comprises one or more control sequences.

Operably linked: The term "operably linked" means a configuration in which a control sequence is placed at an appropriate position relative to the coding sequence of a polynucleotide such that the control sequence directs expression of the coding sequence.

Sequence identity: The relatedness between two amino acid sequences or between two nucleotide sequences is described by the parameter "sequence identity". For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the –nobrief option) is used as the percent identity and is calculated as follows:

(Identical Residues×100)/(Length of Alignment–Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the –nobrief option) is used as the percent identity and is calculated as follows:

(Identical Deoxyribonucleotides×100)/(Length of Alignment–Total Number of Gaps in Alignment)

DETAILED DESCRIPTION OF THE INVENTION

In one aspect the present invention relates to a method for directly transferring a recombinant polynucleotide of interest from the chromosome of a prokaryotic donor cell to the chromosome of a prokaryotic recipient cell of another species, wherein the polynucleotide of interest comprises at least one coding sequence of interest, preferably one gene of interest and a selectable marker, wherein said polynucleotide of interest in the chromosome of the donor cell is flanked on each side by a polynucleotide region derived from the chromosome of the recipient cell, and wherein the flanking polynucleotide regions are of sufficient size and sequence identity to allow double homologous recombination with the corresponding regions in the chromosome of the recipient cell; the method comprising the steps of:

a) providing chromosomal DNA from the donor cell, said DNA comprising the polynucleotide of interest flanked on each side by a polynucleotide region derived from the chromosome of the recipient prokaryotic cell;
b) transforming the recipient cell with the DNA from step (a); and
c) selecting a successfully transformed recipient cell, wherein the polynucleotide of interest comprising the selectable marker has been integrated into its chromosome.

Preferably the selectable marker has been integrated into the chromosome in step (c) via homologous recombination between the flanking regions in the DNA and their corresponding chromosomal regions in the recipient cell.

Sources of Polynucleotides

A polynucleotide or gene encoding a polypeptide having an activity of interest of the present invention may be obtained from microorganisms of any genus. For purposes of the present invention, the term "obtained from" as used herein in connection with a given source shall mean that the polypeptide encoded by a polynucleotide is produced by the source or by a strain in which the polynucleotide from the source has been inserted.

The polynucleotide may be a bacterial polynucleotide. For example, the polynucleotide may be a Gram-positive bacterial polynucleotide such as a *Bacillus, Clostridium, Enterococcus, Geobacillus, Lactobacillus, Lactococcus, Oceanobacillus, Staphylococcus, Streptococcus*, or *Streptomyces* polynucleotide, or a Gram-negative bacterial polynucleotide such as a *Campylobacter, E. coli, Flavobacterium, Fusobacterium, Helicobacter, Ilyobacter, Neisseria, Pseudomonas, Salmonella*, or *Ureaplasma* polynucleotide.

In one aspect, the polynucleotide is a *Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus stearothermophilus, Bacillus subtilis*, or *Bacillus thuringiensis* polynucleotide.

In another aspect, the polynucleotide is a *Streptococcus equisimilis, Streptococcus pyogenes, Streptococcus uberis*, or *Streptococcus equi* subsp. *Zooepidemicus* polynucleotide.

In another aspect, the polynucleotide is a *Streptomyces achromogenes, Streptomyces avermitilis, Streptomyces coelicolor, Streptomyces griseus*, or *Streptomyces lividans* polynucleotide.

The polynucleotide may be a fungal polynucleotide. For example, the polynucleotide may be a yeast polynucleotide such as a *Candida, Kluyveromyces, Pichia, Saccharomyces, Schizosaccharomyces*, or *Yarrowia* polynucleotide; or a filamentous fungal polynucleotide such as an *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptospaeria, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella*, or *Xylaria* polynucleotide.

In another aspect, the polynucleotide is a *Saccharomyces carlsbergensis, Saccharomyces cerevisiae, Saccharomyces diastaticus, Saccharomyces douglasii, Saccharomyces kluyveri, Saccharomyces norbensis*, or *Saccharomyces oviformis* polynucleotide.

In another aspect, the polynucleotide is an *Acremonium cellulolyticus, Aspergillus aculeatus, Aspergillus awamori,*

*Aspergillus foetidus, Aspergillus fumigatus, Aspergillus japonicus, Aspergillus nidulans, Aspergillus niger, Aspergillus oryzae, Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Thielavia achromatica, Thielavia albomyces, Thielavia albopilosa, Thielavia australeinsis, Thielavia fimeti, Thielavia microspora, Thielavia ovispora, Thielavia peruviana, Thielavia setosa, Thielavia spededonium, Thielavia subthermophila, Thielavia terrestris, Trichoderma harzianum, Trichoderma koningii, Trichoderma longibrachiatum, Trichoderma reesei*, or *Trichoderma viride* polynucleotide.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The polynucleotide may be identified and obtained from other sources including microorganisms isolated from nature (e.g., soil, composts, water, etc.) or DNA samples obtained directly from natural materials (e.g., soil, composts, water, etc.). Techniques for isolating microorganisms and DNA directly from natural habitats are well known in the art. The polynucleotide may then be obtained by similarly screening a genomic DNA or cDNA library of another microorganism or mixed DNA sample. Once a polynucleotide encoding a polypeptide has been detected, the polynucleotide can be isolated or cloned by utilizing techniques that are known to those of ordinary skill in the art (see, e.g., Sambrook et al., 1989, supra).

Polynucleotides

The present invention also relates to isolated polynucleotides or at least one one coding sequence of interest, preferably gene of interest encoding a polypeptide or an activity of interest, as well as to nucleic acid constructs, expression vectors and recombinant host cells comprising such polynucleotides.

The encoded polypeptide may be native or heterologous to a host cell. The term "protein" is not meant herein to refer to a specific length of the encoded product and, therefore, encompasses peptides, oligopeptides, and polypeptides. The term "protein" also encompasses two or more polypeptides combined to form the encoded product. The proteins also include hybrid polypeptides and fused polypeptides.

Preferably, the polypeptide or activity of interest encoded by the at least one coding sequence of interest, preferably one gene is a hormone, enzyme, receptor or portion thereof, antibody or portion thereof, or reporter. For example, the protein may be a hydrolase, isomerase, ligase, lyase, oxidoreductase, or transferase; more preferably the enzyme is an alpha-galactosidase, alpha-glucosidase, aminopeptidase, amylase, asparaginase, beta-galactosidase, beta-glucosidase, beta-xylosidase, carbohydrase, carboxypeptidase, catalase, cellobiohydrolase, cellulase, chitinase, cutinase, cyclodextrin glycosyltransferase, deoxyribonuclease, endoglucanase, esterase, green fluorescent protein, glucano-transferase, glucoamylase, invertase, laccase, lipase, mannosidase, mutanase, oxidase, pectinolytic enzyme, peroxidase, phytase, polyphenoloxidase, proteolytic enzyme, ribonuclease, transglutaminase, or a xylanase.

In another preferred embodiment, the at least one coding sequence of interest comprises one or several genes.

The at least one coding sequence of interest, preferably one gene of the present invention may be obtained from any prokaryotic, eukaryotic, or other source. The techniques used to isolate or clone a polynucleotide are known in the art and include isolation from genomic DNA or cDNA, or a combination thereof. The cloning of the polynucleotides from genomic DNA can be effected, e.g., by using the well-known polymerase chain reaction (PCR) or antibody screening of expression libraries to detect cloned DNA fragments with shared structural features. See, e.g., Innis et al., 1990, *PCR: A Guide to Methods and Application*, Academic Press, New York. Other nucleic acid amplification procedures such as ligase chain reaction (LCR), ligation activated transcription (LAT) and polynucleotide-based amplification (NASBA) may be used.

Modification of a polynucleotide encoding a polypeptide of the present invention may be necessary for synthesizing polypeptides substantially similar to the polypeptide. The term "substantially similar" to the polypeptide refers to non-naturally occurring forms of the polypeptide. These polypeptides may differ in some engineered way from the polypeptide isolated from its native source, e.g., variants that differ in specific activity, thermostability, pH optimum, or the like. The variants may be constructed on the basis of a polynucleotide, e.g., a subsequence thereof, and/or by introduction of nucleotide substitutions that do not result in a change in the amino acid sequence of the encoded polypeptide, but which correspond to the codon usage of the host organism intended for production of the enzyme, or by introduction of nucleotide substitutions that may give rise to a different amino acid sequence. For a general description of nucleotide substitution, see, e.g., Ford et al., 1991, *Protein Expression and Purification* 2: 95-107.

Nucleic Acid Constructs

The present invention also relates to nucleic acid constructs comprising a polynucleotide of the present invention operably linked to one or more control sequences that direct the expression of the coding sequence in a suitable host cell under conditions compatible with the control sequences.

The polynucleotide may be manipulated in a variety of ways to provide for expression of the polypeptide. Manipulation of the polynucleotide prior to its insertion into a vector may be desirable or necessary depending on the expression vector. The techniques for modifying polynucleotides utilizing recombinant DNA methods are well known in the art.

The control sequence may be a promoter, a polynucleotide that is recognized by a host cell for expression of a polynucleotide encoding a polypeptide of the present invention. The promoter contains transcriptional control sequences that mediate the expression of the polypeptide. The promoter may be any polynucleotide that shows transcriptional activity in the host cell including mutant, truncated, and hybrid promoters, and may be obtained from genes encoding extracellular or intracellular polypeptides either homologous or heterologous to the host cell.

Examples of suitable promoters for directing transcription of the nucleic acid constructs of the present invention in a bacterial host cell are the promoters obtained from the *Bacillus amyloliquefaciens* alpha-amylase gene (amyQ), *Bacillus licheniformis* alpha-amylase gene (amyL), *Bacillus licheniformis* penicillinase gene (penP), *Bacillus stearothermophilus* maltogenic amylase gene (amyM), *Bacillus subtilis* levansucrase gene (sacB), *Bacillus subtilis* xylA and xylB genes, *Bacillus thuringiensis* cryIIIA gene (Agaisse and Lereclus, 1994, *Molecular Microbiology* 13: 97-107), *E. coli* lac operon, *E. coli* trc promoter (Egon et al., 1988, *Gene* 69: 301-315), *Streptomyces coelicolor* agarase gene (dagA), and prokaryotic beta-lactamase gene (Villa-Kamaroff et al., 1978, *Proc. Natl. Acad. Sci. USA* 75: 3727-3731), as well as the tac promoter (DeBoer et al., 1983, *Proc. Natl. Acad. Sci. USA* 80: 21-25). Further promoters are described in "Useful proteins from recombinant bacteria" in Gilbert et al., 1980, *Scientific American* 242: 74-94; and in Sambrook et al., 1989, supra. Examples of tandem promoters are disclosed in WO 99/43835.

The control sequence may also be a transcription terminator, which is recognized by a host cell to terminate transcription. The terminator is operably linked to the 3'-terminus of the polynucleotide encoding the polypeptide. Any terminator that is functional in the host cell may be used in the present invention.

Preferred terminators for bacterial host cells are obtained from the genes for *Bacillus clausii* alkaline protease (aprH), *Bacillus licheniformis* alpha-amylase (amyL), and *Escherichia coli* ribosomal RNA (rrnB).

The control sequence may also be an mRNA stabilizer region downstream of a promoter and upstream of the coding sequence of a gene which increases expression of the gene.

Examples of suitable mRNA stabilizer regions are obtained from a *Bacillus thuringiensis* cryIIIA gene (WO 94/25612) and a *Bacillus subtilis* SP82 gene (Hue et al., 1995, *Journal of Bacteriology* 177: 3465-3471).

The control sequence may also be a signal peptide coding region that encodes a signal peptide linked to the N-terminus of a polypeptide and directs the polypeptide into the cell's secretory pathway. The 5'-end of the coding sequence of the polynucleotide may inherently contain a signal peptide coding sequence naturally linked in translation reading frame with the segment of the coding sequence that encodes the polypeptide. Alternatively, the 5'-end of the coding sequence may contain a signal peptide coding sequence that is foreign to the coding sequence. A foreign signal peptide coding sequence may be required where the coding sequence does not naturally contain a signal peptide coding sequence. Alternatively, a foreign signal peptide coding sequence may simply replace the natural signal peptide coding sequence in order to enhance secretion of the polypeptide. However, any signal peptide coding sequence that directs the expressed polypeptide into the secretory pathway of a host cell may be used.

Effective signal peptide coding sequences for bacterial host cells are the signal peptide coding sequences obtained from the genes for *Bacillus* NCIB 11837 maltogenic amylase, *Bacillus licheniformis* subtilisin, *Bacillus licheniformis* beta-lactamase, *Bacillus stearothermophilus* alpha-amylase, *Bacillus stearothermophilus* neutral proteases (nprT, nprS, nprM), and *Bacillus subtilis* prsA. Further signal peptides are described by Simonen and Palva, 1993, *Microbiological Reviews* 57: 109-137.

The control sequence may also be a propeptide coding sequence that encodes a propeptide positioned at the N-terminus of a polypeptide. The resultant polypeptide is known as a proenzyme or propolypeptide (or a zymogen in some cases). A propolypeptide is generally inactive and can be converted to an active polypeptide by catalytic or autocatalytic cleavage of the propeptide from the propolypeptide. The propeptide coding sequence may be obtained from the genes for *Bacillus subtilis* alkaline protease (aprE), *Bacillus subtilis* neutral protease (nprT), *Myceliophthora thermophila* laccase (WO 95/33836), *Rhizomucor miehei* aspartic proteinase, and *Saccharomyces cerevisiae* alpha-factor.

Where both signal peptide and propeptide sequences are present, the propeptide sequence is positioned next to the N-terminus of a polypeptide and the signal peptide sequence is positioned next to the N-terminus of the propeptide sequence.

It may also be desirable to add regulatory sequences that regulate expression of the polypeptide relative to the growth of the host cell. Examples of regulatory sequences are those that cause expression of the gene to be turned on or off in response to a chemical or physical stimulus, including the presence of a regulatory compound. Regulatory sequences in prokaryotic systems include the lac, tac, and trp operator systems. Other examples of regulatory sequences are those that allow for gene amplification.

Expression Vectors

The present invention also relates to recombinant expression vectors comprising a polynucleotide of the present invention, a promoter, and transcriptional and translational stop signals. The various nucleotide and control sequences may be joined together to produce a recombinant expression vector that may include one or more convenient restriction sites to allow for insertion or substitution of the polynucleotide encoding the polypeptide at such sites. Alternatively, the polynucleotide may be expressed by inserting the polynucleotide or a nucleic acid construct comprising the polynucleotide into an appropriate vector for expression. In creating the expression vector, the coding sequence is located in the vector so that the coding sequence is operably linked with the appropriate control sequences for expression.

The recombinant expression vector may be any vector (e.g., a plasmid or virus) that can be conveniently subjected to recombinant DNA procedures and can bring about expression of the polynucleotide. The choice of the vector will typically depend on the compatibility of the vector with the host cell into which the vector is to be introduced. The vector may be a linear or closed circular plasmid.

The vector may be one that, when introduced into the host cell, is integrated into the genome and replicated together with the chromosome(s) into which it has been integrated. The vector preferably contains one or more selectable markers that permit easy selection of transformed, transfected, transduced, or the like cells. A selectable marker is a gene the product of which provides for biocide or viral resistance, resistance to heavy metals, prototrophy to auxotrophs, and the like.

Examples of bacterial selectable markers are *Bacillus licheniformis* or *Bacillus subtilis* dal genes, or markers that confer antibiotic resistance such as ampicillin, chloramphenicol, kanamycin, neomycin, spectinomycin, or tetracycline resistance.

The vector preferably contains an element(s) that permits integration of the vector into the host cell's genome or autonomous replication of the vector in the cell independent of the genome.

For integration into the recipient host cell genome, the vector may rely on the polynucleotide's sequence encoding the polypeptide or any other element of the vector for integration into the genome by homologous or non-homologous recombination. Alternatively, the vector may contain additional polynucleotides for directing integration by homologous recombination into the genome of the recipient host cell at a precise location(s) in the chromosome(s). To increase the likelihood of integration at a precise location, the integrational elements should contain a sufficient number of nucleic acids, such as 100 to 10,000 base pairs, 400 to 10,000 base pairs, and 800 to 10,000 base pairs, which have a high degree of sequence identity to the corresponding target sequence to enhance the probability of homologous recombination. The integrational elements may be any sequence that is homologous with the target sequence in the genome of the host cell. Furthermore, the integrational elements may be non-encoding or encoding polynucleotides. On the other hand, the vector may be integrated into the genome of the host cell by non-homologous recombination.

In a preferred embodiment of the first and second aspects of the invention, the flanking polynucleotide regions derived from the chromosome of the recipient cell comprise at least 100 nucleotides, more preferably at least 150, 200, 250, 300, 350, 400, 450, 500, 550, 600, 650, 700, 750, 800, 850, 900, 950, 1,000 nucleotides, most preferably they comprise between 100-5,000 nucleotides, between 100-4,000 nucleotides, between 100-3,000 nucleotides, between 100-2,000 nucleotides, between 100-1,000 nucleotides or between 1,000-10,000 nucleotides. It is preferred that each flanking polynucleotide region derived from the chromosome of the recipient cell are at least 80% identical to the corresponding region in the chromosome of the recipient cell; preferably at least 85%, 90%, 92%, 94%, 96%, 98% or at least 99% identical to the corresponding region in the chromosome of the recipient cell.

For autonomous replication, the vector may further comprise an origin of replication enabling the vector to replicate autonomously in the host cell in question. The origin of replication may be any plasmid replicator mediating autonomous replication that functions in a cell. The term "origin of replication" or "plasmid replicator" means a polynucleotide that enables a plasmid or vector to replicate in vivo.

Examples of bacterial origins of replication are the origins of replication of plasmids pBR322, pUC19, pACYC177, and pACYC184 permitting replication in *E. coli*, and pUB110, pE194, pTA1060, and pAMβ1 permitting replication in *Bacillus*.

More than one copy of a polynucleotide of the present invention may be inserted into a host cell to increase production of a polypeptide. An increase in the copy number of the polynucleotide can be obtained by integrating at least one additional copy of the sequence into the host cell genome or by including an amplifiable selectable marker gene with the polynucleotide where cells containing amplified copies of the selectable marker gene, and thereby additional copies of the polynucleotide, can be selected for by cultivating the cells in the presence of the appropriate selectable agent.

The procedures used to ligate the elements described above to construct the recombinant expression vectors of the present invention are well known to one skilled in the art (see, e.g., Sambrook et al., 1989, supra).

Host Cells

The present invention also relates to prokaryotic donor and/or recipient host cells, comprising a polynucleotide of interest of the present invention. Chromosomal DNA of a donor cell comprising a polynucleotide of interest is introduced into a recipient cell as described herein. The term "host cell" encompasses any progeny of a parent cell that is not identical to the parent cell due to mutations that occur during replication. The choice of a host cell will to a large extent depend upon the gene encoding the polypeptide and its source.

The prokaryotic donor and/or recipient host cell may be any Gram-positive or Gram-negative bacterium. Gram-positive bacteria include, but are not limited to, *Bacillus, Clostridium, Enterococcus, Geobacillus, Lactobacillus, Lactococcus, Oceanobacillus, Staphylococcus, Streptococcus*, and *Streptomyces*. Gram-negative bacteria include, but are not limited to, *Campylobacter, E. coli, Flavobacterium, Fusobacterium, Helicobacter, Ilyobacter, Neisseria, Pseudomonas, Salmonella*, and *Ureaplasma*.

The bacterial donor and/or recipient host cell may be any *Bacillus* cell including, but not limited to, *Bacillus alkalophilus, Bacillus amyloliquefaciens, Bacillus brevis, Bacillus circulans, Bacillus clausii, Bacillus coagulans, Bacillus firmus, Bacillus lautus, Bacillus lentus, Bacillus licheniformis, Bacillus megaterium, Bacillus pumilus, Bacillus stearothermophilus, Bacillus subtilis*, and *Bacillus thuringiensis* cells. In some embodiments, the host cell is mecA-disrupted. Preferably, the recipient cell is a *Bacillus* mecA-disrupted cell and most preferably the recipient cells is a *B. licheniformis* mecA-disrupted cell as employed in the examples below.

The bacterial donor and/or recipient cell host cell may also be any *Streptococcus* cell including, but not limited to, *Streptococcus equisimilis, Streptococcus pyogenes, Streptococcus uberis*, and *Streptococcus equi* subsp. *Zooepidemicus* cells.

The bacterial donor and/or recipient host cell may also be any *Streptomyces* cell including, but not limited to, *Streptomyces achromogenes, Streptomyces avermitilis, Streptomyces coelicolor, Streptomyces griseus*, and *Streptomyces lividans* cells.

In some preferred embodiments, the donor host cell is *Bacillus subtilis* and the recipient host cell is *Bacillus licheniformis*. In some embodiments, the donor host cell is *E. coli* and the recipient host cell is a *Bacillus* cell, such as *Bacillus subtilis* or *Bacillus licheniformis*.

The introduction of DNA into a *Bacillus* cell may be effected by protoplast transformation (see, e.g., Chang and Cohen, 1979, *Mol. Gen. Genet.* 168: 111-115), competent cell transformation (see, e.g., Young and Spizizen, 1961, *J. Bacteriol.* 81: 823-829, or Dubnau and Davidoff-Abelson, 1971, *J. Mol. Biol.* 56: 209-221), electroporation (see, e.g., Shigekawa and Dower, 1988, *Biotechniques* 6: 742-751), or conjugation (see, e.g., Koehler and Thorne, 1987, *J. Bacteriol.* 169: 5271-5278). The introduction of DNA into an *E. coli* cell may be effected by protoplast transformation (see, e.g., Hanahan, 1983, *J. Mol. Biol.* 166: 557-580) or electroporation (see, e.g., Dower et al., 1988, *Nucleic Acids Res.* 16: 6127-6145). The introduction of DNA into a *Streptomyces* cell may be effected by protoplast transformation, electroporation (see, e.g., Gong et al., 2004, *Folia Microbiol.* (*Praha*) 49: 399-405), conjugation (see, e.g., Mazodier et al., 1989, *J. Bacteriol.* 171: 3583-3585), or transduction (see, e.g., Burke et al., 2001, *Proc. Natl. Acad. Sci. USA* 98: 6289-6294). The introduction of DNA into a *Pseudomonas* cell may be effected by electroporation (see, e.g., Choi et al., 2006, *J. Microbiol. Methods* 64: 391-397) or conjugation (see, e.g., Pinedo and Smets, 2005, *Appl. Environ. Microbiol.* 71: 51-57). The introduction of DNA into a *Streptococcus* cell may be effected by natural competence (see, e.g., Perry and Kuramitsu, 1981, *Infect. Immun.* 32: 1295-1297), protoplast transformation (see, e.g., Catt and Jollick, 1991, *Microbios* 68: 189-207), electroporation (see, e.g., Buckley et al., 1999, *Appl. Environ. Microbiol.* 65: 3800-3804), or conjugation (see, e.g., Clewell, 1981, *Microbiol. Rev.* 45: 409-436). However, any method known in the art for introducing DNA into a host cell can be used.

Methods of Screening

In the area of industrial biotechnology, especially in relation to secreted polypeptides, such as, enzymes, *Bacillus subtilis* is by far the preferred host microorganism when new genes are to be cloned and screened. This is because of the high transformation and recombination frequencies in this species, which allow quick and easy transformation of a gene into the *B. subtilis* host and integration into its chromosome for subsequent screening.

It is well known that these high frequencies also allow easy transfer of genes from one *B. subtilis* to another by simple transformation with chromosomal DNA. However, *B. subtilis* is not necessarily the most preferred expression host once a gene of interest has been identified in a screening process and, unfortunately, it is very often difficult and cumbersome to transfer chromosomally-integrated heterologous DNA further on to other species desired for industrial expression, for example, to a *Bacillus licheniformis* host.

Accordingly, in a preferred embodiment of the first aspect of the invention, the at least one coding sequence of interest, preferably one gene of interest comprises a gene library, and wherein said method comprises the additional first steps of:

i) screening the gene library for an encoded activity while it resides in the chromosome of the prokaryotic donor cell, and
ii) selecting a prokaryotic donor clone of interest, before chromosomal DNA of the clone of interest is provided and transformed into the recipient cell in accordance with steps a)-c) of the method of the first aspect.

In a second aspect, the invention relates to a method of screening a gene library for an encoded activity of interest, said method comprising the steps of:

a) providing a prokaryotic donor cell comprising in its chromosome a polynucleotide of interest which in turn comprises the gene library and a selectable marker, wherein said polynucleotide of interest is flanked on each side by a polynucleotide region derived from the chromosome of a recipient prokaryotic cell of another species, and wherein the flanking polynucleotide regions are of sufficient size and sequence identity to allow double homologous recombination with the corresponding regions in the chromosome of the recipient cell;
b) screening the gene library for an encoded activity while it resides in the chromosome of the prokaryotic donor cell and selecting a prokaryotic donor clone of interest,
c) providing chromosomal DNA from the clone cell of step (b);
d) transforming the recipient cell with the DNA from step (c); and
e) selecting a successfully transformed recipient cell, wherein the polynucleotide of interest comprising the selectable marker has been integrated into its chromosome.

Preferably the selectable marker has been integrated into the chromosome in step (e) via homologous recombination between the flanking regions in the DNA and their corresponding chromosomal regions in the recipient cell.

Methods of Production

The present invention also relates to methods of producing a polypeptide of the present invention, comprising (a) cultivating a successfully transformed prokaryotic recipient cell under conditions conducive for production of the polypeptide; and optionally, (b) recovering the polypeptide.

The host cells are cultivated in a nutrient medium suitable for production of the polypeptide using methods known in the art. For example, the cells may be cultivated by shake flask cultivation, or small-scale or large-scale fermentation (including continuous, batch, fed-batch, or solid state fermentations) in laboratory or industrial fermentors in a suitable medium and under conditions allowing the polypeptide to be expressed and/or isolated. The cultivation takes place in a suitable nutrient medium comprising carbon and nitrogen sources and inorganic salts, using procedures known in the art. Suitable media are available from commercial suppliers or may be prepared according to published compositions (e.g., in catalogues of the American Type Culture Collection). If the polypeptide is secreted into the nutrient medium, the polypeptide can be recovered directly from the medium. If the polypeptide is not secreted, it can be recovered from cell lysates.

The polypeptide may be detected using methods known in the art that are specific for the polypeptides. These detection methods include, but are not limited to, use of specific antibodies, formation of an enzyme product, or disappearance of an enzyme substrate. For example, an enzyme assay may be used to determine the activity of the polypeptide.

The polypeptide may be recovered using methods known in the art. For example, the polypeptide may be recovered from the nutrient medium by conventional procedures including, but not limited to, collection, centrifugation, filtration, extraction, spray-drying, evaporation, or precipitation. In one aspect, a fermentation broth comprising the polypeptide is recovered.

The polypeptide may be purified by a variety of procedures known in the art including, but not limited to, chromatography (e.g., ion exchange, affinity, hydrophobic, chromatofocusing, and size exclusion), electrophoretic procedures (e.g., preparative isoelectric focusing), differential solubility (e.g., ammonium sulfate precipitation), SDS-PAGE, or extraction (see, e.g., *Protein Purification*, Janson and Ryden, editors, VCH Publishers, New York, 1989) to obtain substantially pure polypeptides.

In an alternative aspect, the polypeptide is not recovered, but rather a host cell of the present invention expressing the polypeptide is used as a source of the polypeptide.

Fermentation Broth Formulations or Cell Compositions

The present invention also relates to a fermentation broth formulation or a cell composition comprising a successfully transformed prokaryotic recipient cell of the present invention. The fermentation broth product further comprises additional ingredients used in the fermentation process, such as, for example, cells (including, the host cells containing the gene encoding the polypeptide of the present invention which are used to produce the polypeptide of interest), cell debris, biomass, fermentation media and/or fermentation products. In some embodiments, the composition is a cell-killed whole broth containing organic acid(s), killed cells and/or cell debris, and culture medium.

The term "fermentation broth" as used herein refers to a preparation produced by cellular fermentation that undergoes no or minimal recovery and/or purification. For example, fermentation broths are produced when microbial cultures are grown to saturation, incubated under carbon-limiting conditions to allow protein synthesis (e.g., expression of enzymes by host cells) and secretion into cell culture medium. The fermentation broth can contain unfractionated or fractionated contents of the fermentation materials derived at the end of the fermentation. Typically, the fermentation broth is unfractionated and comprises the spent culture medium and cell debris present after the microbial cells (e.g., filamentous fungal cells) are removed, e.g., by centrifugation. In some embodiments, the fermentation broth contains spent cell culture medium, extracellular enzymes, and viable and/or nonviable microbial cells.

In an embodiment, the fermentation broth formulation and cell compositions comprise a first organic acid component comprising at least one 1-5 carbon organic acid and/or a salt thereof and a second organic acid component comprising at least one 6 or more carbon organic acid and/or a salt thereof. In a specific embodiment, the first organic acid component is acetic acid, formic acid, propionic acid, a salt thereof, or a mixture of two or more of the foregoing and the second organic acid component is benzoic acid, cyclohexanecarboxylic acid, 4-methylvaleric acid, phenylacetic acid, a salt thereof, or a mixture of two or more of the foregoing.

In one aspect, the composition contains an organic acid(s), and optionally further contains killed cells and/or cell debris. In one embodiment, the killed cells and/or cell debris are removed from a cell-killed whole broth to provide a composition that is free of these components.

The fermentation broth formulations or cell compositions may further comprise a preservative and/or anti-microbial (e.g., bacteriostatic) agent, including, but not limited to, sorbitol, sodium chloride, potassium sorbate, and others known in the art.

The cell-killed whole broth or composition may contain the unfractionated contents of the fermentation materials derived at the end of the fermentation. Typically, the cell-killed whole broth or composition contains the spent culture medium and cell debris present after the microbial cells (e.g., filamentous fungal cells) are grown to saturation, incubated under carbon-limiting conditions to allow protein synthesis. In some embodiments, the cell-killed whole broth or composition contains the spent cell culture medium, extracellular enzymes, and killed filamentous fungal cells. In some embodiments, the microbial cells present in the cell-killed whole broth or composition can be permeabilized and/or lysed using methods known in the art.

A whole broth or cell composition as described herein is typically a liquid, but may contain insoluble components, such as killed cells, cell debris, culture media components, and/or insoluble enzyme(s). In some embodiments, insoluble components may be removed to provide a clarified liquid composition.

The whole broth formulations and cell compositions of the present invention may be produced by a method described in WO 90/15861 or WO 2010/096673.

The following examples are provided by way of illustration and are not intended to be limiting of the invention.

EXAMPLES

The following examples provide a description of a series of DNA constructions that have been carried out. In examples 1 through 6 constructions were made in *B. subtilis*, wherein the two antibiotic resistance markers erm and spc are flanked by 5.5 kb *B. licheniformis* DNA from the arabinose operon and inserted in the arabinose operon on the chromosome of *B. subtilis*. These constructions were made in three sequential steps by first using the cat marker to delete a part of the ara operon in *B. subtilis*; then replacing the cat marker with the erm marker and the first flanking region of the *B. licheniformis* arabinose region and, finally, in the third step introducing the spc marker together with the second flanking region of the *B. licheniformis* arabinose operon to create the final construct for the transformation experiment described in example 15.

In examples 7 and 8 the erm and spc markers from example 6 were replaced with the cat marker to prepare for integration of the expression cassette with the aprH and spc genes.

In examples 9 and 10 the cat marker was replaced with the aprH expression cassette and the spc marker gene to create the final construct for the transformation experiment in example 16.

Materials and Methods

Media

*Bacillus* strains were grown on TBAB (Tryptose Blood Agar Base, Difco Laboratories, Sparks, Md., USA) or LB agar (10 g/l Tryptone, 5 g/l yeast extract, 5 g/l NaCl, 15 g/l agar) plates or in LB liquid medium (10 g/l Tryptone, 5 g/l yeast extract, 5 g/l NaCl).

To select for erythromycin resistance, agar media were supplemented with 1 μg/ml erythromycin+25 μg/ml lincomycin and liquid media were supplemented with 5 μg/ml erythromycin. To select for spectinomycin resistance, agar media were supplemented with 120 μg/ml spectinomycin. To select for chloramphenicol resistance, agar and liquid media were supplemented with 6 μg/ml chloramphenicol.

To screen for protease phenotypes agar plates were supplemented with 1% skim milk to allow halos to form around the colonies that produce protease.

Spizizen I medium consists of 1× Spizizen salts (6 g/l $KH_2PO_4$, 14 g/l $K_2HPO_4$, 2 g/l $(NH_4)_2SO_4$, 1 g/l sodium citrate, 0.2 g/l $MgSO_4$, pH 7.0), 0.5% glucose, 0.1% yeast extract, and 0.02% casein hydrolysate.

Spizizen I-xyl medium consists of 1× Spizizen salts (6 g/l $KH_2PO_4$, 14 g/l $K_2HPO_4$, 2 g/l $(NH_4)_2SO_4$, 1 g/l sodium citrate, 0.2 g/l $MgSO_4$, pH 7.0), 1% xylose, 0.1% yeast extract, and 0.02% casein hydrolysate.

Spizizen II medium consists of Spizizen I medium supplemented with 0.5 mM $CaCl_2$, and 2.5 mM $MgCl_2$.

Spizizen II-xyl medium consists of Spizizen I-xyl medium supplemented with 0.5 mM $CaCl_2$, and 2.5 mM $MgCl_2$.

Strains

PL1801: This strain is the *B. subtilis* DN1885 with disrupted aprE and nprE genes encoding the alkaline protease and neutral protease respectively (Diderichsen, B., Wedsted, U., Hedegaard, L., Jensen, B. R., Sjøholm, C. (1990) Cloning of aldB, which encodes alpha-acetolactate decarboxylase, an exoenzyme from *Bacillus brevis*. J. Bacteriol., 172, 4315-4321).

A164: This strain is a *B. subtilis* wild type isolate (ATCC 6051a) 16844: This strain derived from the *Bacillus subtilis* type strain 168 (BGSC 1A1, *Bacillus* Genetic Stock Center, Columbus, Ohio, USA) and has deletions in the spoIIAC, aprE, nprE, and amyE genes. The deletion of these four genes was performed essentially as described for *Bacillus subtilis* A164Δ5, which is described in detail in U.S. Pat. No. 5,891,701.

JA1343: This strain is the *B. subtilis* PL1801 with a disrupted spoIIAC gene (sigF). The genotype is: aprE, nprE, amyE, spoIIAC.

JA1622: This strain is the *B. subtilis* 168 derivative JA578 described in WO 0200907 A1 with a disrupted spoIIAC gene (sigF). The genotype is: amyE::repF (pE194), spoIIAC.

SJ1904: This strain is a *B. licheniformis* strain described in WO 08066931 A2. The gene encoding the alkaline protease (aprL) is inactivated.

MOL2999: This strain is the *B. subtilis* JA1622 where a chloramphenicol marker gene (cat) from pC194 is inserted into the arabinose operon (see example 1 and 2)

MOL3030: A 4.6 kb fragment of the arabinose operon from *B. licheniformis* SJ1904 is inserted into the arabinose operon of *B. subtilis* MOL2999. The arabinose operon fragment from *B. licheniformis* is inserted with an antibiotic marker gene erm (erythromycin marker). The integration event at the same time deletes the cat gene (see example 3 and 4).

MOL3034: *B. subtilis* MOL3030 into which a 5.5 kb fragment of the arabinose operon from *B. licheniformis* SJ1904 was inserted into the arabinose operon. The arabinose operon fragment from *B. licheniformis* was inserted with an antibiotic marker gene spc (spectinomycin marker). The strain is resistant to erythromycin and spectinomycin (see examples 5 and 6).

MOL3041: The erm and spc markers in *B. subtilis* MOL3034 are replaced with the cat marker. The cat marker is flanked by the two 5.5 kb fragments from *B. licheniformis* SJ1904 (see examples 7 and 8).

MOL3053: *B. subtilis* MOL3041 wherein the cat marker was replaced with a spc marker and an expression cassette holding the aprH protease gene from *B. clausii* (see examples 9 and 10).

MDT101: This strain is the *B. subtilis* 16844 wherein the *Bacillus licheniformis* M.Bli1904II DNA methyltransferase gene was inserted into the chromosome at the amyE locus in order to express the methyltransferase, thereby allowing *B. licheniformis* type of methylation of DNA in this *B. subtilis* host (U.S. Pat. No. 8,389,283 B2). The cat marker is co-inserted at the amyE locus.

AEB708: This strain is the JA1343 *B. subtilis* strain where the M.Bli1904II DNA methyltransferase gene described for MDT101 is inserted at the amyE locus by chromosomal transformation. Chromosomal DNA from MDT101 was transformed to competent JA1343 selecting for the cat marker.

MOL3037: *B. subtilis* AEB708 into which the chromosomal fragment from *B. subtilis* MOL3034 including the spc- and erm markers as well as the *B. licheniformis* DNA fragments were successfully transferred via a transformation with chromosomal DNA from MOL3034. This strain expresses the *Bacillus licheniformis* M.Bli1904II DNA methyltransferase (see example 11).

MOL3055: *B. subtilis* AEB708 into which a chromosomal fragment from *B. subtilis* MOL3053 including the spc marker, aprH expression cassette and *B. licheniformis* DNA fragments were successfully transferred via a transformation with chromosomal DNA from MOL3053. This strain expresses the *Bacillus licheniformis* M.Bli1904II DNA methyltransferase (see example 12).

TaHy9: *B. licheniformis* SJ1904 with a mecA deletion as described in example 13.

MDT232: *B. licheniformis* SJ1904 with a spectinomycin marker at the glpD locus (WO2008/079895)

Plasmids pC194: Plasmid isolated from *Staphylococcus aureus* (Horinouchi and Weisblum, 1982, J. Bacteriol. 150(2):815).

pE194: Plasmid isolated from *Staphylococcus aureus* (Horinouchi and Weisblum, 1982, J. Bacteriol. 1982, 150 (2):804).

pCR2.1-TOPO: Plasmid purchased from Invitrogen pBM293: Plasmid construction from example 7.

pNNB194: Plasmid (U.S. Pat. No. 5,958,728)

pBM294: Plasmid used for mecA deletion in *B. licheniformis* SJ1904 in example 7.

pSJ3358: pUC derived plasmid with spectinomycin marker from Tn554 (WO 96/23073)

pSJ3372: pUC derived plasmid with chloramphenicol marker from pC194 (U.S. Pat. No. 5,552,888)

Primers

TABLE 1

Primer and sequence overview

| Primer No./Seq. | SEQ ID NO | Nucleotide sequence 5'→ |
|---|---|---|
| 20984 | 1 | cactcccgagaggagaagtgctggctg |
| 20985 | 2 | cagccagcacttctcctctcgggagtgggagctgtaatataaaaaccttc |
| 20990 | 3 | gtcaatcttttcttttaaaaaaagc |
| 20991 | 4 | gctttttttaaaagaaaagattgacgcaaagacgcatgtgttttggtttg |
| 23658 | 5 | gctttttttaaaagaaaagattgacaacaaacgaaaattggataaagtgg |
| 24484 | 6 | cagccgtccatccttgcagagtc |
| 24485 | 7 | gtccagcagatctcttggaaggc |
| 24486 | 8 | cacgcttcttttaagtacggag |
| 24487 | 9 | ccgcttcttctggtaatagaagc |
| 27094 | 10 | ctgcgcaaaagacataatcgattc |
| 27095 | 11 | ttcaataatcgcatccgattgcag |
| 27096 | 12 | ttcaataatcgcatccgattgcag |
| 30007 | 13 | aatgctgctcggtatgacccttgcc |

TABLE 1 -continued

Primer and sequence overview

| Primer No./Seq. | SEQ ID NO | Nucleotide sequence 5'→ |
|---|---|---|
| 30008 | 14 | caaacgcaggaggatgcggagcc |
| 30009 | 15 | gaatcgattatgtcttttgcgcagtttcctggaatgtgatccgcctg |
| 30011 | 16 | tgctttcgaagcattagacgtggatg |
| 30013 | 17 | ttcaacactcgttgatgccgatc |
| 30017 | 18 | gttttaaaagtaagcacctgttggtgctataaaattagcctaattgag |
| 30018 | 19 | gacggcaggctgacggctcaccttctttcctggaatgtgatccgcctg |
| 30019 | 20 | ccaacaggtgcttacttttaaaactacgtcatgctggttctcgaccattc |
| 30020 | 21 | gaaggtgagccgtcagcctgccgtc |
| 30590 | 22 | gaatcgattatgtcttttgcgcagccaatctagggtaagtaaattgag |
| 33128 | 23 | cataatgatataatgaagttgttcg |
| 33129 | 24 | cgccgatacgcctcatccactctgcc |
| 33132 | 25 | caagcgccgcagaacatggtagccgc |
| 33133 | 26 | ggttgataatgaactgtgctgattac |
| 35876 | 27 | ggaagcgcttgatcaatgtcttgactaaggttaaggtggatacacatc |
| 35878 | 28 | cgcgtggtacccggggatcctctagcatgctggttctcgaccattcaag |
| 35880 | 29 | cgtagacggcaaggcccgtatcc |
| 35881 | 30 | gtgcagttctctcgtcgatgtccgg |
| 35893 | 31 | cagtgaattctgatcaaatggttc |
| 35894 | 32 | gaaccatttgatcagaattcactggtcaagacattgatcaagcgcttcc |
| 35895 | 33 | gatgtgtatccaccttaacttagtcaagacattgatcaagcgcttcc |
| 36001 | 34 | caacgaaatttataagacgggc |
| 36002 | 35 | gcccgtcttataaatttcgttgatgctggttctcgaccattcaag |
| 36817 | 36 | gaaaacaagagcgtcagcacgg |
| 36818 | 37 | caggtgaggaaatcgcgacagctg |
| 39171 | 38 | gttcgggttcttcaaatatttctcc |
| 39950 | 39 | gaacgttgcggtacctgatctagatctcgggttcttcaaatatttctcc |
| 39951 | 40 | gatctagatcaggtaccgcaacgttc |
| 656520 | 41 | ctagaggatccccgggtaccacgcg |
| 0612056 | 42 | gaattccattaatagctgctg |
| 0612057 | 43 | tccatactctttcagcatggtcttcgatatcaccgt |
| 0612058 | 44 | acggtgatatcgaagaccatgctgaaagagtatgga |
| 0612060 | 45 | ctcgagcgcatcctcccaaaatc |

Molecular Biological Methods

DNA manipulations and transformations were performed by standard molecular biology methods as described in:

Sambrook et al. (1989): Molecular cloning: A laboratory manual. Cold Spring Harbor laboratory, Cold Spring Harbor, N.Y.

Ausubel et al. (eds) (1995): Current protocols in Molecular Biology. John Wiley and Sons.

Harwood and Cutting (eds) (1990): Molecular Biological Methods for *Bacillus*. John Wiley and Sons.

Enzymes for DNA manipulation were obtained from New England Biolabs, Inc. and used essentially as recommended by the supplier.

Competent cells and transformation of *B. subtilis* was obtained as described in Yasbin et al. (1975): Transformation and transfection in lysogenic strains of *Bacillus subtilis*:

evidence for selective induction of prophage in competent cells. *J. Bacteriol.* 121, 296-304.

Competent cells and transformation of *B. licheniformis* was performed as described in Example 8.

Genomic DNA was prepared from several erythromycin/lincomycin sensitive isolates above accordingly to the method previously described (Pitcher et. al, supra) or by using the commercial available QIAamp DNA Blood Kit from Qiagen.

Example 1. Obtaining a SOE-PCR Fragment with Flanking Ara Regions for Integration of a Cat Gene and Deletion of araA-araB-araD-araL-araM in *B. subtilis* JA1622

By performing SOE-PCR with the primers and templates listed in Table 2, the cat marker was flanked by an upstream and downstream region of the ara operon from *B. subtilis* *A*164. The entire SOE-PCR fragment is depicted in FIG. 1. The nucleotide sequence of the fragment can be found in SEQ ID NO:46.

The conditions for the PCR were as follows: The respective DNA fragments were amplified by PCR using the Phusion Hot Start DNA Polymerase system (Thermo Scientific). The PCR amplification reaction mixture contained 1 μl (~0.1 μg) of template DNA, 2 μl of sense primer (20 pmol/μl), 2 μl of anti-sense primer (20 pmol/μl), 10 μl of 5λ PCR buffer with 7.5 mM $MgCl_2$, 8 μl of dNTP mix (1.25 mM each), 37 μl water, and 0.5 μl (2 U/μl) DNA polymerase mix. A thermocycler was used to amplify the fragment. The PCR products were purified from a 1.2% agarose gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) using the Phusion Hot Start DNA Polymerase system (Thermo Scientific) as follows. The PCR amplification reaction mixture contained 50 ng of each of the three gel purified PCR products. The two nested SOE primers 24485 and 24487 was added at 2 μl (20 pmol/μl) and a thermocycler was used to assemble and amplify the SOE fragment of 6883 bp (FIG. 1). The resulting PCR product was used directly for transformation to *B. subtilis* host JA1622.

TABLE 2

SOE-PCR strategy for inserting the cat gene into the ara operon of JA1622

| 1. PCRs | | | | SOE-PCR | |
|---|---|---|---|---|---|
| Fragments | Template DNA from | Primers | Size (bp) | Primers | Size (bp) |
| ara fragment upstream | A164 chr DNA | 24486 & 20991 | 2982 | 24487 & 24485 | 6883 |
| cat gene | pC194 plasmid | 23658 & 20985 | 949 | | |
| ara fragment downstream | A164 chr DNA | 20984 & 24484 | 3048 | | |

Example 2. Transforming the SOE-PCR Fragment Described in Example 1 into *B. subtilis* JA 1622

The SOE-PCR fragment with the cat gene flanked by ara regions obtained in Example 1 was transformed into host strain *B. subtilis* JA1622, and transformants were selected for resistance against chloramphenicol, since the cat gene on the SOE-PCR fragment renders the strain resistant to this antibiotic. Correct insertion of the fragment was selected as chloramphenicol resistant transformants. Transformants were subsequently tested by PCR amplification of chromosomal DNA and sequencing of the resulting PCR fragment using appropriate primers. One correct strain was named MOL2999.

Example 3. Obtaining a SOE-PCR Fragment with Flanking Ara Regions for Integration of an erm Gene in *B. subtilis* MOL2999 and Insertion of a 4.6 kb Region of the Ara Operon from *B. licheniformis* SJ1904

Figure 2:
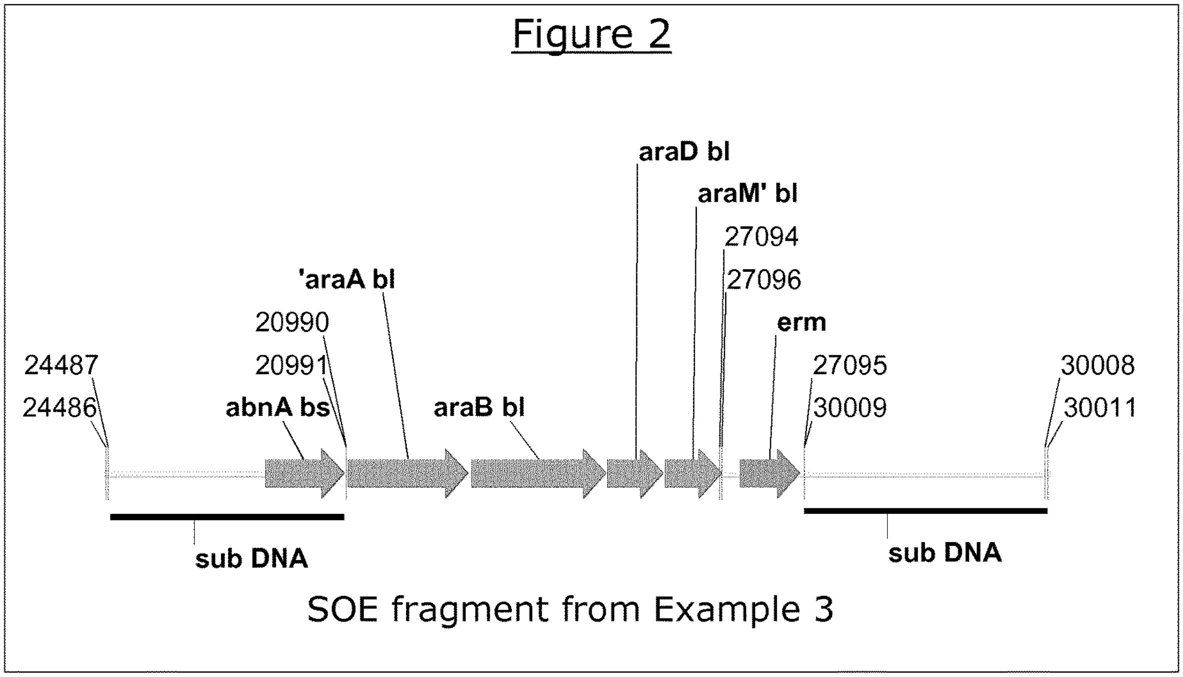
FIG. 2 shows the SOE-fragment from example 3 with positions of genes and primers.

By performing SOE-PCR with the primers and templates listed in Table 3, the erm resistance marker and a 4.6 kb region of the ara operon from *B. licheniformis* SJ1904 was flanked by an upstream and downstream region of the ara operon from *B. subtilis* A164. The entire SOE-PCR fragment is depicted in FIG. 2. The nucleotide sequence of the fragment can be found in SEQ ID NO:47.

The conditions for the PCR were as follows: The respective DNA fragments were amplified by PCR using the Phusion Hot Start DNA Polymerase system (Thermo Scientific). The PCR amplification reaction mixture contained 1 μl (~0.1 μg) of template DNA, 2 μl of sense primer (20 pmol/μl), 2 μl of anti-sense primer (20 pmol/μl), 10 μl of 5×PCR buffer with 7.5 mM $MgCl_2$, 8 μl of dNTP mix (1.25 mM each), 37 μl water, and 0.5 μl (2 U/μl) DNA polymerase mix. A thermocycler was used to amplify the fragment. The PCR products were purified from a 1.2% agarose gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) and the Phusion Hot Start DNA Polymerase system (Thermo Scientific) as follows: The PCR amplification reaction mixture contained 50 ng of each of the four gel purified PCR products. The two nested SOE primers 24487 and 30008 were added at 2 μl (20 pmol/μl) and a thermocycler was used to assemble and amplify the SOE fragment of 9629 bp according to established PCR procedures (FIG. 2). The resulting PCR product was used directly for transformation to *B. subtilis* host MOL2999.

TABLE 3

SOE-PCR strategy for inserting the erm gene and a 4.6 kb ara region from *B. licheniformis* SJ1904 into the ara operon of *B. subtilis* MOL2999

| 1. PCRs | | | | SOE-PCR | |
|---|---|---|---|---|---|
| Fragments | Template DNA from | Primers | Size (bp) | Primers | Size (bp) |
| ara fragment upstream | A164 chr DNA | 24486 & 20991 | 2982 | 24487 & 30008 | 9629 |
| 4.6 kb fragment from SJ1904 | SJ1904 chr DNA | 20990 & 27094 | 4640 | | |
| erm gene | pE194 | 27096 & 27095 | 1042 | | |
| ara fragment downstream | A164 chr DNA | 30009 & 30011 | 3022 | | |

Example 4. Transforming the SOE-PCR Fragment Described in Example 3 into *B. subtilis* MOL2999

The SOE-PCR fragment with the erm resistance gene flanked by ara regions obtained in Example 3 was transformed into host strain *B. subtilis* MOL2999, selecting for resistance against erythromycin, since the erm gene on the SOE-PCR fragment renders the strain resistant to this antibiotic. Correct insertion of the fragment was selected as erythromycin resistant transformants. The clones were further tested by PCR on chromosomal DNA and subsequent sequencing of the resulting PCR fragment using appropriate primers. One correct strain was named MOL3030.

Example 5. Obtaining a SOE-PCR Fragment with Flanking Ara Regions for Integration of a spc Gene in *B. subtilis* MOL3030 and Insertion of a 5.1 kb Region of the Ara Operon from *B. licheniformis* SJ1904

Figure 3:
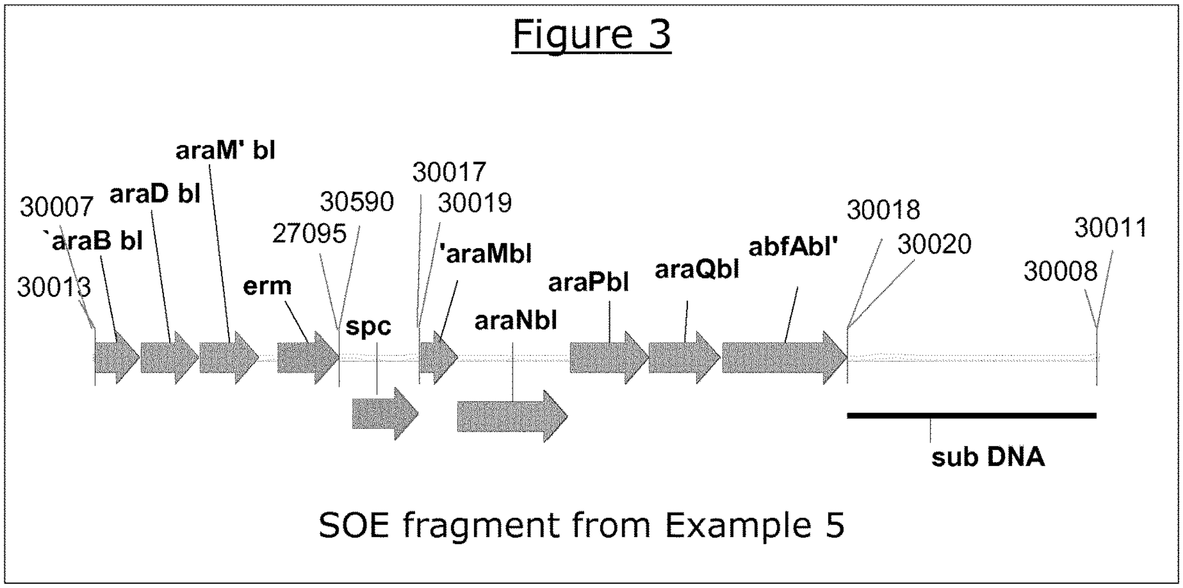
FIG. 3 shows the SOE-fragment from example 5 with positions of genes and primers.

By performing SOE-PCR with the primers and templates listed in Table 4, the spec resistance marker and a 5.1 kb region of the ara operon from *B. licheniformis* SJ1904 was flanked by an upstream and downstream region of the ara operon from *B. subtilis* A164 and *B. licheniformis* SJ1904. The entire SOE-PCR fragment is depicted in FIG. 3. The nucleotide sequence of the fragment can be found in SEQ ID NO:48.

The conditions for the PCR were as follows: The respective DNA fragments were amplified by PCR using the Phusion Hot Start DNA Polymerase system (Thermo Scientific). The PCR amplification reaction mixture contained 1 μl (~0.1 μg) of template genomic DNA, 2 μl of sense primer (20 pmol/μl), 2 μl of anti-sense primer (20 pmol/μl), 10 μl of 5×PCR buffer with 7.5 mM $MgCl_2$, 8 μl of dNTP mix (1.25 mM each), 37 μl water, and 0.5 μl (2 U/μl) DNA polymerase mix. A thermocycler was used to amplify the fragment. The PCR products were purified from a 1.2% agarose gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) using the Phusion Hot Start DNA Polymerase system (Thermo Scientific) as follows. The PCR amplification reaction mixture contained 50 ng of each of the four gel purified PCR products. The two nested SOE primers 30007 and 30008 was added at 2 μl (20 pmol/μl) and a thermocycler was used to assemble and amplify the SOE fragment of 11869 by (FIG. 3). The resulting PCR product was used directly for transformation to *B. subtilis* host MOL3030.

TABLE 4

SOE-PCR strategy for inserting the erm gene and a 5.1 kb ara region from *B. licheniformis* SJ1904 into the ara operon of *B. subtilis* MOL3030

| | 1. PCRs | | | SOE-PCR | |
|---|---|---|---|---|---|
| Fragments | Template DNA from | Primers | Size (bp) | Primers | Size (bp) |
| ara fragment upstream | MOL3030 chr DNA | 30013 & 27095 | 2986 | 30007 & 30008 | 11869 |
| spc gene | pSJ3358 | 30590 & 30017 | 912 | | |
| 5.1 kb fragment | SJ1904 chr | 27096 & | 5086 | | |

TABLE 4-continued

SOE-PCR strategy for inserting the erm gene and a 5.1 kb ara region from *B. licheniformis* SJ1904 into the ara operon of *B. subtilis* MOL3030

| | 1. PCRs | | | SOE-PCR | |
|---|---|---|---|---|---|
| Fragments | Template DNA from | Primers | Size (bp) | Primers | Size (bp) |
| from SJ1904 | DNA | 27095 | | | |
| ara fragment downstream | A164 chr DNA | 30018 & 30011 | 3023 | | |

Example 6. Transforming the SOE-PCR Fragment Described in Example 5 into *B. subtilis* MOL3030

Figure 4:
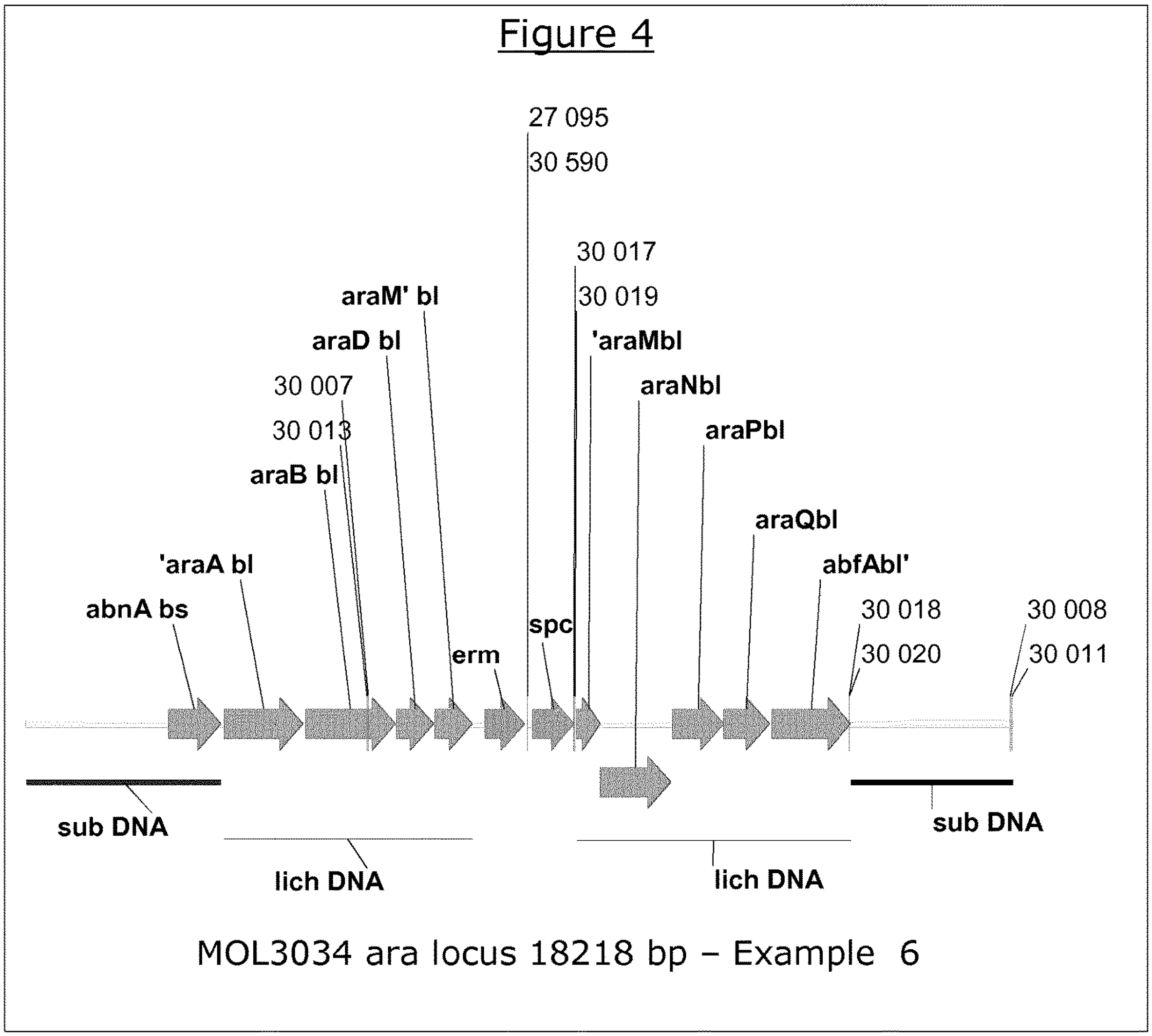
FIG. 4 shows the *B. subtilis* MOL3034 ara locus with positions of genes and primers for the SOE PCR in example 5; total size: 18218 bp.

The SOE-PCR fragment with the spc gene flanked by ara regions obtained in Example 5 was transformed into host strain *B. subtilis* MOL3030, selecting for resistance against spectinomycin, since the spc gene on the SOE-PCR fragment renders the strain resistant to this antibiotic. Correct insertion of the fragment was tested as spectinomycin and erythromycin resistant transformants. The clones were further tested by PCR on chromosomal DNA and subsequent sequencing of the resulting PCR fragment using appropriate primers. One correct strain was named MOL3034. The final engineered chromosomal locus in the ara region in MOL3034 is shown in FIG. 4.

Example 7. Obtaining a SOE-PCR Fragment with Flanking Ara Regions for Integration of a Cat Gene in *B. subtilis* MOL3034

By performing SOE-PCR with the primers and templates listed in Table 5, the cat resistance was flanked by an upstream and downstream 3 kb region of the ara operon from *B. licheniformis* SJ1904. The nucleotide sequence of the fragment can be found in SEQ ID NO:49.

The conditions for the PCR were as follows: The respective DNA fragments were amplified by PCR using the Phusion Hot Start DNA Polymerase system (Thermo Scientific). The PCR amplification reaction mixture contained 1 μl (~0.1 μg) of template genomic DNA, 2 μl of sense primer (20 pmol/μl), 2 μl of anti-sense primer (20 pmol/μl), 10 μl of 5×PCR buffer with 7.5 mM $MgCl_2$, 8 μl of dNTP mix (1.25 mM each), 37 μl water, and 0.5 μl (2 U/μl) DNA polymerase mix. A thermocycler was used to amplify the fragment. The PCR products were purified from a 1.2% agarose gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) using the Phusion Hot Start DNA Polymerase system (Thermo Scientific) as follows. The PCR amplification reaction mixture contained 50 ng of each of the four gel purified PCR products. The two nested SOE primers 36817 and 36818 was added at 2 μl (20 pmol/μl) and a thermocycler was used to assemble and amplify the SOE fragment of 7330 bp. The resulting PCR product was used directly for transformation to *B. subtilis* host MOL3034.

TABLE 5

SOE-PCR strategy for replacing the spc and erm marker with the cat gene into the ara operon of *B. subtilis* MOL3034

| | 1. PCRs | | | SOE-PCR | |
|---|---|---|---|---|---|
| Fragments | Template DNA from | Primers | Size (bp) | Primers | Size (bp) |
| ara fragment upstream | SJ1904 chr DNA | 35881 & 35895 | 3082 | 36818 & 36817 | 7330 |
| cat gene flanked by res sites | pSJ3372 | 35876 & 656520 | 1271 | | |
| ara fragment downstream | SJ1904 chr DNA | 35878 & 35880 | 3049 | | |

Example 8. Transforming the SOE-PCR Fragment Described in Example 7 into *B. subtilis* MOL3034

Figure 5:
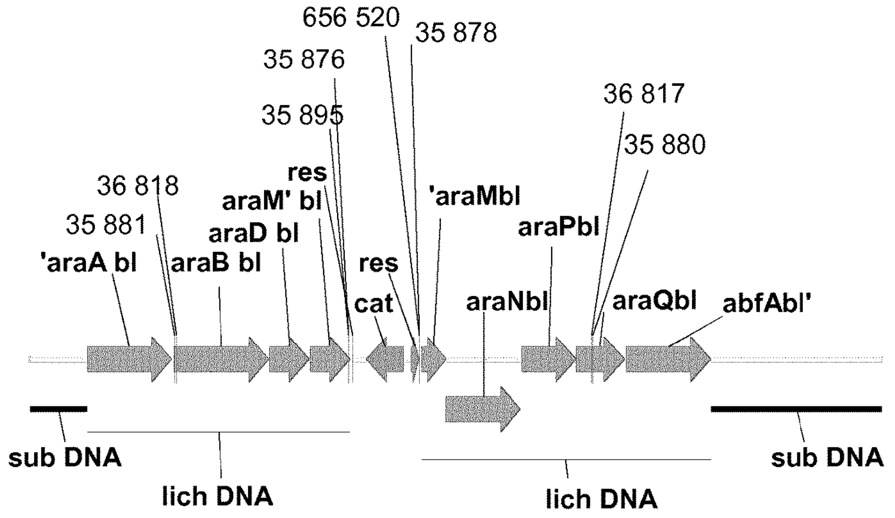
FIG. 5 shows the *B. subtilis* MOL3041 ara locus with positions of genes and primers for the SOE PCR in example 7; total size: 14889 bp.

The SOE-PCR fragment with the cat gene flanked by ara regions obtained in Example 7 was transformed into host strain *B. subtilis* MOL3034, selecting for resistance against chloramphenicol, since the cat gene on the SOE-PCR fragment renders the strain resistant to this antibiotic. Correct insertion of the fragment was tested as chloramphenicol resistant transformants. The clones were further tested to be sensitive to spectinomycin and erythromycin. The clones were further tested by PCR on chromosomal DNA and subsequent sequencing of the resulting PCR fragment using appropriate primers. One correct strain was named MOL3041. The chromosomal map of the ara region is shown in FIG. 5.

Example 9. Obtaining a SOE-PCR Fragment with Flanking Ara Regions for Integration of a spc Gene and an aprH Expression Cassette in *B. subtilis* MOL3041

By performing SOE-PCR with the primers and templates listed in Table 6, the spc resistance marker and an expression cassette with the aprH gene encoding the a serine-protease from *B. clausii* was flanked by an upstream and downstream 3 kb region of the ara operon from *B. licheniformis* SJ1904. The original signal peptide (SP) of aprH is changed to the SP of aprL from *B. licheniformis*. The expression cassette of aprH including the promoter and the cry3A mRNA stabilizer (cry3Astab) described in WO2008140615-A2 is ordered as synthetic DNA (SEQ ID NO:50). The nucleotide sequence of the entire SOE fragment can be found in SEQ ID NO:51.

The conditions for the PCR were as follows: The respective DNA fragments were amplified by PCR using the Phusion Hot Start DNA Polymerase system (Thermo Scientific). The PCR amplification reaction mixture contained 1 μl (~0.1 μg) of template genomic DNA, 2 μl of sense primer (20 pmol/μl), 2 μl of anti-sense primer (20 pmol/μl), 10 μl of 5×PCR buffer with 7.5 mM $MgCl_2$, 8 μl of dNTP mix (1.25 mM each), 37 μl water, and 0.5 μl (2 U/μl) DNA polymerase mix. A thermocycler was used to amplify the fragment. The PCR products were purified from a 1.2% agarose gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) using the Phusion Hot Start DNA Polymerase system (Thermo Scientific) as follows. The PCR amplification reaction mixture contained 50 ng of each of the four gel purified PCR products. The two nested SOE primers 36817 and 36818 was added at 2 μl (20 pmol/μl) and a thermocycler was used to assemble and amplify the SOE fragment of 11869 bp. The resulting PCR product was used directly for transformation to *B. subtilis* host MOL3041.

TABLE 6

SOE-PCR strategy for replacing the cat marker with the spc gene and the aprH expression cassette into the ara operon of *B. subtilis* MOL3041

| | 1. PCRs | | | SOE-PCR | |
|---|---|---|---|---|---|
| Fragments | Template DNA from | Primers | Size (bp) | Primers | Size (bp) |
| ara fragment upstream | SJ1904 chr DNA | 35881 & 35894 | 3084 | 36818 & 36817 | 9898 |
| spc gene flanked by res sites | pSJ3372 | 35893 & 39950 | 1548 | | |
| aprH expression cassette | Synthetic DNA (SEQ ID NO: 50) | 39951 & 36001 | 2341 | | |
| ara fragment downstream | SJ1904 chr DNA | 36002 & 35880 | 3045 | | |

Example 10. Transforming the SOE-PCR Fragment Described in Example 9 into *B. subtilis* MOL3041

Figure 6:
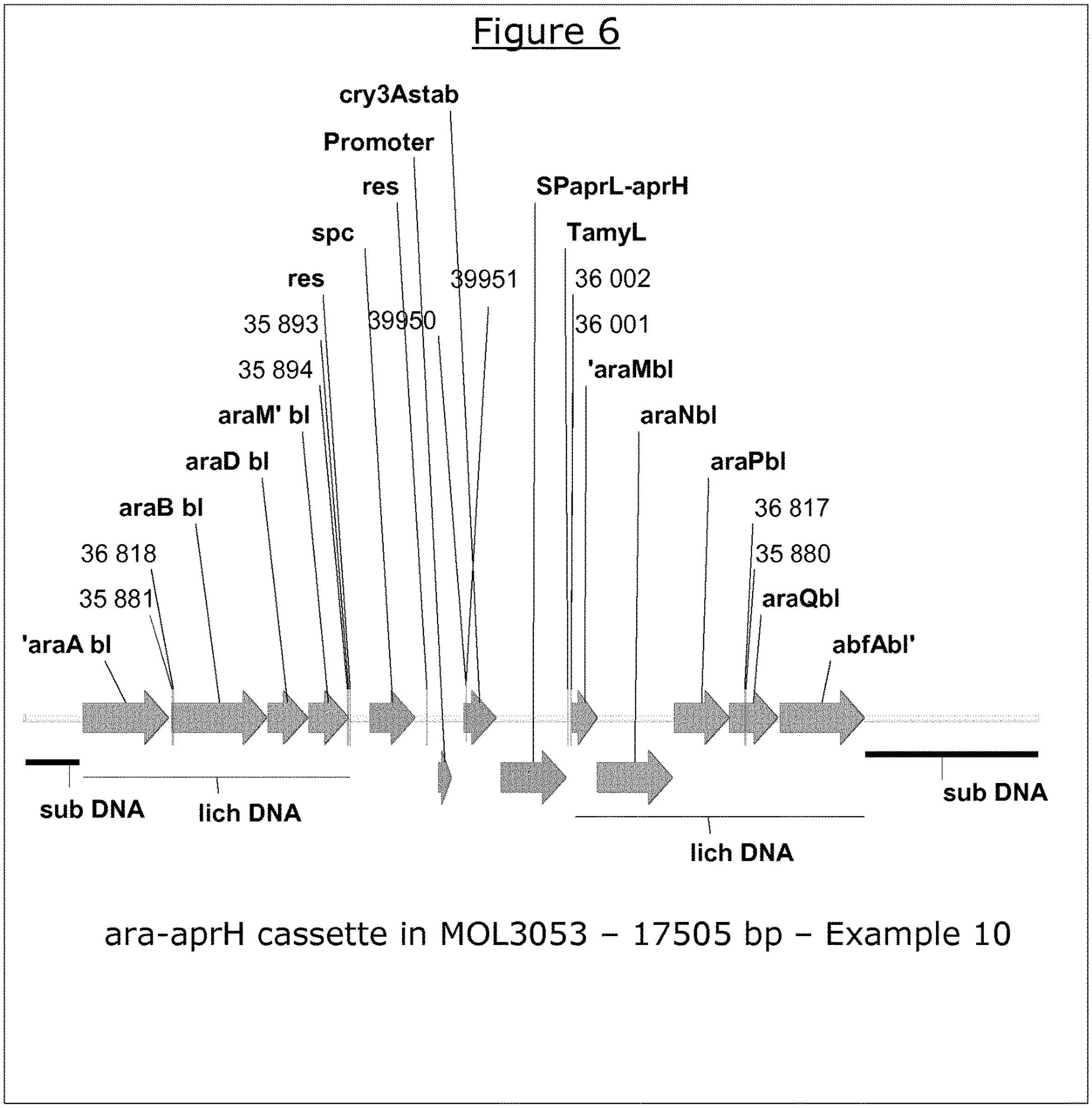
FIG. 6 shows the *B. subtilis* MOL3053 ara-aprH cassette with positions of genes and primers for the SOE PCR in example 9; total size: 17505 bp.

The SOE-PCR fragment with the spc gene and aprH expression cassette flanked by ara regions obtained in Example 9 was transformed into host strain *B. subtilis* MOL3041, selecting for resistance against spectinomycin, since the spc gene on the SOE-PCR fragment renders the strain resistant to this antibiotic. Correct insertion of the fragment was tested as spectinomycin resistant transformants showing protease activity. The clones were further tested to be sensitive to chloramphenicol. The clones were further tested by PCR on chromosomal DNA and subsequent sequencing of the resulting PCR fragment using appropriate primers. One correct strain was named MOL3053. The chromosomal map of the ara region is shown in FIG. 6.

Example 11. Transfer of the construction described in example 5 to the AEB708 strain holding the methyltransferase gene M.Bli1904II Chromosomal DNA from *B. subtilis* MOL3034 was isolated using QIAamp DNA Blood Kit from Qiagen. Competent *B. licheniformis* AEB708 cells were transformed with MOL3034 chromosomal DNA and plated on LB with 2 ug/ml erythromycin and 120 ug/ml spectinomycin. Colonies were tested with PCR to show the correct transfer of the MOL3034 construct described in example 5 and the presence of the *Bacillus licheniformis* M.Bli1904II DNA methyltransferase gene at the amyE locus. One correct clone was preserved as MOL3037.

Example 12. Transfer of the Construction Described in Example 9 to the AEB708 Strain Holding the Methyltransferase Gene M.Bli1904II Chromosomal DNA from MOL3053 was isolated using QIAamp DNA Blood Kit from Qiagen. Competent AEB708 cells where transformed with MOL3053 chromosomal DNA and plated on LB with 120 ug/ml spectinomycin. Colonies were tested with PCR to show the correct transfer of the MOL3053 construct described in example 9 and the presence of the *Bacillus licheniformis* M.Bli1904II DNA methyltransferase gene at the amyE locus. These clones also show clearing zones on protease indicator plates. One correct clone was preserved as MOL3055.

Example 13. Construction of a *B. licheniformis* mecA-Disrupted Strain (TaHy9)

Plasmid pBM294 was designed to delete 500 bp within the *B. licheniformis* mecA gene. Genomic DNA was isolated from *B. licheniformis* SJ1904 according the method previously described (Pitcher et. al, *Lett. Appl. Microbiol.,* 1989, 8, 151-156). A 323 bp fragment of the *B. licheniformis* SJ1904 chromosome, including the first 67 bp of the mecA coding sequence, was amplified by PCR using primers 0612056 and 0612057.

A cleavage site for restriction enzyme EcoRI was incorporated into primer 0612056. Primer 0612057 incorporates 18 bp corresponding to by 568 to 588 of the mecA coding sequence.

A second 288 bp fragment of the *B. licheniformis* SJ1904 chromosome, including the segment from nucleotides 568 to 639 of the mecA coding sequence, was amplified by PCR using primers 0612058 and 0612060.

A cleavage site for the XhoI restriction enzyme was incorporated into primer 0612060. Primer 0612058 incorporates 18 bp corresponding to by 47 to 67 of the mecA coding sequence. Primers 0612057 and 0612058 are complementary.

The respective DNA fragments were amplified by PCR using the Expand High Fidelity PCR system (Roche Diagnostics, Mannheim, Germany). The PCR amplification reaction mixture contained 4 µl (~1 µg) of *B. licheniformis* SJ1904 genomic DNA, 1 µl of sense primer (50 pmol/µl), 1 µl of anti-sense primer (50 pmol/µl), 10 µl of 5×PCR buffer with 15 mM $MgCl_2$, 1 µl of dNTP mix (10 mM each), 32.25 µl water, and 0.75 µl (3.5 U/µl) DNA polymerase mix. An Eppendorf Mastercycler thermocycler was used to amplify the fragment with the following settings: One cycle at 94° C. for 2 minutes; 10 cycles each at 94° C. for 15 seconds, 58° C. for 30 seconds, 72° C. for 20 seconds; 15 cycles each at 94° C. for 15 seconds, 58° C. for 30 seconds, 72° C. for 20 seconds plus 5 second elongation at each successive cycle, one cycle at 72° C. for 7 minutes; and 4° C. hold. The PCR products were purified from a 1.2% agarose (Amresco, Solon, Ohio) gel with 1×TBE buffer using the Qiagen QIAquick Gel Extraction Kit (Qiagen, Inc., Valencia, Calif.) according to the manufacturer's instructions.

The purified PCR products were used in a subsequent PCR reaction to create a single fragment using splice overlapping PCR (SOE) using the Expand High Fidelity$^{plus}$ PCR system (Roche Diagnostics) as follows. The PCR amplification reaction mixture contained 2 µl (~50 ng) of gel purified PCR product from primer combination 0612056/0612057, 2 µl (~50 ng) of gel purified PCR product from primer combination 0612058/0612060, 1 µl of primer 0612056 (50 pmol/µl), 1 µl of primer 0612060 (50 pmol/µl), 10 µl of 5×PCR buffer with 15 mM $MgCl_2$, 1 µl of dNTP mix (10 mM each), 32.25 µl water, and 0.75 µl (3.5 U/µl) DNA polymerase mix. An Eppendorf Mastercycler thermocycler was used to amplify the fragment with the following settings: One cycle at 94° C. for 2 minutes; 10 cycles each at 94° C. for 15 seconds, 58° C. for 30 seconds, 72° C. for 40 seconds; 15 cycles each at 94° C. for 15 seconds, 58° C. for 30 seconds, 72° C. for 40 seconds plus 5 second elongation at each successive cycle, one cycle at 72° C. for 7 minutes; and 4° C. hold. The resulting 611 bp PCR product was purified from a 1.2% agarose (Amresco) gel with 1×TBE buffer using the Qiagen QIAquick Gel Extraction Kit (Qiagen, Inc.) according to manufacturer's instructions.

The purified PCR product was cloned into plasmid pCR2.1-TOPO (Invitrogen) according to manufacturer's instructions, resulting is a plasmid designated pBM293. Plasmid pBM293 and plasmid pNNB194 (U.S. Pat. No. 5,958,728) were digested with restriction enzymes XhoI and EcoRI to isolate the 606 bp insert fragment and vector fragment, respectively. These fragments were isolated by 1% agarose gel electrophoresis using TBE buffer followed by purification using the Qiagen QIAquick Gel Extraction Kit (Qiagen, Inc.) according to manufacturer's instructions. The fragments were ligated using a Rapid DNA Ligation Kit following the manufacturer's instructions. A 2 µl aliquot of the ligation was used to transform *E. coli* Sure™ cells according to the manufacturer's instructions. Plasmid DNA was prepared from *E. coli* transformants and digested using restriction enzymes EcoRI and XhoI, followed by 0.7% agarose gel electrophoresis using TBE buffer and the plasmid identified as having the correct restriction pattern was designated pBM294.

The temperature-sensitive plasmid pBM294 was incorporated into the genome of *B. licheniformis* SJ1904 by chromosomal integration and excision according to the method previously described (U.S. Pat. No. 5,843,720). *B. licheniformis* SJ1904 transformants containing plasmid pBM294 were grown on TBAB selective medium at 50° C. to force integration of the vector. Desired integrants were chosen based on their ability to grow on TBAB erythromycin/lincomycin selective medium at 50° C. Integrants were then grown without selection in LB medium at 37° C. to allow excision of the integrated plasmid. Cells were plated on LB plates and screened for erythromycin-sensitivity.

Genomic DNA was prepared from several erythromycin/lincomycin sensitive isolates above according to the method previously described (Pitcher et. al, supra). Genomic PCR confirmed disruption of mecA and the resulting strain was designated TaHY9.

Example 14. Transformation Efficiency of a *B. licheniformis* mecA-Disrupted Strain (TaHy9) Using Chromosomal DNA from MDT232

The *B. licheniformis* mecA-disrupted strain TaHy9 from Example 13 was spread onto LB agar plates to obtain confluent growth after incubation at 37° C. overnight. After overnight incubation, approximately 2-3 ml of Spizizen I-xyl medium was added to each plate. Cells were scraped using sterile spreaders and transferred into 15 ml Falcon 2059 tubes. Approximately 500 µl of this culture was used to inoculate 50 ml Spizizen I-xyl medium. Growth was monitored using a Klett densitometer. At each cell density corresponding to Klett unit 140, 160, 180, and 200, 250 μl of the culture plus 250 μl Spizizen II-xyl medium containing 2 mM EGTA was added to a Falcon 2059 tube. One microgram of transforming DNA (*B. licheniformis* MDT232 chromosomal DNA containing a spectinomycin resistance expression cassette integrated at the glpD locus; see WO2008/079895) was added to each tube. Two microliters of 50 μg/ml spectinomycin was also added to the transformation mix. Tubes were incubated at 37° C. on a rotational shaker set at 250 rpm for 1 hour. Transformation reactions were plated to LB agar plates containing 120 μg/ml of spectinomycin. Colonies were counted the following day to determine transformation efficiency; results are shown in table 7 below.

Example 15. Transformation Efficiency of a *B. licheniformis* mecA-Disrupted Strain (TaHy9) Using Chromosomal DNA from *B. subtilis* MOL3037

Figure 7:
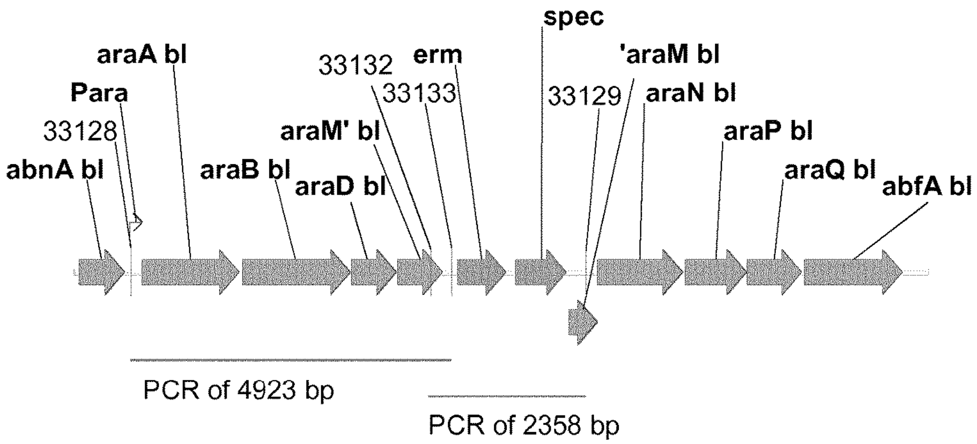
FIG. 7 shows the *B. licheniformis* TaHy9 transformant from example 15 with positions of genes and primers for PCR verification.
Figure 8:
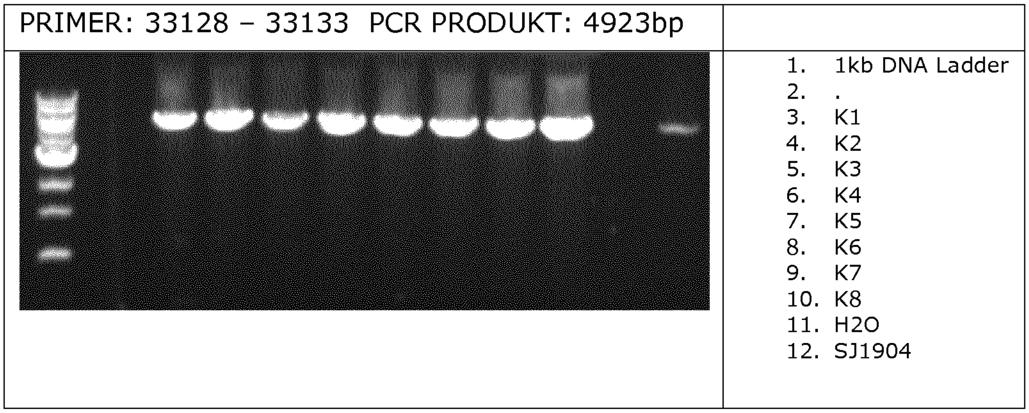
FIG. 8 shows pictures of PCR analysis agarose gel electrophoreses for the PCR verification of the transformant from example 15.
Figure 8:

The *B. licheniformis* mecA-disrupted strain TaHy9 from Example 13 was spread onto LB agar plates to obtain confluent growth after incubation at 37° C. overnight. After overnight incubation, approximately 2-3 ml of Spizizen I-xyl medium was added to each plate. Cells were scraped using sterile spreaders and transferred into 15 ml Falcon 2059 tubes. Approximately 500 μl of this culture was used to inoculate 50 ml Spizizen I-xyl medium. Growth was monitored using a Klett densitometer. At each cell density corresponding to Klett unit 140, 160, 180, and 200, 250 μl of the culture plus 250 μl Spizizen II-xyl medium containing 2 mM EGTA was added to a Falcon 2059 tube. One microgram of transforming DNA (*B. subtilis* MOL3037 chromosomal DNA containing an erythromycin and spectinomycin resistance expression cassette integrated at the ara locus; see example 11) was added to each tube. Two microliters of 50 μg/ml spectinomycin and erythromycin was also included in the transformation mix. Tubes were incubated at 37° C. on a rotational shaker set at 250 rpm for 1 hour. Transformation reactions were plated to LB agar plates containing 120 μg/ml of spectinomycin. The colonies were then replica plated onto LB agar plates containing 5 μg/ml of erythromycin. Colonies that were both spectinomycin and erythromycin resistant were counted the following day to determine transformation efficiency. The chromosomal organization in the ara locus of the transformed TaHy9 *B. licheniformis* strain is shown in FIG. 7. A total of 8 clones showing erythromycin and spectinomycin resistance were tested by PCR using two different primer pairs (33128+33133) and (33129+33132) giving a PCR fragment of 4923 bp and 2358 bp respectively (FIG. 8). All clones were confirmed to be true transformants. The localization of the primers used for the PCR analysis is shown in FIG. 7. These PCR fragments can only be amplified on chromosomal DNA isolated from a correct transformant. This experiment show that we can transform and integrate chromosomal DNA from the *B. subtilis* strain MOL3037 holding to markers directly to the chromosome of *B. licheniformis* strain TaHy9. Results are shown in table 7 below.

Example 16. Transformation Efficiency of a *B. licheniformis* mecA-Disrupted Strain (TaHy9) Using Chromosomal DNA from *B. subtilis* MOL3055

Figure 9:
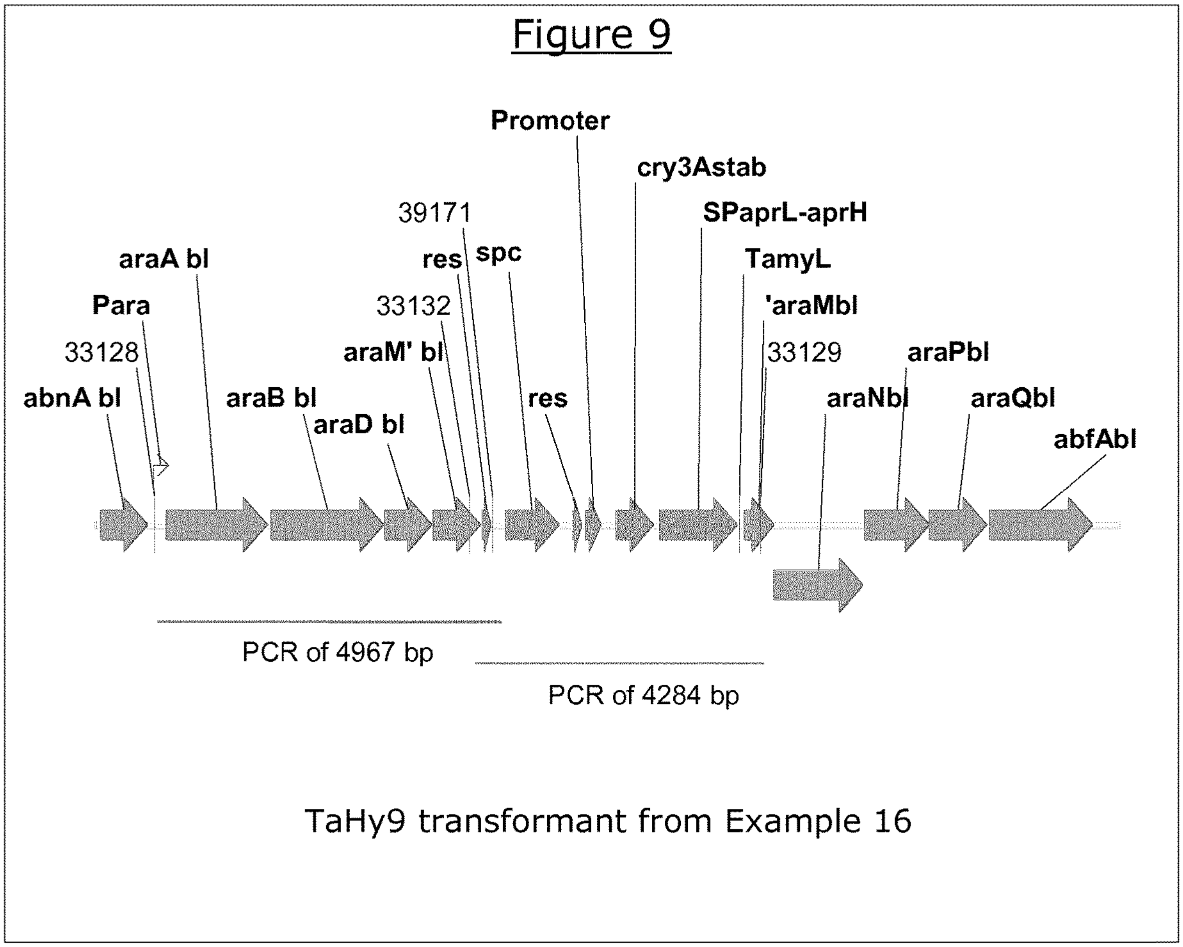
FIG. 9 shows the *B. licheniformis* TaHy9 transformant from example 16 with positions of genes and primers for PCR verification.
Figure 10:
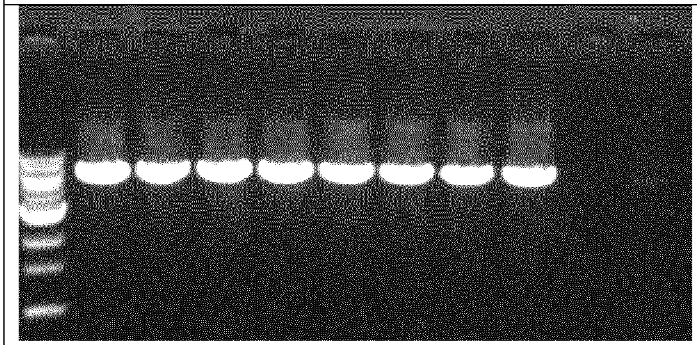
FIG. 10 shows pictures of PCR analysis agarose gel electrophoreses for the PCR verification of the transformant from example 16.
Figure 10:
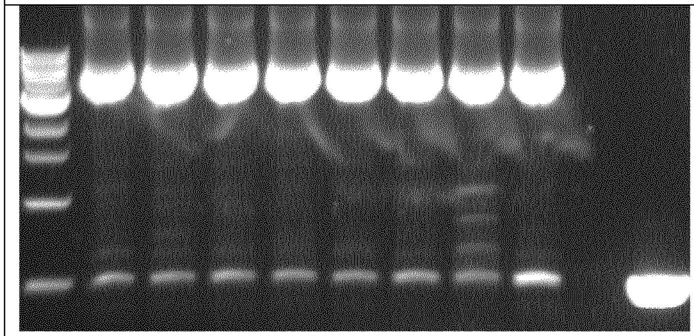

The *B. licheniformis* mecA-disrupted strain TaHy9 from Example 13 was spread onto LB agar plates to obtain confluent growth after incubation at 37° C. overnight. After overnight incubation, approximately 2-3 ml of Spizizen I-xyl medium was added to each plate. Cells were scraped using sterile spreaders and transferred into 15 ml Falcon 2059 tubes. Approximately 500 μl of this culture was used to inoculate 50 ml Spizizen I-xyl medium. Growth was monitored using a Klett densitometer. At each cell density corresponding to Klett unit 140, 160, 180, and 200, 250 μl of the culture plus 250 μl Spizizen II-xyl medium containing 2 mM EGTA was added to a Falcon 2059 tube. One microgram of transforming DNA (*B. subtilis* MOL3055 chromosomal DNA containing a spectinomycin resistance expression cassette and the protease gene aprH integrated at the ara locus; see example 12) was added to each tube. Two microliters of 50 μg/ml spectinomycin was also included in the transformation mix. Tubes were incubated at 37° C. on a rotational shaker set at 250 rpm for 1 hour. Transformation reactions were plated to LB agar plates containing 120 μg/ml of spectinomycin. The colonies were then replica plated onto LB agar plates containing 120 μg/ml of spectinomycin and skim milk. Colonies that were both spectinomycin and protease positive were counted the following day to determine transformation efficiency. The chromosomal organization in the ara locus of the transformed TaHy9 *B. licheniformis* strain is shown in FIG. 9. A total of 8 clones showing spectinomycin resistance and protease phenotype were tested by PCR using two different primer pairs (33128+39171) and (33132 33129) giving a PCR fragment of 4967 bp and 4284 bp respectively (FIG. 10). All clones were confirmed to be true transformants. The localization of the primers used for the PCR analysis is shown in FIG. 9. These PCR fragments can only be amplified on chromosomal DNA isolated from a correct transformant.

This experiment showed that chromosomal DNA from the *B. subtilis* MOL3055 strain, including one marker gene and one protease expression cassette, can be successfully transformed directly into the *B. licheniformis* TaHy9 strain, where the expression cassette and the marker were integrated into the *B. licheniformis* chromosome by double homologous recombination. Results are shown in table 7 below.

TABLE 7

Results from Examples 14-16 showing number of transformants on plates pr 1 μg of chromosomal DNA (Chr DNA) transformed.

| | Competent strain | Chr DNA* MDT232 Example 14 | Chr DNA** MOL3037 Example 15 | Chr DNA*** MOL3055 Example 16 | Water** |
|---|---|---|---|---|---|
| Experiment 1 | TaHy9 | 80 | 12 | — | 0 |
| | SJ1904 | 0 | 0 | — | 0 |
| Experiment 2 | TaHy9 | 300 | 120 | 55 | 0 |
| Experiment 3 | TaHy9 | 150 | 56 | 35 | 0 |

*Selected on plates with spectinomycin;

**Selected on plates with spectinomycin and erythromycin;

***Selected on plates with spectinomycin and screened for protease activity.

The invention claimed is:

1. A method for directly transferring a recombinant polynucleotide of interest from the chromosome of a *Bacillus subtilis* donor cell to the chromosome of a *Bacillus licheniformis* mecA-disrupted recipient cell, wherein the *Bacillus subtilis* donor cell expresses a *Bacillus licheniformis* DNA methyltransferase, wherein the polynucleotide of interest comprises at least one coding sequence of interest and a selectable marker, wherein said polynucleotide of interest in the chromosome of the *Bacillus subtilis* donor cell is flanked on each side by a polynucleotide region derived from the chromosome of the *Bacillus licheniformis* mecA-disrupted recipient cell, and wherein the flanking polynucleotide regions are of sufficient size and sequence identity to allow double homologous recombination with the corresponding regions in the chromosome of the *Bacillus licheniformis* mecA-disrupted recipient cell; the method comprising the steps of:

a) providing chromosomal DNA from the *Bacillus subtilis* donor cell, said DNA comprising the polynucleotide of interest flanked on each side by a polynucleotide region derived from the chromosome of the *Bacillus licheniformis* mecA-disrupted recipient cell;

b) transforming the *Bacillus licheniformis* mecA-disrupted recipient cell with the DNA from step (a); and c) selecting a successfully transformed *Bacillus licheniformis* mecA-disrupted recipient cell, wherein the polynucleotide of interest comprising the selectable marker has been integrated into its chromosome.

2. The method of claim 1, wherein the at least one coding sequence of interest encodes a hormone, enzyme, receptor or portion thereof, antibody or portion thereof, or reporter.

3. The method of claim 1, wherein the at least one coding sequence of interest comprises an operon or several genes.

4. The method of claim 1, wherein the flanking polynucleotide regions derived from the chromosome of the *Bacillus licheniformis* mecA-disrupted recipient cell comprise between 100-5,000 nucleotides.

5. The method of claim 4, wherein each flanking polynucleotide region derived from the chromosome of the *Bacillus licheniformis* mecA-disrupted recipient cell is at least 80% identical to the corresponding region in the chromosome of the *Bacillus licheniformis* mecA-disrupted recipient cell.

6. The method of claim 1, wherein the at least one coding sequence of interest comprises a gene library, and wherein said method comprises the additional first steps of:

i) screening the gene library for an encoded activity while it resides in the chromosome of the *Bacillus subtilis* donor cell, and ii) selecting a *Bacillus subtilis* donor clone of interest, before chromosomal DNA of the clone of interest is provided and transformed into the *Bacillus licheniformis* mecA-disrupted recipient cell in accordance with steps a) c) of claim 1.

7. The method of claim 1, wherein the at least one coding sequence of interest encodes a hydrolase, isomerase, ligase, lyase, oxidoreductase, or transferase.

8. The method of claim 1, wherein the at least one coding sequence of interest encodes an alpha-galactosidase, alpha-glucosidase, aminopeptidase, amylase, asparaginase, beta-galactosidase, beta-glucosidase, beta-xylosidase, carbohydrase, carboxypeptidase, catalase, cellobiohydrolase, cellulase, chitinase, cutinase, cyclodextrin glycosyltransferase, deoxyribonuclease, endoglucanase, esterase, green fluorescent protein, glucano-transferase, glucoamylase, invertase, laccase, lipase, mannosidase, mutanase, oxidase, pectinolytic enzyme, peroxidase, phytase, polyphenoloxidase, proteolytic enzyme, ribonuclease, transglutaminase, or a xylanase.

9. The method of claim 4, wherein each flanking polynucleotide region derived from the chromosome of the *Bacillus licheniformis* mecA-disrupted recipient cell is at least 90% identical to the corresponding region in the chromosome of the *Bacillus licheniformis* mecA-disrupted recipient cell.

* * * * *

SEQUENCE LISTING

<160> NUMBER OF SEQ ID NOS: 51

<210> SEQ ID NO 1
<211> LENGTH: 27
<212> TYPE: DNA
<213> ORGANISM: Artificial sequence
<220> FEATURE:
<223> OTHER INFORMATION: Synthetic construct

<400> SEQUENCE: 1
cactcccgag aggagaagtg ctggctg 27

<210> SEQ ID NO 2
<211> LENGTH: 50
<212> TYPE: DNA
<213> ORGANISM: Artificial sequence
<220> FEATURE:
<223> OTHER INFORMATION: Synthetic construct

<400> SEQUENCE: 2
cagccagcac ttctcctctc gggagtggga gctgtaatat aaaaaccttc 50

<210> SEQ ID NO 3
<211> LENGTH: 25
<212> TYPE: DNA
<213> ORGANISM: Artificial sequence
<220> FEATURE:
<223> OTHER INFORMATION: Synthetic construct

<400> SEQUENCE: 3
gtcaatcttt tcttttaaaa aaagc 25

<210> SEQ ID NO 4
<211> LENGTH: 50
<212> TYPE: DNA
<213> ORGANISM: Artificial sequence
<220> FEATURE:
<223> OTHER INFORMATION: Synthetic construct

<400> SEQUENCE: 4 gctttttta aaagaaaaga ttgacgcaaa gacgcatgtg ttttggtttg 50

<210> SEQ ID NO 5
<211> LENGTH: 50
<212> TYPE: DNA
<213> ORGANISM: Artificial sequence
<220> FEATURE:
<223> OTHER INFORMATION: Synthetic construct

<400> SEQUENCE: 5 gctttttta aaagaaaaga ttgacaacaa acgaaaattg gataaagtgg 50

<210> SEQ ID NO 6
<211> LENGTH: 23
<212> TYPE: DNA
<213> ORGANISM: Artificial sequence
<220> FEATURE:
<223> OTHER INFORMATION: Synthetic construct

<400> SEQUENCE: 6
cagccgtcca tccttgcaga gtc 23

<210> SEQ ID NO 7
<211> LENGTH: 23
<212> TYPE: DNA
<213> ORGANISM: Artificial sequence
<220> FEATURE:
<223> OTHER INFORMATION: Synthetic construct

<400> SEQUENCE: 7
gtccagcaga tctcttggaa ggc 23

<210> SEQ ID NO 8
<211> LENGTH: 22
<212> TYPE: DNA
<213> ORGANISM: Artificial sequence
<220> FEATURE:
<223> OTHER INFORMATION: Synthetic construct

<400> SEQUENCE: 8
cacgcttctt ttaagtacgg ag 22

<210> SEQ ID NO 9
<211> LENGTH: 23
<212> TYPE: DNA
<213> ORGANISM: Artificial sequence
<220> FEATURE:
<223> OTHER INFORMATION: Synthetic construct

<400> SEQUENCE: 9
ccgcttcttc tggtaataga agc 23

<210> SEQ ID NO 10
<211> LENGTH: 49
<212> TYPE: DNA
<213> ORGANISM: Artificial sequence
<220> FEATURE:
<223> OTHER INFORMATION: Synthetic construct

<400> SEQUENCE: 10
ctgcaatcgg atgcgattat tgaaggtcaa gacattgatc aagcgcttc 49

<210> SEQ ID NO 11
<211> LENGTH: 24
<212> TYPE: DNA
<213> ORGANISM: Artificial sequence
<220> FEATURE:
<223> OTHER INFORMATION: Synthetic construct

<400> SEQUENCE: 11
ctgcgcaaaa gacataatcg attc 24

<210> SEQ ID NO 12
<211> LENGTH: 24
<212> TYPE: DNA
<213> ORGANISM: Artificial sequence
<220> FEATURE:
<223> OTHER INFORMATION: Synthetic construct

<400> SEQUENCE: 12
ttcaataatc gcatccgatt gcag 24

<210> SEQ ID NO 13
<211> LENGTH: 25
<212> TYPE: DNA
<213> ORGANISM: Artificial sequence
<220> FEATURE:
<223> OTHER INFORMATION: Synthetic construct

<400> SEQUENCE: 13
aatgctgctc ggtatgaccc ttgcc 25

<210> SEQ ID NO 14
<211> LENGTH: 23
<212> TYPE: DNA
<213> ORGANISM: Artificial sequence
<220> FEATURE:
<223> OTHER INFORMATION: Synthetic construct

<400> SEQUENCE: 14
caaacgcagg aggatgcgga gcc 23

<210> SEQ ID NO 15
<211> LENGTH: 47
<212> TYPE: DNA
<213> ORGANISM: Artificial sequence
<220> FEATURE:
<223> OTHER INFORMATION: Synthetic construct

<400> SEQUENCE: 15
gaatcgatta tgtcttttgc gcagtttcct ggaatgtgat ccgcctg 47

<210> SEQ ID NO 16
<211> LENGTH: 26
<212> TYPE: DNA
<213> ORGANISM: Artificial sequence
<220> FEATURE:
<223> OTHER INFORMATION: Synthetic construct

<400> SEQUENCE: 16
tgctttcgaa gcattagacg tggatg 26

<210> SEQ ID NO 17
<211> LENGTH: 23
<212> TYPE: DNA
<213> ORGANISM: Artificial sequence
<220> FEATURE:
<223> OTHER INFORMATION: Synthetic construct

<400> SEQUENCE: 17
ttcaacactc gttgatgccg atc 23

<210> SEQ ID NO 18
<211> LENGTH: 48
<212> TYPE: DNA
<213> ORGANISM: Artificial sequence
<220> FEATURE:
<223> OTHER INFORMATION: Synthetic construct

<400> SEQUENCE: 18
gttttaaaag taagcacctg ttggtgctat aaaattagcc taattgag 48

<210> SEQ ID NO 19
<211> LENGTH: 48
<212> TYPE: DNA
<213> ORGANISM: Artificial sequence
<220> FEATURE:
<223> OTHER INFORMATION: Synthetic construct

<400> SEQUENCE: 19
gacggcaggc tgacggctca ccttctttcc tggaatgtga tccgcctg 48

<210> SEQ ID NO 20
<211> LENGTH: 50
<212> TYPE: DNA
<213> ORGANISM: Artificial sequence
<220> FEATURE:
<223> OTHER INFORMATION: Synthetic construct

<400> SEQUENCE: 20
ccaacaggtg cttactttta aaactacgtc atgctggttc tcgaccattc 50

<210> SEQ ID NO 21
<211> LENGTH: 25
<212> TYPE: DNA
<213> ORGANISM: Artificial sequence
<220> FEATURE:
<223> OTHER INFORMATION: Synthetic construct

<400> SEQUENCE: 21
gaaggtgagc cgtcagcctg ccgtc 25

<210> SEQ ID NO 22
<211> LENGTH: 48
<212> TYPE: DNA
<213> ORGANISM: Artificial sequence
<220> FEATURE:
<223> OTHER INFORMATION: Synthetic construct

<400> SEQUENCE: 22
gaatcgatta tgtcttttgc gcagccaatc tagggtaagt aaattgag 48

<210> SEQ ID NO 23
<211> LENGTH: 25
<212> TYPE: DNA
<213> ORGANISM: Artificial sequence
<220> FEATURE:
<223> OTHER INFORMATION: Synthetic construct

<400> SEQUENCE: 23
cataatgata taatgaagtt gttcg 25

<210> SEQ ID NO 24
<211> LENGTH: 26
<212> TYPE: DNA
<213> ORGANISM: Artificial sequence
<220> FEATURE:
<223> OTHER INFORMATION: Synthetic construct

<400> SEQUENCE: 24
cgccgatacg cctcatccac tctgcc 26

<210> SEQ ID NO 25
<211> LENGTH: 26
<212> TYPE: DNA
<213> ORGANISM: Artificial sequence
<220> FEATURE:
<223> OTHER INFORMATION: Synthetic construct

<400> SEQUENCE: 25
caagcgccgc agaacatggt agccgc 26

<210> SEQ ID NO 26
<211> LENGTH: 26
<212> TYPE: DNA
<213> ORGANISM: Artificial sequence
<220> FEATURE:
<223> OTHER INFORMATION: Synthetic construct

<400> SEQUENCE: 26
ggttgataat gaactgtgct gattac 26

<210> SEQ ID NO 27

<211> LENGTH: 47
<212> TYPE: DNA
<213> ORGANISM: Artificial sequence
<220> FEATURE:
<223> OTHER INFORMATION: Synthetic construct

<400> SEQUENCE: 27
ggaagcgctt gatcaatgtc ttgactaagt taaggtggat acacatc 47

<210> SEQ ID NO 28
<211> LENGTH: 49
<212> TYPE: DNA
<213> ORGANISM: artificial sequence
<220> FEATURE:
<223> OTHER INFORMATION: Synthetic construct

<400> SEQUENCE: 28
cgcgtggtac ccggggatcc tctagcatgc tggttctcga ccattcaag 49

<210> SEQ ID NO 29
<211> LENGTH: 22
<212> TYPE: DNA
<213> ORGANISM: Artificial sequence
<220> FEATURE:
<223> OTHER INFORMATION: Synthetic construct

<400> SEQUENCE: 29
cgtagacggc aagcccgtat cc 22

<210> SEQ ID NO 30
<211> LENGTH: 23
<212> TYPE: DNA
<213> ORGANISM: Artificial sequence
<220> FEATURE:
<223> OTHER INFORMATION: Synthetic construct

<400> SEQUENCE: 30
gtgcagttct cgtcgatgtc cgg 23

<210> SEQ ID NO 31
<211> LENGTH: 24
<212> TYPE: DNA
<213> ORGANISM: Artificial sequence
<220> FEATURE:
<223> OTHER INFORMATION: Synthetic construct

<400> SEQUENCE: 31
cagtgaattc tgatcaaatg gttc 24

<210> SEQ ID NO 32
<211> LENGTH: 49
<212> TYPE: DNA
<213> ORGANISM: Artificial sequence
<220> FEATURE:
<223> OTHER INFORMATION: Synthetic construct

<400> SEQUENCE: 32
gaaccatttg atcagaattc actggtcaag acattgatca agcgcttcc 49

<210> SEQ ID NO 33
<211> LENGTH: 47
<212> TYPE: DNA
<213> ORGANISM: Artificial sequence
<220> FEATURE:
<223> OTHER INFORMATION: Synthetic construct

<400> SEQUENCE: 33
gatgtgtatc caccttaact tagtcaagac attgatcaag cgcttcc 47

<210> SEQ ID NO 34
<211> LENGTH: 22
<212> TYPE: DNA
<213> ORGANISM: Artificial sequence
<220> FEATURE:
<223> OTHER INFORMATION: Synthetic construct

<400> SEQUENCE: 34
caacgaaatt tataagacgg gc 22

<210> SEQ ID NO 35
<211> LENGTH: 45
<212> TYPE: DNA
<213> ORGANISM: Artificial sequence
<220> FEATURE:
<223> OTHER INFORMATION: Synthetic construct

<400> SEQUENCE: 35
gcccgtctta taaatttcgt tgatgctggt tctcgaccat tcaag 45

<210> SEQ ID NO 36
<211> LENGTH: 22
<212> TYPE: DNA
<213> ORGANISM: Artificial sequence
<220> FEATURE:
<223> OTHER INFORMATION: Synthetic construct

<400> SEQUENCE: 36
gaaaacaaga gcgtcagcac gg 22

<210> SEQ ID NO 37
<211> LENGTH: 24
<212> TYPE: DNA
<213> ORGANISM: Artificial sequence
<220> FEATURE:
<223> OTHER INFORMATION: Synthetic construct

<400> SEQUENCE: 37
caggtgagga aatcgcgaca gctg 24

<210> SEQ ID NO 38
<211> LENGTH: 25
<212> TYPE: DNA
<213> ORGANISM: Artificial sequence
<220> FEATURE:
<223> OTHER INFORMATION: Synthetic construct

<400> SEQUENCE: 38
gttcgggttc ttcaaatatt tctcc 25

<210> SEQ ID NO 39
<211> LENGTH: 49
<212> TYPE: DNA
<213> ORGANISM: Artificial sequence
<220> FEATURE:
<223> OTHER INFORMATION: Synthetic construct

<400> SEQUENCE: 39
gaacgttgcg gtacctgatc tagatctcgg gttcttcaaa tatttctcc 49

<210> SEQ ID NO 40
<211> LENGTH: 26
<212> TYPE: DNA

<213> ORGANISM: Artificial sequence
<220> FEATURE:
<223> OTHER INFORMATION: Synthetic construct

<400> SEQUENCE: 40
gatctagatc aggtaccgca acgttc 26

<210> SEQ ID NO 41
<211> LENGTH: 25
<212> TYPE: DNA
<213> ORGANISM: Artificial sequence
<220> FEATURE:
<223> OTHER INFORMATION: Synthetic construct

<400> SEQUENCE: 41
ctagaggatc cccgggtacc acgcg 25

<210> SEQ ID NO 42
<211> LENGTH: 21
<212> TYPE: DNA
<213> ORGANISM: Artificial sequence
<220> FEATURE:
<223> OTHER INFORMATION: Synthetic construct

<400> SEQUENCE: 42
gaattccatt aatagctgct g 21

<210> SEQ ID NO 43
<211> LENGTH: 36
<212> TYPE: DNA
<213> ORGANISM: Artificial sequence
<220> FEATURE:
<223> OTHER INFORMATION: Synthetic construct

<400> SEQUENCE: 43
tccatactct ttcagcatgg tcttcgatat caccgt 36

<210> SEQ ID NO 44
<211> LENGTH: 36
<212> TYPE: DNA
<213> ORGANISM: Artificial sequence
<220> FEATURE:
<223> OTHER INFORMATION: Synthetic construct

<400> SEQUENCE: 44
acggtgatat cgaagaccat gctgaaagag tatgga 36

<210> SEQ ID NO 45
<211> LENGTH: 23
<212> TYPE: DNA
<213> ORGANISM: Artificial sequence
<220> FEATURE:
<223> OTHER INFORMATION: Synthetic construct

<400> SEQUENCE: 45
ctcgagcgca tcctcccaaa atc 23

<210> SEQ ID NO 46
<211> LENGTH: 6927
<212> TYPE: DNA
<213> ORGANISM: Bacillus licheniformis
<220> FEATURE:
<221> NAME/KEY: misc_feature
<222> LOCATION: (1)..(6927)
<223> OTHER INFORMATION: Entire SOE-PCR fragment of Example 1 and shown
in Figure 1.
<220> FEATURE:

<221> NAME/KEY: primer_bind
<222> LOCATION: (1)..(22)
<223> OTHER INFORMATION: Primer 24486.
<220> FEATURE:
<221> NAME/KEY: primer_bind
<222> LOCATION: (25)..(47)
<223> OTHER INFORMATION: Primer 24487.
<220> FEATURE:
<221> NAME/KEY: misc_feature
<222> LOCATION: (1961)..(2929)
<223> OTHER INFORMATION: The abnA coding sequence.
<220> FEATURE:
<221> NAME/KEY: primer_bind
<222> LOCATION: (2958)..(2982)
<223> OTHER INFORMATION: Primer 20991 complement.
<220> FEATURE:
<221> NAME/KEY: primer_bind
<222> LOCATION: (2958)..(3007)
<223> OTHER INFORMATION: Primer 23658.
<220> FEATURE:
<221> NAME/KEY: misc_feature
<222> LOCATION: (3136)..(3763)
<223> OTHER INFORMATION: The cat coding sequence.
<220> FEATURE:
<221> NAME/KEY: primer_bind
<222> LOCATION: (3857)..(3906)
<223> OTHER INFORMATION: Primer 20985 complement.
<220> FEATURE:
<221> NAME/KEY: misc_feature
<222> LOCATION: (3880)..(4070)
<223> OTHER INFORMATION: The araM coding sequence.
<220> FEATURE:
<221> NAME/KEY: primer_bind
<222> LOCATION: (3880)..(3906)
<223> OTHER INFORMATION: Primer 20984.
<220> FEATURE:
<221> NAME/KEY: primer_bind
<222> LOCATION: (3905)..(6927)
<223> OTHER INFORMATION: Primer 24484.
<220> FEATURE:
<221> NAME/KEY: misc_feature
<222> LOCATION: (4104)..(5402)
<223> OTHER INFORMATION: The araN coding sequence.
<220> FEATURE:
<221> NAME/KEY: misc_feature
<222> LOCATION: (5441)..(6379)
<223> OTHER INFORMATION: The araP coding sequence.
<220> FEATURE:
<221> NAME/KEY: misc_feature
<222> LOCATION: (6383)..(6927)
<223> OTHER INFORMATION: The araQ coding sequence.
<220> FEATURE:
<221> NAME/KEY: primer_bind
<222> LOCATION: (6885)..(6907)
<223> OTHER INFORMATION: Primer 24485 complement.

<400> SEQUENCE: 46
cacgcttctt ttaagtacgg agtaccgctt cttctggtaa tagaagcgat tctcatcgct 60
atttactaca gcccgtttga tttataaaaa gcagaaaagc gtttaacgct cttctgcttt 120
ttttgcgagt ttaatgggct ggtcccagtc aatcttacaa tttggatatc gttccagcac 180
tttttcttca atgttctcaa aatcttttgc agagaaatgt ttcagcttct caggagattc 240
tgtccagaca aagatcgtgt gaataaacag cggatgatcc ttggaaggaa tatgcttttc 300
tccctcaaaa agcacgcctt tatacgtcag ctgaaaattc ttccgggtat tgttttgttc 360
atcaataata taaaaatgtt cttttgattg ggccagctta agccttctct taggattcgc 420
gacatatttg accacggcat aaatacaata agcaaaaagt gcaagcaaaa taatccttag 480
aaccatgaca aacattgtgt gaaggcacct cccttatggt gatgatctga tgtaatacga 540
aaagcataga aaaaggtttc actttttcta aaagaaagct gtaaaaacat atacccgatt 600
ttcaagtgaa atagtcgtat ggttagcgcc atgttttgta taataagaat gcaggactga 660

-continued

```
tgaaggaggg tttggaacat ggcaaaatta gatgaaacat tgaccatgct gaaagattta    720
acagatgcaa aaggcatacc gggcaatgaa agagaagtaa ggcaagtgat gaaatcatac    780
atagaaccat ttgctgatga ggtgacaaca gatcgcctgg gcagtttaat tgcaaaaaaa    840
actggtgcag aaaacggccc gaaaattatg atcgccggac atttggatga agtcggcttt    900
atggtgacac aaatcacaga taaaggcttt atccgttttc aaaccgttgg cggctggtgg    960
gctcaggtta tgcttgctca gcgcgtcacc attgtcacaa aaaaaggaga aatcacaggg   1020
gttatcggat ctaagccgcc tcatattttg tctcctgaag caagaaaaaa atcagtggaa   1080
ataaaagaca tgtttattga tattggagct tcaagccggg aagaagcctt ggagtggggt   1140
gtacttccgg gagatatgat cgttccgcat tttgaattta cggtcatgaa caatgaaaaa   1200
ttcctactcg caaaggcctg ggacaaccgc atcggctgtg cgattgctat tgatgtgtta   1260
agaaacttac aaaacacaga tcatccaaat atagtgtatg gcgtcggaac cgtgcaggag   1320
gaagtcgggc tgaggggagc gaaaacggct gcacacacca ttcagcctga tattgcgttt   1380
ggtgttgatg tagggatagc aggagacacg cctggcattt ccgagaagga agcgcagagc   1440
aaaatgggca aaggcccgca gattatcgtt tacgatgcat ccatggtctc tcacaaaggt   1500
ttgcgcgatg cagttgtagc cactgcggag gaagccggca ttccgtacca atttgatgcc   1560
attgccggcg gcggaactga ttcgggtgcc atccatttga cggcaaatgg cgttcctgcg   1620
ctgtccatta ccattgcaac ccgctacatt catacgcacg cggccatgct gcatcgtgat   1680
gattatgaaa acgcggtaaa gttaattaca gaagtcatta agaagttaga ccgaaaaacg   1740
gttgacgaaa ttacgtacca ataaagatac ggaagaatcc gcctattgag gtggattcta   1800
ttttttgtc tgtacaaatt acagcatagt gactacaata aaggggatac cgaaaatttc   1860
ctgaacatga cgatatacga tacgcagtcg atttgacagg aagggaggat aaataatcta   1920
atttgtaagc gctttctaaa ataaaggagg ttgaacaaaa ttgaaaaaga aaaaaacatg   1980
gaaacgcttc ttacactttt cgagtgcagc tctggctgca ggtttgatat tcacttctgc   2040
tgctcccgca gaggcagcgt tttggggtgc atccaatgag ctgcttcatg acccgactat   2100
gattaaagag gggagctcat ggtatgcgct cggaacaggg cttactgaag aacggggact   2160
gcgggttttg aagtcttcag acgctaaaaa ttggaccgta caaaaatcca ttttcactac   2220
accgctatcg tggtggtcca attatgtgcc gaattatggc caaaaccagt gggcgccgga   2280
catccaatac tataacggca agtactggct atattattcc gtttcttctt ttggaagcaa   2340
tacatctgcc attggcctgg catcttcaac aagcatcagt tcgggggct ggaaggacga    2400
gggcttggtg atccgttcga caagctcaaa taattataac gccattgatc cggagctgac   2460
attcgataag gatggcaacc cgtggcttgc attcggctcg ttttggagcg gcattaagct   2520
gactaagctc gataagagta caatgaagcc tacaggctcg ctctattcga ttgcagctag   2580
accgaataat ggaggtgcct tagaagctcc tactcttacg tatcaaaatg gatattacta   2640
tttaatggtt tcatttgata aatgctgtga cggggtaaac agtacgtaca aaattgctta   2700
cggaagatcc aaaagcatta caggccctta tcttgataaa agcggaaaaa gcatgcttga   2760
aggcggaggc accattttgg attcgggcaa tgaccaatgg aaaggacctg gaggccagga   2820
tattgtgaac ggaaacattc ttgttcgcca tgcctatgat gccaatgaca acggcattcc   2880
aaagcttctc atcaatgatt tgaattggag ctcgggctgg ccgtcctatt gaattaaaaa   2940
gccgggctct gcccccggct ttttttaaaa gaaaagattg acaacaaacg aaaattggat   3000
```

```
aaagtgggat atttttaaaa tatatattta tgttacagta atattgactt ttaaaaaagg   3060
attgattcta atgaagaaag cagacaagta agcctcctaa attcacttta gataaaaatt   3120
taggaggcat atcaaatgaa ctttaataaa attgatttag acaattggaa gagaaaagag   3180
atatttaatc attatttgaa ccaacaaacg acttttagta taaccacaga aattgatatt   3240
agtgttttat accgaaacat aaaacaagaa ggatataaat tttaccctgc atttattttc   3300
ttagtgacaa gggtgataaa ctcaaataca gcttttagaa ctggttacaa tagcgacgga   3360
gagttaggtt attgggataa gttagagcca ctttatacaa tttttgatgg tgtatctaaa   3420
acattctctg gtatttggac tcctgtaaag aatgacttca aagagtttta tgatttatac   3480
ctttctgatg tagagaaata taatggttcg gggaaattgt ttcccaaaac acctatacct   3540
gaaaatgctt tttctctttc tattattcca tggacttcat ttactgggtt taacttaaat   3600
atcaataata atagtaatta ccttctaccc attattacag caggaaaatt cattaataaa   3660
ggtaattcaa tatatttacc gctatcttta caggtacatc attctgtttg tgatggttat   3720
catgcaggat tgtttatgaa ctctattcag gaattgtcag ataggcctaa tgactggctt   3780
ttataatatg agataatgcc gactgtactt tttacagtcg gttttctaat gtcactaacc   3840
tgccccgtta gttgaagaag gtttttatat tacagctccc actcccgaga ggagaagtgc   3900
tggctgattg gctgagatca gccggaggcc ctgcgtattt tgacgaaatc ggtgtcgggc   3960
aggattccgt caaaaatgcc ttcagacacg cgcacacctt aagagaccga tgcaccggat   4020
taagaatcat caatgaaaac aaaacgctga tcaaccatgg tctatatgaa tagcccgcac   4080
ctcgaatgga aggggtaacg cagatgaaaa aaatgactgt ctgttttctt gtgctcatga   4140
tgttgctgac attagtcatt gccgggtgtt cagcagaaaa atcatccggc aaatcgggtg   4200
aaactgagct gaccttttgg acatttaacg ggcttcatga gcagttctat gtggaaatgg   4260
tgaaggaatg gaacaaaaaa tatcctgacc gcaaaattaa gctgaatacg gtcgtttatc   4320
catatggaca aatgcacgat aacttatcta tctccctaat agcgggagaa ggcgttcctg   4380
atattgcaga tgtcgaattg gcccgttttt caaacttttt gaagggctct gacataccgc   4440
ttgccgactt gactccgctg attgaaaagg atcgcgataa attcgttgag gcgcggctga   4500
cattgtacag caaaaacgga aagctttacg gactcgatac acatgtaggg acaacggtca   4560
tgttttataa catggatgtg atgaaaaaag ccggcgtcaa tcctgacgat attaaaacat   4620
gggatgatta ccataaagcc ggacagaaag tgcgcaaagt gaccgggaag ccgatgggaa   4680
cggtggaaac aaatgattcc gcaacgttct tatctatgat ttcacagcaa aactcaggct   4740
attttgataa aaacggcaag ctgatcctca ataatgacac caacgtaaaa acacttcaat   4800
atttaaaaga catgatcaat gataaaacga tgattcctgc gccgggcggc gggcatcaca   4860
gtgaagaata ctacggcttt atgaaccaag gaggagctgc ttcagttctc atgccgattt   4920
ggtatatggg aagatttatc gattatatgc ctgatctgaa agggaagatt gccatcagac   4980
cgctcccggc atggaaagag gggggcgacc gctcggcagg tttgggcggt acggcaactg   5040
ttgtaccgaa gcaatccaag catgttgagt tagcaaaaga gtttttggcc tttgcgaagg   5100
gctctgaaga aggaaataaa aaactctgga gcgtactcgg ctttgacccg cttcgctggg   5160
atgtttggag ctccaaggaa ttgaaagaga aaaacaaata cacggattac ttccaaaacg   5220
gaacaggcat tttttctgtg ctgctcgata tcaaggatga aatcaatcca atttatttac   5280
atgaggattt tgccaaggct tcagaccttg tcaacagaag cgtattgttc gacgcgctta   5340
aatctcagca aaaaacgcct aaacaagcct tggacagagc ggcaggtgaa ctgaaacaga   5400
```

```
aatagaatcc cattcaaaaa gtgaaagcgg ggaggttctc atgaaacctg tgaaaacggg   5460

aacggttcat cccgttcctt cagctgcgaa acaatcaggc tggcgagatc tgttttattc   5520

aaaaaaagcg gcgccctatc tgtttacagc gccattcgtt ttatcctttc tcgtattttt   5580

tctatacccc atcattagtg tcttcatcat gagcttccaa agaattttgc cgggagaggt   5640

gtcctttgtc ggattgtcta attatacagc gctaaacaac ccgacgttct ataccgccct   5700

ttggaatacg ctggaataca ccttttggac gctgatcgtg ctgattcctg ttccattgct   5760

tctggccata ttcctgaatt caaagctggt caaatttaga aatatattta aatcagcatt   5820

atttatcccg gcattgacct caaccattgt cgcggggatc atttttcggc tgatcttcgg   5880

agaaatggaa acgtctctgg ccaattccat cctacttaaa ctcggctttt cacctcagaa   5940

ctggatgaac aatgaacata ccggcatgtt tttgatggtg ctgcttgctt catggagatg   6000

gatgggaatc aacatccttt actttttagc aggtttgcaa aatgtgccga aagagctgta   6060

cgaagccgct gatatagacg gcgcgaatac aatgaaaaaa tttctgcaca tcacgctgcc   6120

gtttctcaag cctgtaaccg tatatgtgct gaccatcagc atcatcggcg gcttcaggat   6180

gtttgaggaa agctacgtcc tttggcagaa taattccccg ggtaatattg gtctgacgct   6240

tgtcggatat ttgtatcagc agggacttgc ctacaatgaa atgggatacg gagcggccat   6300

cggcattgtg cttttgattg tgatccttgt tgtcagcctg atttcattaa agctgtcagg   6360

ctcgtttaag gggagggat aaatgttgcg gcacagtcct cagtttagcg tttatagaat   6420

tgcgctgacc ctgtttttta tgatgctgag cctattgtat ctttttccga ttttctgttt   6480

gcttttagga tcattaaagc cgtcatctga gcttttgcgt gtggggctga atcttgatat   6540

tgatccaaaa gtgatgagtt ttgataacta cacatttctg tttaatggcg gcagcattta   6600

tttcaaatgg ttttttaaca gtcttgtact cggacttttt acgactgtgc tcactctgtt   6660

tttttcttcg atgatcgggt acgggcttgc ggtttatgat tttaagggca gaaatatcat   6720

ctttgttctt gtgctgatta ttatgatggt tccgctggaa gtgatgatgc ttcctctgtt   6780

taaacttact gtcggactgc acttgatcga ttcatatacg ggtgtcatat tgccgtttat   6840

cgtttcacct gttgctgttt tctttttcag gcaatatgct cttggccttc caagagatct   6900

gctggactct gcaaggatgg acggctg                                       6927
```

<210> SEQ ID NO 47
<211> LENGTH: 11613
<212> TYPE: DNA
<213> ORGANISM: Bacillus licheniformis
<220> FEATURE:
<221> NAME/KEY: primer_bind
<222> LOCATION: (1)..(22)
<223> OTHER INFORMATION: Primer 24487
<220> FEATURE:
<221> NAME/KEY: primer_bind
<222> LOCATION: (25)..(47)
<223> OTHER INFORMATION: Primer 24487
<220> FEATURE:
<221> NAME/KEY: misc_feature
<222> LOCATION: (1961)..(2929)
<223> OTHER INFORMATION: The abnA gene.
<220> FEATURE:
<221> NAME/KEY: primer_bind
<222> LOCATION: (2958)..(2982)
<223> OTHER INFORMATION: Primer 20990 complement.
<220> FEATURE:
<221> NAME/KEY: primer_bind
<222> LOCATION: (2958)..(3007)
<223> OTHER INFORMATION: Primer 20991
<220> FEATURE:

<221> NAME/KEY: misc_feature
<222> LOCATION: (2983)..(4452)
<223> OTHER INFORMATION: The araA gene.
<220> FEATURE:
<221> NAME/KEY: misc_feature
<222> LOCATION: (4503)..(6158)
<223> OTHER INFORMATION: The araB gene.
<220> FEATURE:
<221> NAME/KEY: misc_feature
<222> LOCATION: (6177)..(6860)
<223> OTHER INFORMATION: The araD gene.
<220> FEATURE:
<221> NAME/KEY: misc_feature
<222> LOCATION: (6880)..(7572)
<223> OTHER INFORMATION: The araM gene.
<220> FEATURE:
<221> NAME/KEY: primer_bind
<222> LOCATION: (7549)..(7597)
<223> OTHER INFORMATION: Primer 27094 complement.
<220> FEATURE:
<221> NAME/KEY: primer_bind
<222> LOCATION: (7574)..(7597)
<223> OTHER INFORMATION: Primer 27096.
<220> FEATURE:
<221> NAME/KEY: misc_feature
<222> LOCATION: (7800)..(8531)
<223> OTHER INFORMATION: The erm gene.
<220> FEATURE:
<221> NAME/KEY: primer_bind
<222> LOCATION: (8592)..(8638)
<223> OTHER INFORMATION: Primer 30009
<220> FEATURE:
<221> NAME/KEY: primer_bind
<222> LOCATION: (8592)..(8615)
<223> OTHER INFORMATION: Primer 27095 complement.
<220> FEATURE:
<221> NAME/KEY: primer_bind
<222> LOCATION: (11556)..(11578)
<223> OTHER INFORMATION: Primer 30008 complement
<220> FEATURE:
<221> NAME/KEY: primer_bind
<222> LOCATION: (11588)..(11613)
<223> OTHER INFORMATION: Primer 30011 complement

<400> SEQUENCE: 47
cacgcttctt ttaagtacgg agtaccgctt cttctggtaa tagaagcgat tctcatcgct 60
atttactaca gcccgtttga tttataaaaa gcagaaaagc gtttaacgct cttctgcttt 120
ttttgcgagt ttaatgggct ggtcccagtc aatcttacaa tttggatatc gttccagcac 180
tttttcttca atgttctcaa aatcttttgc agagaaatgt ttcagcttct caggagattc 240
tgtccagaca aagatcgtgt gaataaacag cggatgatcc ttggaaggaa tatgcttttc 300
tccctcaaaa agcacgcctt tatacgtcag ctgaaaattc ttccgggtat tgttttgttc 360
atcaataata taaaaatgtt cttttgattg ggccagctta agccttctct taggattcgc 420
gacatatttg accacggcat aaatacaata agcaaaaagt gcaagcaaaa taatccttag 480
aaccatgaca aacattgtgt gaaggcacct cccttatggt gatgatctga tgtaatacga 540
aaagcataga aaaaggtttc actttttcta aaagaaagct gtaaaaacat atacccgatt 600
ttcaagtgaa atagtcgtat ggttagcgcc atgttttgta taataagaat gcaggactga 660
tgaaggaggg tttggaacat ggcaaaatta gatgaaacat tgaccatgct gaaagattta 720
acagatgcaa aaggcatacc gggcaatgaa agagaagtaa ggcaagtgat gaaatcatac 780
atagaaccat ttgctgatga ggtgacaaca gatcgcctgg gcagtttaat tgcaaaaaaa 840
actggtgcag aaaacggccc gaaaattatg atcgccggac atttggatga agtcggcttt 900
atggtgacac aaatcacaga taaaggcttt atccgttttc aaaccgttgg cggctggtgg 960
gctcaggtta tgcttgctca gcgcgtcacc attgtcacaa aaaaaggaga aatcacaggg 1020

```
gttatcggat ctaagccgcc tcatattttg tctcctgaag caagaaaaaa atcagtggaa   1080
ataaaagaca tgtttattga tattggagct tcaagccggg aagaagcctt ggagtggggt   1140
gtacttccgg gagatatgat cgttccgcat tttgaattta cggtcatgaa caatgaaaaa   1200
ttcctactcg caaaggcctg ggacaaccgc atcggctgtg cgattgctat tgatgtgtta   1260
agaaacttac aaaacacaga tcatccaaat atagtgtatg gcgtcggaac cgtgcaggag   1320
gaagtcgggc tgaggggagc gaaaacggct gcacacacca ttcagcctga tattgcgttt   1380
ggtgttgatg tagggatagc aggagacacg cctggcattt ccgagaagga agcgcagagc   1440
aaaatgggca aaggcccgca gattatcgtt tacgatgcat ccatggtctc tcacaaaggt   1500
ttgcgcgatg cagttgtagc cactgcggag gaagccggca ttccgtacca atttgatgcc   1560
attgccggcg gcggaactga ttcgggtgcc atccatttga cggcaaatgg cgttcctgcg   1620
ctgtccatta ccattgcaac ccgctacatt catacgcacg cggccatgct gcatcgtgat   1680
gattatgaaa acgcggtaaa gttaattaca gaagtcatta agaagttaga ccgaaaaacg   1740
gttgacgaaa ttacgtacca ataaagatac ggaagaatcc gcctattgag gtggattcta   1800
ttttttgtc tgtacaaatt acagcatagt gactacaata aaggggatac cgaaaatttc   1860
ctgaacatga cgatatacga tacgcagtcg atttgacagg aagggaggat aaataatcta   1920
atttgtaagc gctttctaaa ataaaggagg ttgaacaaaa ttgaaaaaga aaaaaacatg   1980
gaaacgcttc ttacactttt cgagtgcagc tctggctgca ggtttgatat tcacttctgc   2040
tgctcccgca gaggcagcgt tttggggtgc atccaatgag ctgcttcatg acccgactat   2100
gattaaagag ggagctcat ggtatgcgct cggaacaggg cttactgaag aacggggact   2160
gcgggttttg aagtcttcag acgctaaaaa ttggaccgta caaaaatcca ttttcactac   2220
accgctatcg tggtggtcca attatgtgcc gaattatggc caaaaccagt gggcgccgga   2280
catccaatac tataacggca agtactggct atattattcc gtttcttctt ttggaagcaa   2340
tacatctgcc attggcctgg catcttcaac aagcatcagt tcgggggct ggaaggacga   2400
gggcttggtg atccgttcga caagctcaaa taattataac gccattgatc cggagctgac   2460
attcgataag gatggcaacc cgtggcttgc attcggctcg ttttggagcg gcattaagct   2520
gactaagctc gataagagta caatgaagcc tacaggctcg ctctattcga ttgcagctag   2580
accgaataat ggaggtgcct tagaagctcc tactcttacg tatcaaaatg gatattacta   2640
tttaatggtt tcatttgata aatgctgtga cggggtaaac agtacgtaca aaattgctta   2700
cggaagatcc aaaagcatta caggccctta tcttgataaa agcggaaaaa gcatgcttga   2760
aggcggaggc accattttgg attcgggcaa tgaccaatgg aaaggacctg gaggccagga   2820
tattgtgaac ggaaacattc ttgttcgcca tgcctatgat gccaatgaca acggcattcc   2880
aaagcttctc atcaatgatt tgaattggag ctcgggctgg ccgtcctatt gaattaaaaa   2940
gccgggctct gcccccggct ttttttaaaa gaaaagattg acgcaaagac gcatgtgttt   3000
tggtttgtga caggcagcca gcatttatat ggcgaagagg cggtacaaga ggtagaagag   3060
cattccaaaa tgatctgcaa cggattaaat gacggagatt taaggtttca agtcgagtac   3120
aaagcggtgg ccacttcgct ggacggcgtc agaaaactgt ttgaagaggc gaaccgggac   3180
gatgagtgcg caggcatcat cacctggatg catacgtttt caccggccaa aatgtggatt   3240
cccggccttt ccgagctgaa taagccgctg ctccattttc atacccagtt taaccgggac   3300
attccgtggg ataaaatcga catggatttc atgaatatta atcagtctgc ccacggcgac   3360
```

cgcgaatacg gttttatcgg agcgagattg ggcattcctc gaaaagtaat cgccggatat 3420
tgggaagaca gagaagtaaa gcgctcgatc gacaaatgga tgagcgcagc ggtcgcatat 3480
attgaaagcc gccatatcaa agtcgcccga tttggggaca acatgcggaa tgtggcggta 3540
acagaaggag ataagattga agcgcagatt cagcttggct ggtctgtcga cggatatgga 3600
atcggcgatc tcgtcacgga gatcaatgct gtatcagaac agagtctaag cgagctcatc 3660
tccgaatatg aggagcttta tgagtggccg gaaggcgaag cggcaaggga atccgtcaag 3720
gagcaggcgc ggattgagct tggattaaag cgctttcttt cgagcggagg ctatacggcc 3780
tttacgacaa cctttgaaga cctccacggc atgaagcagc ttccgggttt ggctgttcag 3840
cggctgatgg ctgaaggcta tggcttcgga ggagaaggag attggaaaac ggctgcgctt 3900
gtcaggatga tgaaaatgat ggccggcgga aaagaaacgt catttatgga ggattacacg 3960
taccattttg aaccgggcaa tgaaatgatc ctcggctccc acatgcttga agtgtgccct 4020
tcgattgccg aacacaaacc gagaattgaa gtccatccgc tgtcaatggg tgcaaaggat 4080
gatccggcgc ggctcgtgtt tgacggaatt gcaggtcctg cggtcaatgt ctcccttatt 4140
gatttgggcg gacgtttcag gcttgtcatc aatgaagtgg gagctgtgaa ggttccgcat 4200
gatatgccga atcttccggt ggcgcgcgta ctttggaagc ctcagccgtc tctgagaaca 4260
tcggctgaag cgtggatttt ggctggcggt gctcaccata catgcctttc gtaccagctg 4320
acagccgagc agatgctcga ttgggccgaa atgtcgggca ttgaagcggt gttgatcaat 4380
cgtgatacaa cgattttaaa tcttcgcaat gaactcaaat ggagtgaagc tgcatatcgg 4440
cttcgcaagt tttaaggggg tgaggactta tcccttacac aatcggagtt gactttggaa 4500
cattgtcagg gcgtgcagtt ctcgtcgatg tccggacagg tgaggaaatc gcgacagctg 4560
tcaaagagta cacgcacggg gtgatagacc gggagcttcc ggtctcaaag cgaaagcttc 4620
cgagagactg ggcgctccag catccggccg attacattga agtgctggag gaaacgattc 4680
cgagcctttt gaaacagtca aaagcggatc cgaaagaaat catcggaatc ggaatcgatt 4740
tcacggcttg cacgattttg cccgttgacg agaacgggac tcctctttgt atgagggaag 4800
agtatgcgtc agaaccgcac agctatgtga agctttggaa gcaccatgct gcacaggagc 4860
aggcgaatcg cttaaatcaa atcgcggaag aaagaaatga accttttctt caaacatacg 4920
gcgggaaaat ttcttccgag tggctcgttc caaaagtgat gcaaatcgcg gaagaagcgc 4980
ctgacattta tgatgccgca gccgagatca tggaagcggc cgactggatc gtctatatgc 5040
tgtgcggaac cagaaagcgc aacaattgca cagcgggtta taaagcgatt tggaacaata 5100
agagcggcta tccttccgac gatttcttcg caagcctgca tccgaagctg aaaaatatcg 5160
ttcgggaaaa actaacggag gatatttatt ctgtaggcga aaaagcgggc ggactgactg 5220
aagaaatggc cgggaagaca gggcttctgg caggtacggc ggtcgctgtc gcaaatgttg 5280
atgctcatgt gtcggttccg gcggtcggca tcacagagcc gggcaagatg ctgatgatca 5340
tgggaacgtc tacctgtcac atgctgctcg gcgaggatgt caggatggtg ccgggaatgt 5400
gcggcgtcgt tgaagacggg attctgccgg gctatgtcgg ctatgaagcg ggccaatcgt 5460
gcgttggcga ccattttcat tggctgattc aacactttgt tccagaagcg tatttgaaag 5520
aagctgaagc cgaagggatt tccatttacg aactgctgtc tcaaaaggcc ggcagtctcc 5580
aaatcggtga aagcggtttg cttgcattgg attggtggaa cggaaaccgt tcaacactcg 5640
ttgatgccga tctgacggga atgctgctcg gtatgaccct tgccactaag cctgaagaga 5700
tataccgtgc attggttgaa gcgactgcct gcgggacgag gatcattatt gaaacgttca 5760

```
gacaaagcgg cgtgccgatc gaggagctgt atgccgcagg aggaatcgcc gaaaaaaatc   5820
cgtttatcat gcaggtttac gcggatgtca ccaacatgga aatcaaaatt tccggatctc   5880
cgcaggcgcc ggctttaggt tcagcgatat tcggagcgct cgcggccgga agcatgaacg   5940
gcggttacga ccatatcgaa gaagcagtcg cacatatggg caagatcaag gataaaacgt   6000
acaaaccaat tcctgaaaac gtttccttat acgatcagct ttatgcggaa tataaggagc   6060
tttacacgta cttcggaaag caaaacaatg tgatgaaacg ccttaaaaaa ttgaaaaaca   6120
tccagtccct tagttctgac cccggtaaag cgatggctta gagggaggag aaaactgtgc   6180
tggaatcttt gaaagaacaa gtattaaaag cgaatttgca gcttgaagaa taccggcttg   6240
tcacctttac atggggaaat gtcagcggta ttgaccggga gaataagctg gtcgtcatca   6300
agccgagcgg tgtcaaatac agcgatttga aagccgaaga tttagtggtt ctgaatatgg   6360
acggcgagat tgtggaaggg gatctgaagc catcttccga tacgccgaca cacctctatc   6420
tttaccggca gtttcaatcg atcggcggga tcgtccatac gcattccccg tgggcgacaa   6480
gctgggctca gtcagggaag gacattccgt cgctcggaac gactcatgcc gactactacc   6540
acggcgacat tccgtgtaca cgggaaatgg atcccgatga aatcaggagt caatacgagc   6600
tgaatacagg aaaagtgatt gtagagacgt tccggcatct tgacccccctg gcggtgcccg   6660
ccgttctcgt gaacaatcac gggccgtttt gctggggaaa agacgcctta actgccgtac   6720
acaatgccgt cgtcctggaa gaagtcgcca agatggcgta ccgctccctg atgctgaatc   6780
cgtctcttaa gcggattaag agcgctttgc aggataagca ttattttcga aagcacgggg   6840
cagacgccta ttacggccaa tagaggaggg aagctgccaa tgaatgactt gatctcttat   6900
gtgaaaaaaa ctttgggcgc atgcgaatgc ggaaccgtcc accacccgct tacagtcgaa   6960
aaaatcgcga tcggcgacaa tgctgttgag caagagctgc ccgctttcgt gaaatcggct   7020
tcctataaaa aagccgctgt catttatgat gaaacgaccg gacggttagc cggcaagcgg   7080
attgcctctc ttcttgagga aacggctgaa acggttccgg tgctgctgga agctaatgaa   7140
gcgggcgatg tgacggcgga tgagcaaaca ttggtgagtg cattgatcgg tgtaccgatt   7200
gatgcggatg tactaattgc ggccggagcg ggcacgattc acgacatcgt caggttttgc   7260
gcctatcagc gcggcattcc gtttatttca gttcctacgg ctccgtcggt tgacggtttt   7320
acttcagccg gcgcaccgct gattttaaaa ggaaagaaac agacggttca aacgacagcg   7380
ccgatcgcgc tttttgccga tttggagctc ttgtgtcaag cgccgcagaa catggtagcc   7440
gcaggttttg gcgatatgct cggcaaggtg acgtcgcttg cggattggga gatttcccgc   7500
ttgcttgccg gcgagccgta ttgtccggcc gccagccggc tcacgaggga agcgcttgat   7560
caatgtcttg accttcaata atcgcatccg attgcagtat aaatttaacg atcactcatc   7620
atgttcatat ttatcagagc tcgtgctata attatactaa ttttataagg aggaaaaaat   7680
atgggcattt ttagtatttt tgtaatcagc acagttcatt atcaaccaaa caaaaaataa   7740
gtggttataa tgaatcgtta ataagcaaaa ttcatataac caaattaaag agggttataa   7800
tgaacgagaa aaatataaaa cacagtcaaa actttattac ttcaaaacat aatatagata   7860
aaataatgac aaatataaga ttaaatgaac atgataatat ctttgaaatc ggctcaggaa   7920
aaggccattt tacccttgaa ttagtaaaga ggtgtaattt cgtaactgcc attgaaatag   7980
accataaatt atgcaaaact acagaaaata aacttgttga tcacgataat ttccaagttt   8040
taaacaagga tatattgcag tttaaatttc ctaaaaacca atcctataaa atatatggta   8100
```

-continued

```
atataccta taacataagt acggatataa tacgcaaaat tgtttttgat agtatagcta   8160

atgagattta tttaatcgtg gaatacgggt ttgctaaaag attattaaat acaaaacgct   8220

cattggcatt acttttaatg gcagaagttg atatttctat attaagtatg gttccaagag   8280

aatattttca tcctaaacct aaagtgaata gctcacttat cagattaagt agaaaaaaat   8340

caagaatatc acacaaagat aaacaaaagt ataattattt cgttatgaaa tgggttaaca   8400

aagaatacaa gaaaatattt acaaaaaatc aatttaacaa ttccttaaaa catgcaggaa   8460

ttgacgattt aaacaatatt agctttgaac aattcttatc tcttttcaat agctataaat   8520

tatttaataa gtaagttaag ggatgcataa actgcatccc ttaacttgtt tttcgtgtgc   8580

ctattttttg tgaatcgatt atgtcttttg cgcagtttcc tggaatgtga tccgcctgaa   8640

aaaacagtca taagaatagc aaagccggag atttctctcc ggcttgtctt tcaactgcca   8700

cgagccggcc cattccagcc ggctttttgt ataggaaaaa atgaccgctt ttcaccatga   8760

aattatgata tatttatgaa aaacagaaaa ggggatggga gaaaatgaat gcggttacaa   8820

ttgtgatagc atcaatgtgt attttggcta ttgcctatcg tttatacgga acatttatga   8880

tggtgaaggt tctcaaagtg aatgatgaca agccaacacc tgctcatgcg cttgaggatg   8940

ggaaagacta tgtgcctaca aataaatggg tttcgttcgg ccaccacttt gccgcgatcg   9000

cagcggccgg gccgctggtc ggaccaattc tggcggcgca gtttggctat ttgccgggat   9060

tattgtggct gttaatcggg gcggtaattg gggagccgt ccatgatatt gtggtgttgt   9120

ttgcatcgat gcgcaaaaac ggaaaatcgc tgtcggaagt ggcgaaggat gagcttggcc   9180

ctgttgcagg attttgtaca ggactgtcca tgctgtttat catcacgatc acaatggcgg   9240

gcctgtcgat ggttgtcttg catgcgcttg aacgtaatcc atggggaaca tttgcggtgg   9300

ggattacgat tccgattgcg atgggtgtgg gcttatttta taagaaaacg ggaaatttaa   9360

agctcgcttc aacggtcggc tttctctttt taatggcagg agtctttatc ggtccatggg   9420

tacagactac cgcgctcggt gactttttaa cgctagatac gaaaacgctt gcaatcgcgc   9480

ttcctgttta tgcgtttttt gcggctgcgc ttcccgtttg gctgcttctg gctccgcgtg   9540

attatttaag cagctttatg aaaatcggtg tttttatcgc tttgattgtt ggtgtgtttg   9600

tcgtcaatcc gtccattccg ttccctgcgt ttacagaatt cgtaaaaggc ggagggccgg   9660

tgctggcagg acctgtctgg ccgttcatct caataaccat cgcctgcggg gcgatctctg   9720

ggttccatgc ctttgtcggc tcaggaacga caccgaaaat gctgaataaa tggagtgata   9780

tgaagccggt tgcgtttggc gcaatgcttg ttgagtgtct tgtcggtatc atggcgctga   9840

ttgcagcgac cgctttacag cctgctgatt actttgcgat taacagcacg cctgaggttt   9900

tccgtacgct tggcatgaat gtcgtacatt tgcctgaatt gagcggggaa atcggtttgg   9960

acttagaagg aagaacaggg ggagccgtca cgcttgcggt agggatgact tatatttttta  10020

ccggaatgcc gtttttcagc catttggcct catacttttt ccaatttgtc attatgtttg  10080

aagcggtctt tattttaaca gcgattgacg ccggcacacg tgtcgcccgt tatttgatcc  10140

aggacttctt cggggaggtg tataagccgc tgaagaaaac agactggatt ccgggctctg  10200

tatttgccag cgcgcttgcc tgtttgatgt gggggtactt gctgtattca ggagatatcg  10260

gttccatttg ggcgctcttc ggcgtttcta atcagctgat ggcttcagtg gggctgatta  10320

tcggagcgac gatcgtgctg aaaatcgccg ataaacgccg gtacattctg acttgcctta  10380

tcccgcttgc ctatttatat gtcactgtca attatgcggg ctattggatg gtgcgcaatg  10440

tgtatctcaa tcctgaagca gcaggatata gtgtattgaa tggcgtatta tctatcatca  10500
```

```
tgctggtgtt aggcttcatc attatcgtgg cggctgtgaa aaaatgggcg cagatgtgga  10560

aagatccgag cttaaggatg gaagcatcta taccgggcta gaaggactat tgaaaatgct  10620

gagaggggtt ggcaatgaat ctatcaatga aatatcttat tctatacgta tcggacagca  10680

agcgggctat tcattttta ccgggatatt ttaggactgc cgattcgtgc tgaacacggc  10740

acgtatgtcg aatttgatac agggtctacg atattggcgc ttaatacccg ggaaagcgcc  10800

agagacatca cggcgctgga cattccggat acatctgctt caaacacatt tgaaatcggg  10860

tttgttactg aaaatgtaga agcggtcatc aaaaggatga gagaacaagg cgtatcgatt  10920

atcggggagc cgaaagtgaa accatggggg cagacggtcg cctatatcgc tgatccggat  10980

ggacattata tcgaaatttg cagtccgatg gaataacgca caaaagccca aaacaatgtc  11040

tgttttgggc tttctcatga tgttttgtgc ccggctgctt ctaatagcaa atcagccagg  11100

tgaacggctc tgactttacc gcttagtcct tcgcgttcaa tgccgagctt catctgcagc  11160

aggcagccag gatttgctgt tacaatgagg atcgcttcgg ttgctttgac ggcagccatt  11220

ttgctgtcca gtattttcat agacatttca acttcgacga tgttgtaaat tcccgctgac  11280

ccgcagcagc tgtctgcttt ctccatttct ttgaattccg cccctttgat gcttttaaga  11340

agctggcggg gctcgagtga cgtatgcatc acatttctta gatgacatga atcttggtag  11400

gtaacgacct gaggcgtctc gagtgctaga tccatttgat ggaaatcgag ttcaaccaaa  11460

acagaagaaa aatccttcag cttttgaaca aaagcggcag cccgttccga ccactcaggg  11520

tcatccttca gcaaatgatc atattcagtg agaaaggctc cgcatcctcc tgcgtttgta  11580

atgactgcat ccacgtctaa tgcttcgaaa gca                                11613
```

<210> SEQ ID NO 48
<211> LENGTH: 11934
<212> TYPE: DNA
<213> ORGANISM: Bacillus licheniformis
<220> FEATURE:
<221> NAME/KEY: misc_feature
<222> LOCATION: (1)..(529)
<223> OTHER INFORMATION: The araB gene.
<220> FEATURE:
<221> NAME/KEY: primer_bind
<222> LOCATION: (1)..(23)
<223> OTHER INFORMATION: Primer 30013
<220> FEATURE:
<221> NAME/KEY: primer_bind
<222> LOCATION: (31)..(55)
<223> OTHER INFORMATION: Primer 30007
<220> FEATURE:
<221> NAME/KEY: misc_feature
<222> LOCATION: (548)..(1231)
<223> OTHER INFORMATION: The araD gene.
<220> FEATURE:
<221> NAME/KEY: misc_feature
<222> LOCATION: (1251)..(1943)
<223> OTHER INFORMATION: The araM' sequence.
<220> FEATURE:
<221> NAME/KEY: misc_feature
<222> LOCATION: (2171)..(2902)
<223> OTHER INFORMATION: The erm gene.
<220> FEATURE:
<221> NAME/KEY: primer_bind
<222> LOCATION: (2963)..(3010)
<223> OTHER INFORMATION: Primer 30590
<220> FEATURE:
<221> NAME/KEY: primer_bind
<222> LOCATION: (2963)..(2986)
<223> OTHER INFORMATION: Primer 27095 complement
<220> FEATURE:
<221> NAME/KEY: misc_feature
<222> LOCATION: (3053)..(3832)

<223> OTHER INFORMATION: The spec gene.
<220> FEATURE:
<221> NAME/KEY: primer_bind
<222> LOCATION: (3827)..(3874)
<223> OTHER INFORMATION: Primer 30017 complement
<220> FEATURE:
<221> NAME/KEY: primer_bind
<222> LOCATION: (3851)..(3900)
<223> OTHER INFORMATION: Primer 30019
<220> FEATURE:
<221> NAME/KEY: misc_feature
<222> LOCATION: (3880)..(4312)
<223> OTHER INFORMATION: The 'araM gene.
<220> FEATURE:
<221> NAME/KEY: misc_feature
<222> LOCATION: (4312)..(5613)
<223> OTHER INFORMATION: The araN gene.
<220> FEATURE:
<221> NAME/KEY: misc_feature
<222> LOCATION: (5647)..(6588)
<223> OTHER INFORMATION: The araP gene.
<220> FEATURE:
<221> NAME/KEY: misc_feature
<222> LOCATION: (6591)..(7430)
<223> OTHER INFORMATION: The araQ gene.
<220> FEATURE:
<221> NAME/KEY: misc_feature
<222> LOCATION: (7469)..(8936)
<223> OTHER INFORMATION: The abfA gene.
<220> FEATURE:
<221> NAME/KEY: primer_bind
<222> LOCATION: (8912)..(8959)
<223> OTHER INFORMATION: Primer 30018
<220> FEATURE:
<221> NAME/KEY: primer_bind
<222> LOCATION: (8912)..(8936)
<223> OTHER INFORMATION: Primer 30020
<220> FEATURE:
<221> NAME/KEY: primer_bind
<222> LOCATION: (11877)..(11899)
<223> OTHER INFORMATION: Primer 30008 complement
<220> FEATURE:
<221> NAME/KEY: primer_bind
<222> LOCATION: (11909)..(11934)
<223> OTHER INFORMATION: Primer 30011 complement

<400> SEQUENCE: 48
ttcaacactc gttgatgccg atctgacggg aatgctgctc ggtatgaccc ttgccactaa 60
gcctgaagag atataccgtg cattggttga agcgactgcc tgcgggacga ggatcattat 120
tgaaacgttc agacaaagcg gcgtgccgat cgaggagctg tatgccgcag gaggaatcgc 180
cgaaaaaaat ccgtttatca tgcaggttta cgcggatgtc accaacatgg aaatcaaaat 240
ttccggatct ccgcaggcgc cggctttagg ttcagcgata ttcggagcgc tcgcggccgg 300
aagcatgaac ggcggttacg accatatcga agaagcagtc gcacatatgg gcaagatcaa 360
ggataaaacg tacaaaccaa ttcctgaaaa cgtttcctta tacgatcagc tttatgcgga 420
atataaggag ctttacacgt acttcggaaa gcaaaacaat gtgatgaaac gccttaaaaa 480
attgaaaaac atccagtccc ttagttctga ccccggtaaa gcgatggctt agagggagga 540
gaaaactgtg ctggaatctt tgaaagaaca agtattaaaa gcgaatttgc agcttgaaga 600
ataccggctt gtcaccttta catggggaaa tgtcagcggt attgaccggg agaataagct 660
ggtcgtcatc aagccgagcg gtgtcaaata cagcgatttg aaagccgaag atttagtggt 720
tctgaatatg gacggcgaga ttgtggaagg ggatctgaag ccatcttccg atacgccgac 780
acacctctat ctttaccggc agtttcaatc gatcggcggg atcgtccata cgcattcccc 840
gtgggcgaca agctgggctc agtcagggaa ggacattccg tcgctcggaa cgactcatgc 900
cgactactac cacggcgaca ttccgtgtac acgggaaatg gatcccgatg aaatcaggag 960
tcaatacgag ctgaatacag gaaaagtgat tgtagagacg ttccggcatc ttgaccccct 1020
ggcggtgccc gccgttctcg tgaacaatca cgggccgttt tgctggggaa aagacgcctt 1080
aactgccgta cacaatgccg tcgtcctgga agaagtcgcc aagatggcgt accgctccct 1140
gatgctgaat ccgtctctta agcggattaa gagcgctttg caggataagc attattttcg 1200
aaagcacggg gcagacgcct attacggcca atagaggagg gaagctgcca atgaatgact 1260
tgatctctta tgtgaaaaaa actttgggcg catgcgaatg cggaaccgtc caccacccgc 1320
ttacagtcga aaaaatcgcg atcggcgaca atgctgttga gcaagagctg cccgctttcg 1380
tgaaatcggc ttcctataaa aaagccgctg tcatttatga tgaaacgacc ggacggttag 1440
ccggcaagcg gattgcctct cttcttgagg aaacggctga aacggttccg gtgctgctgg 1500
aagctaatga agcgggcgat gtgacggcgg atgagcaaac attggtgagt gcattgatcg 1560
gtgtaccgat tgatgcggat gtactaattg cggccggagc gggcacgatt cacgacatcg 1620
tcaggttttg cgcctatcag cgcggcattc cgtttatttc agttcctacg gctccgtcgg 1680
ttgacggttt tacttcagcc ggcgcaccgc tgattttaaa aggaaagaaa cagacggttc 1740
aaacgacagc gccgatcgcg ctttttgccg atttggagct cttgtgtcaa gcgccgcaga 1800
acatggtagc cgcaggtttt ggcgatatgc tcggcaaggt gacgtcgctt gcggattggg 1860
agatttcccg cttgcttgcc ggcgagccgt attgtccggc cgccagccgg ctcacgaggg 1920
aagcgcttga tcaatgtctt gaccttcaat aatcgcatcc gattgcagta taaatttaac 1980
gatcactcat catgttcata tttatcagag ctcgtgctat aattatacta attttataag 2040
gaggaaaaaa tatgggcatt tttagtattt ttgtaatcag cacagttcat tatcaaccaa 2100
acaaaaaata agtggttata atgaatcgtt aataagcaaa attcatataa ccaaattaaa 2160
gagggttata atgaacgaga aaaatataaa acacagtcaa aactttatta cttcaaaaca 2220
taatatagat aaaataatga caaatataag attaaatgaa catgataata tctttgaaat 2280
cggctcagga aaaggccatt ttacccttga attagtaaag aggtgtaatt tcgtaactgc 2340
cattgaaata gaccataaat tatgcaaaac tacagaaaat aaacttgttg atcacgataa 2400
tttccaagtt ttaaacaagg atatattgca gtttaaattt cctaaaaacc aatcctataa 2460
aatatatggt aatatacctt ataacataag tacggatata atacgcaaaa ttgtttttga 2520
tagtatagct aatgagattt atttaatcgt ggaatacggg tttgctaaaa gattattaaa 2580
tacaaaacgc tcattggcat tacttttaat ggcagaagtt gatatttcta tattaagtat 2640
ggttccaaga gaatattttc atcctaaacc taaagtgaat agctcactta tcagattaag 2700
tagaaaaaaa tcaagaatat cacacaaaga taaacaaaag tataattatt tcgttatgaa 2760
atgggttaac aaagaataca agaaaatatt tacaaaaaat caatttaaca attccttaaa 2820
acatgcagga attgacgatt taaacaatat tagctttgaa caattcttat ctcttttcaa 2880
tagctataaa ttatttaata agtaagttaa gggatgcata aactgcatcc cttaacttgt 2940
ttttcgtgtg cctatttttt gtgaatcgat tatgtctttt gcgcagccaa tctagggtaa 3000
gtaaattgag atataatata atttgtatga acataatcaa cgaggtgaaa tcatgagcaa 3060
tttgattaac ggaaaaatac caaatcaagc gattcaaaca ttaaaaatcg taaaagattt 3120
atttggaagt tcaatagttg gagtatatct atttggttca gcagtaaatg gtggtttacg 3180
cattaacagc gatgtagatg ttctagtcgt cgtgaatcat agtttacctc aattaactcg 3240
aaaaaaacta acagaaagac taatgactat atcaggaaag attggaaata cggattctgt 3300

```
tagaccactt gaagttacgg ttataaatag gagtgaagtt gtcccttggc aatatcctcc   3360
aaaaagagaa tttatatacg gtgagtggct caggggtgaa tttgagaatg gacaaattca   3420
ggaaccaagc tatgatcctg atttggctat tgttttagca caagcaagaa agaatagtat   3480
ttctctattt ggtcctgatt cttcaagtat acttgtctcc gtacctttga cagatattcg   3540
aagagcaatt aaggattctt tgccagaact aattgagggg ataaaaggtg atgagcgtaa   3600
tgtaatttta accctagctc gaatgtggca aacagtgact actggtgaaa ttacctcgaa   3660
agatgtcgct gcagaatggg ctatacctct tttacctaaa gagcatgtaa ctttactgga   3720
tatagctaga aaaggctatc ggggagagtg tgatgataag tgggaaggac tatattcaaa   3780
ggtgaaagca ctcgttaagt atatgaaaaa ttctatagaa acttctctca attaggctaa   3840
ttttatagca ccaacaggtg cttactttta aaactacgtc atgctggttc tcgaccattc   3900
aaggccggct tccggcggcg agcaccatct ttcccactac cttgaaatga aagcgctgga   3960
gaacaataag cggcaagtgc tccacggtgc taaagtcggc tgcagcgcga ttatgctgac   4020
tgacatttac cgatctctta tcggtgcaag cctgggtgat caacacgctg agcaagcgat   4080
tcgctccgtt tatgaaaagc tccctgacgg taagaaaatg gcagagtgga tgaggcgtat   4140
cggcgggcct gtatcattca aagaactcga tgttgaagaa gagctggtga gagaagcgct   4200
cgcatacgcc catcagctca gagaccggta tacgggactg aaaatcatca atcaatacgg   4260
ccttttgccg gggcttttag gcaaaggacc aggcgtgaaa ggggttaaaa tgtgaaaagg   4320
ttcctttcat ctatctttat ggtcacggtc gctgtatgtt tgcttttatc ggggtgcaag   4380
gcgagtcctg cctccgatca agcggacggc accgaactga cattttggac attcaacggc   4440
cttcatgaac agttttatgc tgagatggtg aaagaatgga acaaaaagta tcccgagcga   4500
aaaatcaaat taaatacagt ggtgtatccg tatggacaga tgcatgacaa tttatctatc   4560
tcgcttttag ccgggaaagg ggttccagat attgccgatg ttgagctggg gcgctattcg   4620
aactttttga agggctctga cattcctctt accgatttaa cgccgcttgt ggaggacgaa   4680
cgcgacaagt ttgttgaagc gaggctgacg ctctacagca agaacggcaa gctttacgga   4740
cttgacacac atgtcggaac taccgtgatg tattacaaca tggaaatgat gaataaagca   4800
ggcgttgatc cggacgacat caaaacatgg gaagattaca gggaagcggg caaaaaggtc   4860
gtcaaagctc tcggaaagcc gatgacgacg attgaaacga ccgaccccaa ttcatttctg   4920
ccgctggttt cccagcaggg atccggttac tttgatgagc aggggcggtt gacattaaac   4980
aatgagacaa acgtgaaaac gctcgaattt ttaaagactt taattgagaa agacaaaatt   5040
gccgtcacaa cgcccggagg caatcatcac agtgaagagt attacggatt tatgaaccaa   5100
ggcggcgcgg cgtctgtctt aatgccgatc tggtatatgg gccgtttttt ggattatatg   5160
cctgacttga aagggaaaat cgcgatcaga ccgctgccgg catgggaaga agggggagac   5220
cgctcagcgg gaatgggcgg aacggccacc gtgattccaa aacaggcgaa acaggtcgat   5280
ctggccaagg atttcttgaa atttgccaaa gcgtcaaaag aaggcaacac caagctgtgg   5340
accgtgctcg ggttcgatcc gctcagatgg gatgtgtggg actcggacga attgaaaaaa   5400
acaaatcaat atacagaata ctttcaaaac ggacaacaca tcttttccgt gcttcttgac   5460
ataaaggatg agatcaatcc gctttacctt actgaggatt atgcgaagac ttccgatctc   5520
gtcaacagaa acatactgta cgaagcgctc aaaacgaaga gcaaaacacc gaaagaagca   5580
ttggacaaag cagcagctga agtgaaaggg caatagtctt tcattactgt aaagcgaggc   5640
gataacttga agactgttaa aacagataca gtgcattcgt ttccgccggt gagcagaaaa   5700
```

```
agaaagatca gacgtttatt atattcagca aaagccgcac cctacatttt tacagcacct   5760
tttgtactct ccttttgcat attttttctt tatccgctta tcagcgtcgt catcatgagt   5820
tttcaaagca ttctccccgg ggaagtccgc ttcatcggga cggagaacta taaagcatta   5880
aacaatccta cattttatac cgcactattc aacaccgtaa aatacacctt ttggacattg   5940
ctgattttaa tacctgttcc tcttattctg gcagtctttt tagattctaa actcgtaaag   6000
tttaaaaacg tgttcaaatc ggctttattc atcccggctc tgacttcaac cattgtggcg   6060
gggattattt tcaggctgat tttggagaa atggatacat ccctggcgaa ttcgatattg   6120
gctaagctcg gaggttcgcc gtacaactgg ctgaacaatg aacataccgg catgttttta   6180
atggtgatgc tcgcatcttg gagatggatg gggatcaatg tcctgtactt tttggcgggc   6240
ttgcagaacg ttccgaaaga attgtatgaa gctgccgaaa tcgacggggc aggcacgttc   6300
aagaagtttt accatattac gcttccgttt ttaaagcccg tcagcgtcta cgtgctgacg   6360
atcagcatca tcggcggctt ccggatgttt gaagaaagct acgtgctgtg gcagaacaac   6420
tctccgggca acatcggcct gacgatggtc ggatacattt atcagcaggg gcttgcctac   6480
aacaacatgg gctacggatc ggcgctcggc atcgtgctct tgatcatcat tttcatctgc   6540
agcctcattt cattaaagct gtctggatct tttaaaaagg agggctatta atgcgtcctg   6600
ccggaggcct caacattgcg aaagtagctc tgtttctgct gtttgcgata ttaagctttt   6660
tgtttgtgtt tccgctcttc tgccttgtac tcggctcgct caagccatct tcggaattgc   6720
tgcgcttcgg cctgaattta aagctgagcc ctgaaatcct gagccttgac aattacactt   6780
acttgtttaa cggaggcagc atttatttc aatggttttc gaacagcttg attctcgtgg   6840
tgatatccac cgtgctgacg ctcttgtttt cttcaatggt cggatacggg cttgccgtct   6900
acgactttaa aggaaaaaat ctcttgttcg tagccgtgct cctgatcatg atggtgccga   6960
tcgaaattct catgctgcct ttatttaaaa tgacggtttc tcttcatatt gtcgacacat   7020
acgccggtgt gatcctgccg tttatcgtct cgcctgtagc cgtgtttttc ttcagacagt   7080
atgcgctcgg cctgccgaga gatttgcttg attccgcgag aatggacggc tgcacagagt   7140
tcggcattta cttcaggatc atggcgccct tgatgaagcc ggcatttgga gcgatgatca   7200
ttcttcaatc cttaaacagc tggaacaact tcttatggcc gctgatcgtt ttgcgatcga   7260
aagaaatgtt tacgctccca atcggactgt ccgctttgct cagtccgtac gggaacaatt   7320
atgacatgtt gatttcgggt tctgtgctgg cgattctgcc cgtgattctc atcttcctgt   7380
tcttccagaa gtactttata tcaggtttga cggcgggcgg aatcaaaggc tgatccacta   7440
tatatcatct tgaaaggaat gatttaacat gactgtacac aaagcgaaga tgacgattga   7500
caaggaatat aaggtggcag agattgataa gcgaatttac ggctccttta tcgagcatct   7560
cggcagagcc gtttatgaag gcatttatga gcctgatcat cctgaagctg acgaatcagg   7620
ctttcggaaa gatgtcatta aactagtcag agaactaaag gtgccgttta tcaggtatcc   7680
cggcggaaac tttgtatctg gatataactg ggaggatgga gtcggacctg tcgaacagcg   7740
gccgacaaga cttgatttgg cgtgggcgac aaccgagccg aacttaatcg gtacgaacga   7800
atttatggat tgggcaaagc ttgtcggggc agaggtgaat atggccgtca acctcggaac   7860
gagaggaatt gatgccgcac gcaacctagt agaatattgc aaccatccgt caggatcgta   7920
ctacagcgac ttgagaaaat cccacggata taaggaaccg cataaaatta aaacatggtg   7980
cctcggcaat gaaatggacg gtccatggca aatcggccat aaaacagcgg ccgaatacgg   8040
```

aagacttgct gctgaagccg cgaaggtgat gaaatggacg gacccgtcga tcgagcttgt 8100
cgcctgcgga agttcgggaa gcggaatgcc gacattcatc gactgggaaa cgaccgtgct 8160
tgaccatacg tacgaacacg tcgagtacat ctcgcttcac tcgtattacg gcaaccgcga 8220
caatgatctt ccaaactatt tggcgagatc gctagacatg gatcacttta tcaaaacggt 8280
catctcagtc tgcgactata tgaaagcgaa aaagaaaagc aagaaaacga ttcacctttc 8340
atatgatgag tggaatgtct ggtatcactc gaatgaaaaa gacaaagaag ctgaacgctg 8400
ggcgaaagcg ccgcaccttc ttgaagacat ctacaacttt gaggatgcgc ttctcgtcgg 8460
ctgtatgctg attacgatgc tcaagcatgc cgaccgcgtg aaaatcgcct gtctggctca 8520
gcttgtcaat gtcatcgcgc cgattatgac agacaaaggg ggagaagcat ggcgtcagac 8580
cattttctat ccgtttatgc acgcttccgt ctacggcaga ggaacggtac tgcagacggc 8640
ggtatcgtct ccaaagtatg atgcgaaaga ctttacggat gtgccgtact tggagtccgt 8700
gtctgttttc aatgaagaag ccgaggaatt aaccgttttt gccgtcaacc gcgcaacaga 8760
cgccggcctt gaaatggaag ccgatatgag aagctttgaa gggtacagtg tctctgagca 8820
catcgttctg gaacacgaag atcataaagc gacgaatgaa aaagaccgca acaacgtcgt 8880
tccgcacagc ggcggagacg ccaaagtatg tgacggcagg ctgacggctc accttctttc 8940
ctggaatgtg atccgcctga aaaaacagtc ataagaatag caaagccgga gatttctctc 9000
cggcttgtct ttcaactgcc acgagccggc ccattccagc cggctttttg tataggaaaa 9060
aatgaccgct tttcaccatg aaattatgat atatttatga aaaacagaaa aggggatggg 9120
agaaaatgaa tgcggttaca attgtgatag catcaatgtg tattttggct attgcctatc 9180
gtttatacgg aacatttatg atggtgaagg ttctcaaagt gaatgatgac aagccaacac 9240
ctgctcatgc gcttgaggat gggaaagact atgtgcctac aaataaatgg gtttcgttcg 9300
gccaccactt tgccgcgatc gcagcggccg ggccgctggt cggaccaatt ctggcggcgc 9360
agtttggcta tttgccggga ttattgtggc tgttaatcgg ggcggtaatt gggggagccg 9420
tccatgatat tgtggtgttg tttgcatcga tgcgcaaaaa cggaaaatcg ctgtcggaag 9480
tggcgaagga tgagcttggc cctgttgcag gattttgtac aggactgtcc atgctgttta 9540
tcatcacgat cacaatggcg ggcctgtcga tggttgtctt gcatgcgctt gaacgtaatc 9600
catggggaac atttgcggtg ggattacga ttccgattgc gatgggtgtg ggcttatttt 9660
ataagaaaac gggaaattta aagctcgctt caacggtcgg ctttctcttt ttaatggcag 9720
gagtctttat cggtccatgg gtacagacta ccgcgctcgg tgacttttta acgctagata 9780
cgaaaacgct tgcaatcgcg cttcctgttt atgcgttttt tgcggctgcg cttcccgttt 9840
ggctgcttct ggctccgcgt gattatttaa gcagctttat gaaaatcggt gtttttatcg 9900
ctttgattgt tggtgtgttt gtcgtcaatc cgtccattcc gttccctgcg tttacagaat 9960
tcgtaaaagg cggagggccg gtgctggcag gacctgtctg gccgttcatc tcaataacca 10020
tcgcctgcgg ggcgatctct gggttccatg cctttgtcgg ctcaggaacg acaccgaaaa 10080
tgctgaataa atggagtgat atgaagccgg ttgcgtttgg cgcaatgctt gttgagtgtc 10140
ttgtcggtat catggcgctg attgcagcga ccgctttaca gcctgctgat tactttgcga 10200
ttaacagcac gcctgaggtt ttccgtacgc ttggcatgaa tgtcgtacat ttgcctgaat 10260
tgagcgggga aatcggtttg gacttagaag gaagaacagg gggagccgtc acgcttgcgg 10320
tagggatgac ttatattttt accggaatgc cgtttttcag ccatttggcc tcatactttt 10380
tccaatttgt cattatgttt gaagcggtct ttattttaac agcgattgac gccggcacac 10440

```
gtgtcgcccg ttatttgatc caggacttct tcggggaggt gtataagccg ctgaagaaaa  10500

cagactggat tccgggctct gtatttgcca gcgcgcttgc ctgtttgatg tgggggtact  10560

tgctgtattc aggagatatc ggttccattt gggcgctctt cggcgtttct aatcagctga  10620

tggcttcagt ggggctgatt atcggagcga cgatcgtgct gaaaatcgcc gataaacgcc  10680

ggtacattct gacttgcctt atcccgcttg cctatttata tgtcactgtc aattatgcgg  10740

gctattggat ggtgcgcaat gtgtatctca atcctgaagc agcaggatat agtgtattga  10800

atggcgtatt atctatcatc atgctggtgt taggcttcat cattatcgtg gcggctgtga  10860

aaaaatgggc gcagatgtgg aaagatccga gcttaaggat ggaagcatct ataccgggct  10920

agaaggacta ttgaaaatgc tgagaggggt tggcaatgaa tctatcaatg aaatatctta  10980

ttctatacgt atcggacagc aagcgggcta ttcatttttt accgggatat tttaggactg  11040

ccgattcgtg ctgaacacgg cacgtatgtc gaatttgata cagggtctac gatattggcg  11100

cttaataccc gggaaagcgc cagagacatc acggcgctgg acattccgga tacatctgct  11160

tcaaacacat ttgaaatcgg gtttgttact gaaaatgtag aagcggtcat caaaaggatg  11220

agagaacaag gcgtatcgat tatcggggag ccgaaagtga aaccatgggg gcagacggtc  11280

gcctatatcg ctgatccgga tggacattat atcgaaattt gcagtccgat ggaataacgc  11340

acaaaagccc aaaacaatgt ctgttttggg ctttctcatg atgttttgtg cccggctgct  11400

tctaatagca aatcagccag gtgaacggct ctgactttac cgcttagtcc ttcgcgttca  11460

atgccgagct tcatctgcag caggcagcca ggatttgctg ttacaatgag gatcgcttcg  11520

gttgctttga cggcagccat tttgctgtcc agtattttca tagacatttc aacttcgacg  11580

atgttgtaaa ttcccgctga cccgcagcag ctgtctgctt tctccatttc tttgaattcc  11640

gccccttga tgcttttaag aagctggcgg ggctcgagtg acgtatgcat cacatttctt  11700

agatgacatg aatcttggta ggtaacgacc tgaggcgtct cgagtgctag atccatttga  11760

tggaaatcga gttcaaccaa aacagaagaa aaatccttca gcttttgaac aaaagcggca  11820

gcccgttccg accactcagg gtcatccttc agcaaatgat catattcagt gagaaaggct  11880

ccgcatcctc ctgcgtttgt aatgactgca tccacgtcta atgcttcgaa agca        11934
```

<210> SEQ ID NO 49
<211> LENGTH: 7330
<212> TYPE: DNA
<213> ORGANISM: Bacillus licheniformis
<220> FEATURE:
<221> NAME/KEY: misc_feature
<222> LOCATION: (1)..(1646)
<223> OTHER INFORMATION: The araB gene
<220> FEATURE:
<221> NAME/KEY: primer_bind
<222> LOCATION: (1)..(23)
<223> OTHER INFORMATION: Primer 35881
<220> FEATURE:
<221> NAME/KEY: primer_bind
<222> LOCATION: (1)..(3060)
<223> OTHER INFORMATION: B. licheniformis DNA
<220> FEATURE:
<221> NAME/KEY: primer_bind
<222> LOCATION: (25)..(48)
<223> OTHER INFORMATION: Primer 36818
<220> FEATURE:
<221> NAME/KEY: misc_feature
<222> LOCATION: (1665)..(2348)
<223> OTHER INFORMATION: The araD gene
<220> FEATURE:
<221> NAME/KEY: misc_feature
<222> LOCATION: (2368)..(3060)

<223> OTHER INFORMATION: The araM' sequence.
<220> FEATURE:
<221> NAME/KEY: primer_bind
<222> LOCATION: (3036)..(3082)
<223> OTHER INFORMATION: Primer 35895 complement
<220> FEATURE:
<221> NAME/KEY: primer_bind
<222> LOCATION: (3037)..(3082)
<223> OTHER INFORMATION: Primer 35876
<220> FEATURE:
<221> NAME/KEY: misc_feature
<222> LOCATION: (3110)..(3222)
<223> OTHER INFORMATION: The res sequence.
<220> FEATURE:
<221> NAME/KEY: misc_feature
<222> LOCATION: (3352)..(3999)
<223> OTHER INFORMATION: The cat sequence complementary
<220> FEATURE:
<221> NAME/KEY: misc_feature
<222> LOCATION: (4131)..(4265)
<223> OTHER INFORMATION: The res sequence.
<220> FEATURE:
<221> NAME/KEY: primer_bind
<222> LOCATION: (4282)..(4330)
<223> OTHER INFORMATION: Primer 35878
<220> FEATURE:
<221> NAME/KEY: primer_bind
<222> LOCATION: (4282)..(4306)
<223> OTHER INFORMATION: Primer 656520 complement
<220> FEATURE:
<221> NAME/KEY: misc_feature
<222> LOCATION: (4307)..(4739)
<223> OTHER INFORMATION: The 'araM sequence.
<220> FEATURE:
<221> NAME/KEY: primer_bind
<222> LOCATION: (4307)..(7330)
<223> OTHER INFORMATION: B. licheniformis DNA
<220> FEATURE:
<221> NAME/KEY: misc_feature
<222> LOCATION: (4739)..(6040)
<223> OTHER INFORMATION: The araN sequence.
<220> FEATURE:
<221> NAME/KEY: misc_feature
<222> LOCATION: (6074)..(7015)
<223> OTHER INFORMATION: The araP sequence.
<220> FEATURE:
<221> NAME/KEY: misc_feature
<222> LOCATION: (7018)..(7330)
<223> OTHER INFORMATION: The araQ sequence.
<220> FEATURE:
<221> NAME/KEY: primer_bind
<222> LOCATION: (7284)..(7306)
<223> OTHER INFORMATION: Primer 36817 complement
<220> FEATURE:
<221> NAME/KEY: primer_bind
<222> LOCATION: (7309)..(7330)
<223> OTHER INFORMATION: Primer 35880 complement

<400> SEQUENCE: 49
gtgcagttct cgtcgatgtc cggacaggtg aggaaatcgc gacagctgtc aaagagtaca 60
cgcacggggt gatagaccgg gagcttccgg tctcaaagcg aaagcttccg agagactggg 120
cgctccagca tccggccgat tacattgaag tgctggagga aacgattccg agccttttga 180
aacagtcaaa agcggatccg aaagaaatca tcggaatcgg aatcgatttc acggcttgca 240
cgattttgcc cgttgacgag aacgggactc ctctttgtat gagggaagag tatgcgtcag 300
aaccgcacag ctatgtgaag ctttggaagc accatgctgc acaggagcag gcgaatcgct 360
taaatcaaat cgcggaagaa agaaatgaac cttttcttca aacatacggc gggaaaattt 420
cttccgagtg gctcgttcca aaagtgatgc aaatcgcgga agaagcgcct gacatttatg 480
atgccgcagc cgagatcatg gaagcggccg actggatcgt ctatatgctg tgcggaacca 540
gaaagcgcaa caattgcaca gcgggttata aagcgatttg gaacaataag agcggctatc 600

```
cttccgacga tttcttcgca agcctgcatc cgaagctgaa aaatatcgtt cgggaaaaac    660
taacggagga tatttattct gtaggcgaaa aagcgggcgg actgactgaa gaaatggccg    720
ggaagacagg gcttctggca ggtacggcgg tcgctgtcgc aaatgttgat gctcatgtgt    780
cggttccggc ggtcggcatc acagagccgg gcaagatgct gatgatcatg ggaacgtcta    840
cctgtcacat gctgctcggc gaggatgtca ggatggtgcc gggaatgtgc ggcgtcgttg    900
aagacgggat tctgccgggc tatgtcggct atgaagcggg ccaatcgtgc gttggcgacc    960
attttcattg gctgattcaa cactttgttc cagaagcgta tttgaaagaa gctgaagccg   1020
aagggatttc catttacgaa ctgctgtctc aaaaggccgg cagtctccaa atcggtgaaa   1080
gcggtttgct tgcattggat tggtggaacg gaaaccgttc aacactcgtt gatgccgatc   1140
tgacgggaat gctgctcggt atgacccttg ccactaagcc tgaagagata taccgtgcat   1200
tggttgaagc gactgcctgc gggacgagga tcattattga aacgttcaga caaagcggcg   1260
tgccgatcga ggagctgtat gccgcaggag gaatcgccga aaaaaatccg tttatcatgc   1320
aggtttacgc ggatgtcacc aacatggaaa tcaaaatttc cggatctccg caggcgccgg   1380
ctttaggttc agcgatattc ggagcgctcg cggccggaag catgaacggc ggttacgacc   1440
atatcgaaga agcagtcgca catatgggca agatcaagga taaaacgtac aaaccaattc   1500
ctgaaaacgt ttccttatac gatcagcttt atgcggaata taaggagctt tacacgtact   1560
tcggaaagca aaacaatgtg atgaaacgcc ttaaaaaatt gaaaaacatc cagtccctta   1620
gttctgaccc cggtaaagcg atggcttaga gggaggagaa aactgtgctg gaatctttga   1680
aagaacaagt attaaaagcg aatttgcagc ttgaagaata ccggcttgtc acctttacat   1740
ggggaaatgt cagcggtatt gaccgggaga ataagctggt cgtcatcaag ccgagcggtg   1800
tcaaatacag cgatttgaaa gccgaagatt tagtggttct gaatatggac ggcgagattg   1860
tggaagggga tctgaagcca tcttccgata cgccgacaca cctctatctt taccggcagt   1920
ttcaatcgat cggcgggatc gtccatacgc attccccgtg ggcgacaagc tgggctcagt   1980
cagggaagga cattccgtcg ctcggaacga ctcatgccga ctactaccac ggcgacattc   2040
cgtgtacacg ggaaatggat cccgatgaaa tcaggagtca atacgagctg aatacaggaa   2100
aagtgattgt agagacgttc cggcatcttg accccctggc ggtgcccgcc gttctcgtga   2160
acaatcacgg gccgttttgc tggggaaaag acgccttaac tgccgtacac aatgccgtcg   2220
tcctggaaga agtcgccaag atggcgtacc gctccctgat gctgaatccg tctcttaagc   2280
ggattaagag cgctttgcag gataagcatt attttcgaaa gcacggggca gacgcctatt   2340
acggccaata gaggagggaa gctgccaatg aatgacttga tctcttatgt gaaaaaaact   2400
ttgggcgcat gcgaatgcgg aaccgtccac cacccgctta cagtcgaaaa aatcgcgatc   2460
ggcgacaatg ctgttgagca agagctgccc gctttcgtga aatcggcttc ctataaaaaa   2520
gccgctgtca tttatgatga aacgaccgga cggttagccg gcaagcggat tgcctctctt   2580
cttgaggaaa cggctgaaac ggttccggtg ctgctggaag ctaatgaagc gggcgatgtg   2640
acggcggatg agcaaacatt ggtgagtgca ttgatcggtg taccgattga tgcggatgta   2700
ctaattgcgg ccggagcggg cacgattcac gacatcgtca ggttttgcgc ctatcagcgc   2760
ggcattccgt ttatttcagt tcctacggct ccgtcggttg acggttttac ttcagccggc   2820
gcaccgctga ttttaaaagg aaagaaacag acggttcaaa cgacagcgcc gatcgcgctt   2880
tttgccgatt tggagctctt gtgtcaagcg ccgcagaaca tggtagccgc aggttttggc   2940
```

```
gatatgctcg gcaaggtgac gtcgcttgcg gattgggaga tttcccgctt gcttgccggc   3000
gagccgtatt gtccggccgc cagccggctc acgagggaag cgcttgatca atgtcttgac   3060
taagttaagg tggatacaca tcttgtcata tgatcaatgg ttcggatctg attttcctcc   3120
tctaatatgc tcaacttaaa tgacctattc aataaatcta ttatgctgct aaatagttta   3180
taggacaaat aagtatactc taatgaccta taaaagatag aaaattaaaa aatcaagtgt   3240
tcgcttctct ctcacggagc tgtaatataa aaaccttctt cagctaacgg ggcaggttag   3300
tgacattaga aaaccgactg tagaaagtac agtcggcatt atctcatatt ataaaagcca   3360
gtcattaggc ctatctgaca attcctgaat agagttcata aacaatcctg catgataacc   3420
atcacaaaca gaatgatgta cctgtaaaga tagcggtaaa tatattgaat tacctttatt   3480
aatgaatttt cctgctgtaa taatgggtag aaggtaatta ctattattat tgatatttaa   3540
gttaaaccca gtaaatgaag tccatggaat aatagaaaga gaaaaagcat tttcaggtat   3600
aggtgttttg ggaaacaatt tccccgaacc attatatttc tctacatcag aaaggtataa   3660
atcataaaac tctttgaagt cattctttac aggagtccaa ataccagaga atgttttaga   3720
tacaccatca aaaattgtat aaagtggctc taacttatcc caataaccta actctccgtc   3780
gctattgtaa ccagttctaa aagctgtatt tgagtttatc acccttgtca ctaagaaaat   3840
aaatgcaggg taaaatttat atccttcttg ttttatgttt cggtataaaa cactaatttc   3900
aatttctgtg gttatactaa aagtcgtttg ttggttcaaa taatgattaa atatctcttt   3960
tctcttccaa ttgtctaaat caattttatt aaagttcatt tgatatgcct cctaaatttt   4020
tatctaaagt gaatttagga ggcttacttg tctgctttct tcattagaat caatcctttt   4080
ttaaaagtca atattactgt aacataagta tatattttaa aaatatccac ggttcttcaa   4140
atatttcccc aagattttcc tcctctaata cgctcaactt aatgacctat tcaataaatc   4200
tattatgctg ctaaatagtt tataggacaa ataagtatac tctaatgacc ctataaaaga   4260
tagaagggat ccatagatta acgcgtggta cccggggatc ctctagcatg ctggttctcg   4320
accattcaag gccggcttcc ggcggcgagc accatctttc ccactacctt gaaatgaaag   4380
cgctggagaa caataagcgg caagtgctcc acggtgctaa agtcggctgc agcgcgatta   4440
tgctgactga catttaccga tctcttatcg gtgcaagcct gggtgatcaa cacgctgagc   4500
aagcgattcg ctccgtttat gaaaagctcc ctgacggtaa gaaaatggca gagtggatga   4560
ggcgtatcgg cgggcctgta tcattcaaag aactcgatgt tgaagaagag ctggtgagag   4620
aagcgctcgc atacgcccat cagctcagag accggtatac gggactgaaa atcatcaatc   4680
aatacggcct tttgccgggg cttttaggca aaggaccagg cgtgaaaggg gttaaaatgt   4740
gaaaaggttc ctttcatcta tctttatggt cacggtcgct gtatgtttgc ttttatcggg   4800
gtgcaaggcg agtcctgcct ccgatcaagc ggacggcacc gaactgacat tttggacatt   4860
caacggcctt catgaacagt tttatgctga gatggtgaaa gaatggaaca aaaagtatcc   4920
cgagcgaaaa atcaaattaa atacagtggt gtatccgtat ggacagatgc atgacaattt   4980
atctatctcg cttttagccg ggaaaggggt tccagatatt gccgatgttg agctggggcg   5040
ctattcgaac tttttgaagg gctctgacat tcctcttacc gatttaacgc cgcttgtgga   5100
ggacgaacgc gacaagtttg ttgaagcgag gctgacgctc tacagcaaga acggcaagct   5160
ttacggactt gacacacatg tcggaactac cgtgatgtat tacaacatgg aaatgatgaa   5220
taaagcaggc gttgatccgg acgacatcaa aacatgggaa gattacaggg aagcgggcaa   5280
aaaggtcgtc aaagctctcg gaaagccgat gacgacgatt gaaacgaccg acccgaattc   5340
```

```
atttctgccg ctggtttccc agcagggatc cggttacttt gatgagcagg ggcggttgac   5400

attaaacaat gagacaaacg tgaaaacgct cgaattttta aagactttaa ttgagaaaga   5460

caaaattgcc gtcacaacgc ccggaggcaa tcatcacagt gaagagtatt acggatttat   5520

gaaccaaggc ggcgcggcgt ctgtcttaat gccgatctgg tatatgggcc gtttttgga   5580

ttatatgcct gacttgaaag ggaaaatcgc gatcagaccg ctgccggcat gggaagaagg   5640

gggagaccgc tcagcgggaa tgggcggaac ggccaccgtg attccaaaac aggcgaaaca   5700

ggtcgatctg gccaaggatt tcttgaaatt tgccaaagcg tcaaaagaag gcaacaccaa   5760

gctgtggacc gtgctcgggt tcgatccgct cagatgggat gtgtgggact cggacgaatt   5820

gaaaaaaaca aatcaatata cagaatactt tcaaaacgga caacacatct tttccgtgct   5880

tcttgacata aaggatgaga tcaatccgct ttaccttact gaggattatg cgaagacttc   5940

cgatctcgtc aacagaaaca tactgtacga agcgctcaaa acgaagagca aaacaccgaa   6000

agaagcattg gacaaagcag cagctgaagt gaaagggcaa tagtctttca ttactgtaaa   6060

gcgaggcgat aacttgaaga ctgttaaaac agatacagtg cattcgtttc cgccggtgag   6120

cagaaaaaga aagatcagac gtttattata ttcagcaaaa gccgcaccct acatttttac   6180

agcacctttt gtactctcct tttgcatatt ttttctttat ccgcttatca gcgtcgtcat   6240

catgagtttt caaagcattc tccccgggga agtccgcttc atcgggacgg agaactataa   6300

agcattaaac aatcctacat tttataccgc actattcaac accgtaaaat acaccttttg   6360

gacattgctg attttaatac ctgttcctct tattctggca gtctttttag attctaaact   6420

cgtaaagttt aaaaacgtgt tcaaatcggc tttattcatc ccggctctga cttcaaccat   6480

tgtggcgggg attattttca ggctgatttt tggagaaatg gatacatccc tggcgaattc   6540

gatattggct aagctcggag gttcgccgta caactggctg aacaatgaac ataccggcat   6600

gtttttaatg gtgatgctcg catcttggag atggatgggg atcaatgtcc tgtacttttt   6660

ggcgggcttg cagaacgttc cgaaagaatt gtatgaagct gccgaaatcg acggggcagg   6720

cacgttcaag aagttttacc atattacgct tccgttttta aagcccgtca gcgtctacgt   6780

gctgacgatc agcatcatcg gcggcttccg gatgtttgaa gaaagctacg tgctgtggca   6840

gaacaactct ccgggcaaca tcggcctgac gatggtcgga tacatttatc agcaggggct   6900

tgcctacaac aacatgggct acggatcggc gctcggcatc gtgctcttga tcatcatttt   6960

catctgcagc ctcatttcat taaagctgtc tggatctttt aaaaaggagg gctattaatg   7020

cgtcctgccg gaggcctcaa cattgcgaaa gtagctctgt ttctgctgtt tgcgatatta   7080

agctttttgt ttgtgtttcc gctcttctgc cttgtactcg gctcgctcaa gccatcttcg   7140

gaattgctgc gcttcggcct gaatttaaag ctgagccctg aaatcctgag ccttgacaat   7200

tacacttact tgtttaacgg aggcagcatt tattttcaat ggttttcgaa cagcttgatt   7260

ctcgtggtga tatccaccgt gctgacgctc ttgttttctt caatggtcgg atacgggctt   7320

gccgtctacg                                                          7330
```

<210> SEQ ID NO 50
<211> LENGTH: 2347
<212> TYPE: DNA
<213> ORGANISM: Artificial sequence
<220> FEATURE:
<223> OTHER INFORMATION: Synthetic construct
<220> FEATURE:
<221> NAME/KEY: promoter
<222> LOCATION: (18)..(245)

<223> OTHER INFORMATION: PamyL
<220> FEATURE:
<221> NAME/KEY: promoter
<222> LOCATION: (251)..(346)
<223> OTHER INFORMATION: PamyQsc
<220> FEATURE:
<221> NAME/KEY: promoter
<222> LOCATION: (364)..(459)
<223> OTHER INFORMATION: PcryIIIA
<220> FEATURE:
<221> NAME/KEY: RBS
<222> LOCATION: (460)..(1016)
<223> OTHER INFORMATION: cryIIIA stabilizer
<220> FEATURE:
<221> NAME/KEY: sig_peptide
<222> LOCATION: (1100)..(1186)
<223> OTHER INFORMATION: SPaprL
<220> FEATURE:
<221> NAME/KEY: misc_feature
<222> LOCATION: (1187)..(2245)
<223> OTHER INFORMATION: The aprH coding sequence.

<400> SEQUENCE: 50
gatctagatc aggtaccgca acgttcgcag atgctgctga agagattatt aaaaagctga 60
aagcaaaagg ctatcaattg gtaactgtat ctcagcttga agaagtgaag aagcagagag 120
gctattgaat aaatgagtag aaagcgccat atcggcgctt ttcttttgga agaaaatata 180
gggaaaatgg tacttgttaa aaattcggaa tatttataca atatcatatg tatcacattg 240
aaaggagggg cctgctgtcc agactgtccg ctgtgtaaaa aaaaggaata aaggggggtt 300
gacattattt tactgatatg tataatataa tttgtataag aaaatggagg ggccctcgaa 360
acgtaagatg aaaccttaga taaaagtgct ttttttgttg caattgaaga attattaatg 420
ttaagcttaa ttaaagataa tatctttgaa ttgagatcta atatctttga attgtaacgc 480
ccctcaaaag taagaactac aaaaaaagaa tacgttatat agaaatatgt ttgaaccttc 540
ttcagattac aaatatattc ggacggactc tacctcaaat gcttatctaa ctatagaatg 600
acatacaagc acaaccttga aaatttgaaa atataactac caatgaactt gttcatgtga 660
attatcgctg tatttaattt tctcaattca atatataata tgccaataca ttgttacaag 720
tagaaattaa gacacccttg atagccttac tatacctaac atgatgtagt attaaatgaa 780
tatgtaaata tatttatgat aagaagcgac ttatttataa tcattacata tttttctatt 840
ggaatgatta agattccaat agaatagtgt ataaattatt tatcttgaaa ggagggatgc 900
ctaaaaacga agaacattaa aaacatatat ttgcaccgtc taatggatag aaaggaggtg 960
atccagccgc accttatgaa aaatcatttt atcagtttga aaattatgta ttatggaaga 1020
gctgaaaggg gaggagaacc atggaactag tctggatcct acgcgttcat atgtatcaca 1080
ttgaaagggg aggagaatca tgatgaggaa aaagagtttt tggcttggga tgctgacggc 1140
cttcatgctc gtgttcacga tggcattcag cgattccgct tctgctgctg aagaagcaaa 1200
agaaaaatat ttaattggct ttaatgagca ggaagctgtc agtgagtttg tagaacaagt 1260
agaggcaaat gacgaggtcg ccattctctc tgaggaagag gaagtcgaaa ttgaattgct 1320
tcatgaattt gaaacgattc ctgttttatc cgttgagtta agcccagaag atgtggacgc 1380
gcttgaactc gatccagcga tttcttatat tgaagaggat gcagaagtaa cgacaatggc 1440
gcaatcggta ccatggggaa ttagccgtgt gcaagcccca gctgcccata accgtggatt 1500
gacaggttct ggtgtaaaag ttgctgtcct cgatacaggg atatccactc atccagatct 1560
aaatattcgt ggtggcgcaa gctttgtacc aggggaaccg tcgactcaag atgggaatgg 1620
gcatggcacg catgtggccg ggacgatcgc tgctttaaac aattcgattg gcgttcttgg 1680
cgtagctcct agcgctgagc tatacgctgt taaagtccta ggggcgagcg gttcaggctc 1740
ggtcagctcg attgcccaag gattggaatg ggcagggaac aatggcatgc acgttgctaa 1800
tttgagttta ggaagccctt cgccaagtgc cacactcgag caagctgtta atagcgcgac 1860
ttctagaggc gttcttgttg tagcggcatc tgggaattca ggtgcaggct caatcagcta 1920
tccggcgcgc tatgcgaacg caatggcagt cggagctact gatcaaaaca acaaccgcgc 1980
tagcttttca cagtatggcg caggccttga cattgtcgca cccggggtaa acgtgcagag 2040
cacataccca ggttcaacat atgccagctt aaacggtaca tcgatggcta ctcctcatgt 2100
tgcaggtgcg gccgcccttg ttaaacaaaa gaacccatct tggtctaatg tacaaattcg 2160
aaatcatcta aagaatacgg caactagttt aggaagcacg aacttgtatg gaagcggact 2220
tgttaacgca gaagcggcaa cgcgttaata acgcgtgcta gcggccgcgt cgactagaag 2280
agcagagagg acggatttcc tgaaggaaat ccgttttttt attttgcccg tcttataaat 2340
ttcgttg 2347

<210> SEQ ID NO 51
<211> LENGTH: 9952
<212> TYPE: DNA
<213> ORGANISM: Artificial sequence
<220> FEATURE:
<223> OTHER INFORMATION: Synthetic construct
<220> FEATURE:
<221> NAME/KEY: misc_feature
<222> LOCATION: (1)..(1646)
<223> OTHER INFORMATION: The araB sequence.
<220> FEATURE:
<221> NAME/KEY: primer_bind
<222> LOCATION: (1)..(23)
<223> OTHER INFORMATION: Primer 35881
<220> FEATURE:
<221> NAME/KEY: primer_bind
<222> LOCATION: (25)..(48)
<223> OTHER INFORMATION: Primer 36818
<220> FEATURE:
<221> NAME/KEY: misc_feature
<222> LOCATION: (1665)..(2348)
<223> OTHER INFORMATION: The araD sequence.
<220> FEATURE:
<221> NAME/KEY: misc_feature
<222> LOCATION: (2368)..(3060)
<223> OTHER INFORMATION: The araM' sequence.
<220> FEATURE:
<221> NAME/KEY: primer_bind
<222> LOCATION: (3036)..(3084)
<223> OTHER INFORMATION: Primer 35894 complement
<220> FEATURE:
<221> NAME/KEY: primer_bind
<222> LOCATION: (3061)..(3084)
<223> OTHER INFORMATION: Primer 35893
<220> FEATURE:
<221> NAME/KEY: misc_feature
<222> LOCATION: (3074)..(3212)
<223> OTHER INFORMATION: The res sequence.
<220> FEATURE:
<221> NAME/KEY: misc_feature
<222> LOCATION: (3427)..(4206)
<223> OTHER INFORMATION: The spec sequence.
<220> FEATURE:
<221> NAME/KEY: misc_feature
<222> LOCATION: (4410)..(4546)
<223> OTHER INFORMATION: The res sequence.
<220> FEATURE:
<221> NAME/KEY: primer_bind
<222> LOCATION: (4560)..(4608)
<223> OTHER INFORMATION: Primer 39951
<220> FEATURE:
<221> NAME/KEY: primer_bind
<222> LOCATION: (4583)..(4608)

<223> OTHER INFORMATION: Primer 39950
<220> FEATURE:
<221> NAME/KEY: promoter
<222> LOCATION: (4600)..(4827)
<223> OTHER INFORMATION: The amyL promoter
<220> FEATURE:
<221> NAME/KEY: promoter
<222> LOCATION: (4833)..(4928)
<223> OTHER INFORMATION: The amyQsc promoter
<220> FEATURE:
<221> NAME/KEY: promoter
<222> LOCATION: (4946)..(5041)
<223> OTHER INFORMATION: The cryIIIA promoter
<220> FEATURE:
<221> NAME/KEY: sig_peptide
<222> LOCATION: (5682)..(5768)
<223> OTHER INFORMATION: The AprL signal peptide.
<220> FEATURE:
<221> NAME/KEY: misc_feature
<222> LOCATION: (5769)..(6827)
<223> OTHER INFORMATION: The aprH coding sequence
<220> FEATURE:
<221> NAME/KEY: misc_feature
<222> LOCATION: (6854)..(6927)
<223> OTHER INFORMATION: The amyL terminator sequence.
<220> FEATURE:
<221> NAME/KEY: RBS
<222> LOCATION: (6854)..(6927)
<220> FEATURE:
<221> NAME/KEY: primer_bind
<222> LOCATION: (6908)..(6929)
<223> OTHER INFORMATION: Primer 36001 complement
<220> FEATURE:
<221> NAME/KEY: primer_bind
<222> LOCATION: (6908)..(6952)
<223> OTHER INFORMATION: Primer 36002
<220> FEATURE:
<221> NAME/KEY: misc_feature
<222> LOCATION: (6930)..(7361)
<223> OTHER INFORMATION: The 'araM sequence.
<220> FEATURE:
<221> NAME/KEY: misc_feature
<222> LOCATION: (7361)..(8662)
<223> OTHER INFORMATION: The araN sequence.
<220> FEATURE:
<221> NAME/KEY: misc_feature
<222> LOCATION: (8696)..(9637)
<223> OTHER INFORMATION: The araP sequence.
<220> FEATURE:
<221> NAME/KEY: misc_feature
<222> LOCATION: (9640)..(9952)
<223> OTHER INFORMATION: The araQ sequence.
<220> FEATURE:
<221> NAME/KEY: primer_bind
<222> LOCATION: (9906)..(9928)
<223> OTHER INFORMATION: Primer 36817 complement
<220> FEATURE:
<221> NAME/KEY: primer_bind
<222> LOCATION: (9931)..(9952)
<223> OTHER INFORMATION: Primer 35880 complement

<400> SEQUENCE: 51
gtgcagttct cgtcgatgtc cggacaggtg aggaaatcgc gacagctgtc aaagagtaca 60
cgcacggggt gatagaccgg gagcttccgg tctcaaagcg aaagcttccg agagactggg 120
cgctccagca tccggccgat tacattgaag tgctggagga aacgattccg agccttttga 180
aacagtcaaa agcggatccg aaagaaatca tcggaatcgg aatcgatttc acggcttgca 240
cgattttgcc cgttgacgag aacgggactc ctctttgtat gagggaagag tatgcgtcag 300
aaccgcacag ctatgtgaag ctttggaagc accatgctgc acaggagcag gcgaatcgct 360
taaatcaaat cgcggaagaa agaaatgaac cttttcttca aacatacggc gggaaaattt 420
cttccgagtg gctcgttcca aaagtgatgc aaatcgcgga agaagcgcct gacatttatg 480
atgccgcagc cgagatcatg gaagcggccg actggatcgt ctatatgctg tgcggaacca 540
gaaagcgcaa caattgcaca gcgggttata aagcgatttg gaacaataag agcggctatc 600
cttccgacga tttcttcgca agcctgcatc cgaagctgaa aaatatcgtt cgggaaaaac 660
taacggagga tatttattct gtaggcgaaa aagcgggcgg actgactgaa gaaatggccg 720
ggaagacagg gcttctggca ggtacggcgg tcgctgtcgc aaatgttgat gctcatgtgt 780
cggttccggc ggtcggcatc acagagccgg gcaagatgct gatgatcatg ggaacgtcta 840
cctgtcacat gctgctcggc gaggatgtca ggatggtgcc gggaatgtgc ggcgtcgttg 900
aagacgggat tctgccgggc tatgtcggct atgaagcggg ccaatcgtgc gttggcgacc 960
attttcattg gctgattcaa cactttgttc cagaagcgta tttgaaagaa gctgaagccg 1020
aagggatttc catttacgaa ctgctgtctc aaaaggccgg cagtctccaa atcggtgaaa 1080
gcggtttgct tgcattggat tggtggaacg gaaaccgttc aacactcgtt gatgccgatc 1140
tgacgggaat gctgctcggt atgacccttg ccactaagcc tgaagagata taccgtgcat 1200
tggttgaagc gactgcctgc gggacgagga tcattattga aacgttcaga caaagcggcg 1260
tgccgatcga ggagctgtat gccgcaggag gaatcgccga aaaaaatccg tttatcatgc 1320
aggtttacgc ggatgtcacc aacatggaaa tcaaaatttc cggatctccg caggcgccgg 1380
ctttaggttc agcgatattc ggagcgctcg cggccggaag catgaacggc ggttacgacc 1440
atatcgaaga agcagtcgca catatgggca agatcaagga taaaacgtac aaaccaattc 1500
ctgaaaacgt ttccttatac gatcagcttt atgcggaata taaggagctt tacacgtact 1560
tcggaaagca aaacaatgtg atgaaacgcc ttaaaaaatt gaaaaacatc cagtccctta 1620
gttctgaccc cggtaaagcg atggcttaga gggaggagaa aactgtgctg gaatctttga 1680
aagaacaagt attaaaagcg aatttgcagc ttgaagaata ccggcttgtc acctttacat 1740
ggggaaatgt cagcggtatt gaccgggaga ataagctggt cgtcatcaag ccgagcggtg 1800
tcaaatacag cgatttgaaa gccgaagatt tagtggttct gaatatggac ggcgagattg 1860
tggaagggga tctgaagcca tcttccgata cgccgacaca cctctatctt taccggcagt 1920
ttcaatcgat cggcgggatc gtccatacgc attccccgtg ggcgacaagc tgggctcagt 1980
cagggaagga cattccgtcg ctcggaacga ctcatgccga ctactaccac ggcgacattc 2040
cgtgtacacg ggaaatggat cccgatgaaa tcaggagtca atacgagctg aatacaggaa 2100
aagtgattgt agagacgttc cggcatcttg accccctggc ggtgcccgcc gttctcgtga 2160
acaatcacgg gccgttttgc tggggaaaag acgccttaac tgccgtacac aatgccgtcg 2220
tcctggaaga agtcgccaag atggcgtacc gctccctgat gctgaatccg tctcttaagc 2280
ggattaagag cgctttgcag gataagcatt attttcgaaa gcacggggca gacgcctatt 2340
acggccaata gaggagggaa gctgccaatg aatgacttga tctcttatgt gaaaaaaact 2400
ttgggcgcat gcgaatgcgg aaccgtccac cacccgctta cagtcgaaaa aatcgcgatc 2460
ggcgacaatg ctgttgagca agagctgccc gctttcgtga aatcggcttc ctataaaaaa 2520
gccgctgtca tttatgatga aacgaccgga cggttagccg gcaagcggat tgcctctctt 2580
cttgaggaaa cggctgaaac ggttccggtg ctgctggaag ctaatgaagc gggcgatgtg 2640
acggcggatg agcaaacatt ggtgagtgca ttgatcggtg taccgattga tgcggatgta 2700
ctaattgcgg ccggagcggg cacgattcac gacatcgtca ggttttgcgc ctatcagcgc 2760
ggcattccgt ttatttcagt tcctacggct ccgtcggttg acggttttac ttcagccggc 2820
gcaccgctga ttttaaaagg aaagaaacag acggttcaaa cgacagcgcc gatcgcgctt 2880

-continued tttgccgatt tggagctctt gtgtcaagcg ccgcagaaca tggtagccgc aggttttggc 2940
gatatgctcg gcaaggtgac gtcgcttgcg gattgggaga tttcccgctt gcttgccggc 3000
gagccgtatt gtccggccgc cagccggctc acgagggaag cgcttgatca atgtcttgac 3060
cagtgaattc tgatcaaatg gttcagtgag agcgaagcga acacttgatt ttttaatttt 3120
ctatctttta taggtcatta gagtatactt atttgtccta taaactattt agcagcataa 3180
tagatttatt gaataggtca tttaagttga gcgtattaga ggaggaaaat cttggagaaa 3240
tatttgaaga acccgaacgc gtataataaa gaataataat aaatctgtag acaaattgtg 3300
aaaggatgta cttaaacgct aacggtcagc tttattgaac agtaatttaa gtatatgtcc 3360
aatctagggt aagtaaattg agtatcaata taaactttat atgaacataa tcaacgaggt 3420
gaaatcatga gcaatttgat taacggaaaa ataccaaatc aagcgattca aacattaaaa 3480
atcgtaaaag atttatttgg aagttcaata gttggagtat atctatttgg ttcagcagta 3540
aatggtggtt tacgcattta cagcgatgta gatgttctag tcgtcgtgaa tcatagttta 3600
cctcaattaa ctcgaaaaaa actaacagaa agactaatga ctatatcagg aaagattgga 3660
aatacggatt ctgttagacc acttgaagtt acggttataa ataggagtga agttgtccct 3720
tggcaatatc ctccaaaaag agaatttata tacggtgagt ggctcaggtg tggatttgag 3780
aatggacaaa ttcaggaacc aagctatgat cctgatttgg ctattgtttt agcacaagca 3840
agaaagaata gtatttctct atttggtcct gattcttcaa gtatacttgt ctccgtacct 3900
ttgacagata ttcgaagagc aattaaggat tctttgccag aactaattga ggggataaaa 3960
ggtgatgagc gtaatgtaat tttaacccta gctcgaatgt ggcaaacagt gactactggt 4020
gaaattacct cgaaagatgt cgctgcggaa tgggctatac ctcttttacc taaagagcat 4080
gtaactttac tggatatagc cagaaaaggc tatcggggag agtgtgatga taagtgggaa 4140
ggactatatt caaaggtgaa agcactcgtt aagtatatga aaaattctat agaaacttct 4200
ctcaattagg ctaattttat tgcaataaca ggtgcttact tttaaaacta ctgatttatt 4260
gataaatatt gaacaatttt tgggaagaat aaagcgtcct cttgtgaaat tagagaacgc 4320
tttattactt taatttagtg aaacaatttg taactattga aaatagaaag aaattgttcc 4380
ttcgatagtt tattaatatt agtggagctc agtgagagcg aagcgaacac ttgatttttt 4440
aattttctat cttttatagg tcattagagt atacttattt gtcctataaa ctatttagca 4500
gcataataga tttattgaat aggtcattta agttgagcat attaggggag gaaaatcttg 4560
gagaaatatt tgaagaaccc gagatctaga tcaggtaccg caacgttcgc agatgctgct 4620
gaagagatta ttaaaaagct gaaagcaaaa ggctatcaat tggtaactgt atctcagctt 4680
gaagaagtga agaagcagag aggctattga ataaatgagt agaaagcgcc atatcggcgc 4740
ttttcttttg gaagaaaata tagggaaaat ggtacttgtt aaaaattcgg aatatttata 4800
caatatcata tgtatcacat tgaaaggagg ggcctgctgt ccagactgtc cgctgtgtaa 4860
aaaaaaggaa taaagggggg ttgacattat tttactgata tgtataatat aatttgtata 4920
agaaaatgga ggggccctcg aaacgtaaga tgaaacctta gataaaagtg cttttttttgt 4980 tgcaattgaa gaattattaa tgttaagctt aattaaagat aatatctttg aattgagatc 5040
taatatcttt gaattgtaac gcccctcaaa agtaagaact acaaaaaaag aatacgttat 5100
atagaaatat gtttgaacct tcttcagatt acaaatatat tcggacggac tctacctcaa 5160
atgcttatct aactatagaa tgacatacaa gcacaacctt gaaaatttga aaatataact 5220

```
accaatgaac ttgttcatgt gaattatcgc tgtatttaat tttctcaatt caatatataa   5280
tatgccaata cattgttaca agtagaaatt aagacaccct tgatagcctt actataccta   5340
acatgatgta gtattaaatg aatatgtaaa tatatttatg ataagaagcg acttatttat   5400
aatcattaca tatttttcta ttggaatgat taagattcca atagaatagt gtataaatta   5460
tttatcttga aaggagggat gcctaaaaac gaagaacatt aaaaacatat atttgcaccg   5520
tctaatggat agaaaggagg tgatccagcc gcaccttatg aaaaatcatt ttatcagttt   5580
gaaaattatg tattatggaa gagctgaaag gggaggagaa ccatggaact agtctggatc   5640
ctacgcgttc atatgtatca cattgaaagg ggaggagaat catgatgagg aaaaagagtt   5700
tttggcttgg gatgctgacg gccttcatgc tcgtgttcac gatggcattc agcgattccg   5760
cttctgctgc tgaagaagca aaagaaaaat atttaattgg ctttaatgag caggaagctg   5820
tcagtgagtt tgtagaacaa gtagaggcaa atgacgaggt cgccattctc tctgaggaag   5880
aggaagtcga aattgaattg cttcatgaat ttgaaacgat tcctgtttta tccgttgagt   5940
taagcccaga agatgtggac gcgcttgaac tcgatccagc gatttcttat attgaagagg   6000
atgcagaagt aacgacaatg gcgcaatcgg taccatgggg aattagccgt gtgcaagccc   6060
cagctgccca taaccgtgga ttgacaggtt ctggtgtaaa agttgctgtc ctcgatacag   6120
ggatatccac tcatccagat ctaaatattc gtggtggcgc aagctttgta ccaggggaac   6180
cgtcgactca agatgggaat gggcatggca cgcatgtggc cgggacgatc gctgctttaa   6240
acaattcgat tggcgttctt ggcgtagctc ctagcgctga gctatacgct gttaaagtcc   6300
taggggcgag cggttcaggc tcggtcagct cgattgccca aggattggaa tgggcaggga   6360
acaatggcat gcacgttgct aatttgagtt taggaagccc ttcgccaagt gccacactcg   6420
agcaagctgt taatagcgcg acttctagag gcgttcttgt tgtagcggca tctgggaatt   6480
caggtgcagg ctcaatcagc tatccggcgc gctatgcgaa cgcaatggca gtcggagcta   6540
ctgatcaaaa caacaaccgc gctagctttt cacagtatgg cgcaggcctt gacattgtcg   6600
cacccggggt aaacgtgcag agcacatacc caggttcaac atatgccagc ttaaacggta   6660
catcgatggc tactcctcat gttgcaggtg cggccgccct tgttaaacaa aagaacccat   6720
cttggtctaa tgtacaaatt cgaaatcatc taaagaatac ggcaactagt ttaggaagca   6780
cgaacttgta tggaagcgga cttgttaacg cagaagcggc aacgcgttaa taacgcgtgc   6840
tagcggccgc gtcgactaga agagcagaga ggacggattt cctgaaggaa atccgttttt   6900
ttattttgcc cgtcttataa atttcgttga tgctggttct cgaccattca aggccggctt   6960
ccggcggcga gcaccatctt tcccactacc ttgaaatgaa agcgctggag aacaataagc   7020
ggcaagtgct ccacggtgct aaagtcggct gcagcgcgat tatgctgact gacatttacc   7080
gatctcttat cggtgcaagc ctgggtgatc aacacgctga gcaagcgatt cgctccgttt   7140
atgaaaagct ccctgacggt aagaaaatgg cagagtggat gaggcgtatc ggcgggcctg   7200
tatcattcaa agaactcgat gttgaagaag agctggtgag agaagcgctc gcatacgccc   7260
atcagctcag agaccggtat acgggactga aaatcatcaa tcaatacggc cttttgccgg   7320
ggcttttagg caaaggacca ggcgtgaaag gggttaaaat gtgaaaaggt tcctttcatc   7380
tatctttatg gtcacggtcg ctgtatgttt gcttttatcg gggtgcaagg cgagtcctgc   7440
ctccgatcaa gcggacggca ccgaactgac attttggaca ttcaacggcc ttcatgaaca   7500
gttttatgct gagatggtga aagaatggaa caaaaagtat cccgagcgaa aaatcaaatt   7560
aaatacagtg gtgtatccgt atggacagat gcatgacaat ttatctatct cgcttttagc   7620
```

cgggaaaggg gttccagata ttgccgatgt tgagctgggg cgctattcga actttttgaa 7680
gggctctgac attcctctta ccgatttaac gccgcttgtg gaggacgaac gcgacaagtt 7740
tgttgaagcg aggctgacgc tctacagcaa gaacggcaag ctttacggac ttgacacaca 7800
tgtcggaact accgtgatgt attacaacat ggaaatgatg aataaagcag gcgttgatcc 7860
ggacgacatc aaaacatggg aagattacag ggaagcgggc aaaaaggtcg tcaaagctct 7920
cggaaagccg atgacgacga ttgaaacgac cgacccgaat tcatttctgc cgctggtttc 7980
ccagcaggga tccggttact ttgatgagca ggggcggttg acattaaaca atgagacaaa 8040
cgtgaaaacg ctcgaatttt taaagacttt aattgagaaa gacaaaattg ccgtcacaac 8100
gcccggaggc aatcatcaca gtgaagagta ttacggattt atgaaccaag gcggcgcggc 8160
gtctgtctta atgccgatct ggtatatggg ccgtttttg gattatatgc ctgacttgaa 8220
agggaaaatc gcgatcagac cgctgccggc atgggaagaa gggggagacc gctcagcggg 8280
aatgggcgga acggccaccg tgattccaaa acaggcgaaa caggtcgatc tggccaagga 8340
tttcttgaaa tttgccaaag cgtcaaaaga aggcaacacc aagctgtgga ccgtgctcgg 8400
gttcgatccg ctcagatggg atgtgtggga ctcggacgaa ttgaaaaaaa caaatcaata 8460
tacagaatac tttcaaaacg gacaacacat cttttccgtg cttcttgaca taaaggatga 8520
gatcaatccg ctttacctta ctgaggatta tgcgaagact tccgatctcg tcaacagaaa 8580
catactgtac gaagcgctca aacgaagag caaaacaccg aaagaagcat tggacaaagc 8640
agcagctgaa gtgaaagggc aatagtcttt cattactgta aagcgaggcg ataacttgaa 8700
gactgttaaa acagatacag tgcattcgtt tccgccggtg agcagaaaaa gaaagatcag 8760
acgtttatta tattcagcaa aagccgcacc ctacattttt acagcacctt ttgtactctc 8820
cttttgcata ttttttcttt atccgcttat cagcgtcgtc atcatgagtt ttcaaagcat 8880
tctccccggg gaagtccgct tcatcgggac ggagaactat aaagcattaa acaatcctac 8940
attttatacc gcactattca acaccgtaaa atacaccttt tggacattgc tgattttaat 9000
acctgttcct cttattctgg cagtcttttt agattctaaa ctcgtaaagt ttaaaaacgt 9060
gttcaaatcg gctttattca tcccggctct gacttcaacc attgtggcgg ggattatttt 9120
caggctgatt tttggagaaa tggatacatc cctggcgaat tcgatattgg ctaagctcgg 9180
aggttcgccg tacaactggc tgaacaatga acataccggc atgtttttaa tggtgatgct 9240
cgcatcttgg agatggatgg ggatcaatgt cctgtacttt ttggcgggct tgcagaacgt 9300
tccgaaagaa ttgtatgaag ctgccgaaat cgacggggca ggcacgttca agaagtttta 9360
ccatattacg cttccgtttt taaagcccgt cagcgtctac gtgctgacga tcagcatcat 9420
cggcggcttc cggatgtttg aagaaagcta cgtgctgtgg cagaacaact ctccgggcaa 9480
catcggcctg acgatggtcg gatacattta tcagcagggg cttgcctaca acaacatggg 9540
ctacggatcg gcgctcggca tcgtgctctt gatcatcatt ttcatctgca gcctcatttc 9600
attaaagctg tctggatctt ttaaaaagga gggctattaa tgcgtcctgc cggaggcctc 9660
aacattgcga aagtagctct gtttctgctg tttgcgatat taagcttttt gtttgtgttt 9720
ccgctcttct gccttgtact cggctcgctc aagccatctt cggaattgct gcgcttcggc 9780
ctgaatttaa agctgagccc tgaaatcctg agccttgaca attacactta cttgtttaac 9840
ggaggcagca tttattttca atggttttcg aacagcttga ttctcgtggt gatatccacc 9900
gtgctgacgc tcttgttttc ttcaatggtc ggatacgggc ttgccgtcta cg 9952